United States Patent
Kurasawa et al.

(10) Patent No.: US 11,287,912 B2
(45) Date of Patent: Mar. 29, 2022

(54) DISPLAY DEVICE AND CIRCUIT BOARD

(71) Applicant: Japan Display Inc., Minato-ku (JP)

(72) Inventors: Hayato Kurasawa, Minato-ku (JP); Hiroshi Mizuhashi, Minato-ku (JP); Tadayoshi Katsuta, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/944,514

(22) Filed: Jul. 31, 2020

(65) Prior Publication Data
US 2020/0363884 A1 Nov. 19, 2020

Related U.S. Application Data

(63) Continuation of application No. 16/029,704, filed on Jul. 9, 2018, now Pat. No. 10,768,756.

(30) Foreign Application Priority Data

Jul. 10, 2017 (JP) .............................. JP2017-134817

(51) Int. Cl.
*G06F 3/046* (2006.01)
*G06F 3/044* (2006.01)
(Continued)

(52) U.S. Cl.
CPC ............ *G06F 3/0412* (2013.01); *G06F 3/044* (2013.01); *G06F 3/046* (2013.01); *G06F 3/0418* (2013.01);
(Continued)

(58) Field of Classification Search
CPC ...... G06F 3/033; G06F 3/0346; G06F 3/0354; G06F 3/03545; G06F 3/038;
(Continued)

(56) References Cited

U.S. PATENT DOCUMENTS

2007/0124515 A1  5/2007 Ishikawa et al.
2012/0154326 A1  6/2012 Liu
(Continued)

FOREIGN PATENT DOCUMENTS

JP    10-049301    2/1998
JP    2005-352572  12/2005
(Continued)

OTHER PUBLICATIONS

Notice of Reasons for Refusal dated Apr. 13, 2021 in Japanese Patent Application No. 2017-134817 (with English language translation), 9 pages.
(Continued)

*Primary Examiner* — Nathan Danielsen
(74) *Attorney, Agent, or Firm* — Oblon, McClelland, Maier & Neustadt, L.L.P.

(57) ABSTRACT

A display device includes a substrate, first electrodes, lines, pixel electrodes, a display functional layer, a common electrode, second electrodes, and a controller. The first electrodes are opposed to the second electrodes with a space therebetween, and an insulating layer is provided between the common electrode and the first and second electrodes. During the display periods, in response to a control signal from the controller, the pixel electrodes are supplied with a pixel signal through the lines, and the common electrode is supplied with a common signal. During the sensing period, in response to the control signal from the controller, the lines are supplied with a first drive signal to generate a magnetic field. The first electrodes are supplied with a second drive signal to generate electrostatic capacitance between themselves and the second electrodes in response to the control signal from the controller, synchronously or asynchronously with the display periods.

19 Claims, 38 Drawing Sheets

(51) Int. Cl.
  *G09G 3/36* (2006.01)
  *G06F 3/041* (2006.01)
  *G09G 3/34* (2006.01)

(52) U.S. Cl.
  CPC .......... *G06F 3/0445* (2019.05); *G06F 3/0446* (2019.05); *G06F 3/04164* (2019.05); *G06F 3/04166* (2019.05); *G09G 3/344* (2013.01); *G09G 3/3696* (2013.01); *G06F 2203/04106* (2013.01); *G06F 2203/04112* (2013.01); *G09G 2300/0426* (2013.01); *G09G 2310/0202* (2013.01); *G09G 2310/068* (2013.01); *G09G 2310/08* (2013.01)

(58) Field of Classification Search
  CPC ................ G06F 3/0383; G06F 3/0412; G06F 3/0416–04186; G06F 3/044–0442; G06F 3/0445; G06F 3/0448; G06F 3/046; G06F 3/047; G06F 2203/0384; G06F 2203/04106; G06F 2203/04112; G06F 2203/04114; G09G 3/34; G09G 3/344; G09G 3/36; G09G 3/3648–3666; G09G 3/3674–3696; G09G 2300/0421; G09G 2300/0426; G09G 2310/0202; G09G 2310/06; G09G 2310/068; G09G 2310/08
  See application file for complete search history.

(56) References Cited

U.S. PATENT DOCUMENTS

| | | |
|---|---|---|
| 2012/0169400 A1 | 7/2012 | Liu |
| 2014/0078104 A1 | 3/2014 | Lee |
| 2014/0145996 A1 | 5/2014 | Sugita |

FOREIGN PATENT DOCUMENTS

| | | |
|---|---|---|
| JP | 2006-163745 | 6/2006 |
| JP | 2011-198009 A | 10/2011 |
| JP | 2014-164770 A | 9/2014 |
| JP | 2017-76352 A | 4/2017 |
| JP | 2017-97671 A | 6/2017 |
| WO | WO 2013/018736 A1 | 2/2013 |

OTHER PUBLICATIONS

Japanese Office Action dated Aug. 31, 2021 in Japanese Patent Application No. 2017-134817 (with English translation), 7 pages.

DISPLAY DEVICE AND CIRCUIT BOARD

CROSS-REFERENCE TO RELATED APPLICATIONS

This application is a continuation of and claims the benefit of priority under 35 U.S.C. § 120 from U.S. application Ser. No. 16/029,704 filed Jul. 9, 2018 (now U.S. Pat. No. 10,768,756 issued Sep. 8, 2020), and claims the benefit of priority under 35 U.S.C. § 119 from Japanese Application No. 2017-134817 filed Jul. 10, 2017, the entire contents of each of which are incorporated herein by reference.

BACKGROUND

1. Technical Field

The present disclosure relates to a display device and a circuit board.

2. Description of the Related Art

In recent years, touch detection devices commonly called touchscreen panels that are capable of detecting an external proximate object have been attracted attention. Such a touchscreen panel is mounted on or integrated with a display device, such as a liquid crystal display device, which is used as a display device with a touch detection function. A capacitance method and an electromagnetic induction method are known as detection methods for such a display device. In the electromagnetic induction method, coils for generating magnetic fields and coils for detecting the magnetic fields are provided in the display device. An external object to be detected, such as a pen, is provided with a coil and a capacitive element forming a resonant circuit. The display device detects the pen through electromagnetic induction between the coils in the display device and the coil in the pen. Japanese Patent Application Laid-open Publication No. 10-49301 describes a technology related to a coordinate input device using the electromagnetic induction method.

The capacitance method greatly differs from the electromagnetic induction method in the configuration of a detection target and detection electrodes. Therefore, if the electrodes and various types of wiring provided in the display device and the driving configuration thereof are directly employed in the electromagnetic induction method, the electromagnetic induction touch detection may be difficult to exert satisfactory performance.

SUMMARY

According to an aspect, a display device includes: a substrate; a plurality of first electrodes; a plurality of lines; a plurality of pixel electrodes; a display functional layer; a common electrode opposed to the pixel electrodes; a plurality of second electrodes; and a controller. The substrate, the pixel electrodes, the display functional layer, and the common electrode are stacked in this order. The first electrodes are opposed to the second electrodes with a space therebetween, and an insulating layer is provided between the common electrode and the first and second electrodes. The controller is configured to perform processing during a plurality of display periods to display an image and during a sensing period in a time-division manner, and control the pixel electrodes, the common electrode, the lines, the first electrodes, and the second electrodes according to the periods. During the display periods, in response to a control signal from the controller, the pixel electrodes are supplied with a pixel signal through the lines, and the common electrode is supplied with a common signal. During the sensing period, in response to the control signal from the controller, the lines are supplied with a first drive signal to generate a magnetic field. The first electrodes are supplied with a second drive signal to generate electrostatic capacitance between themselves and the second electrodes in response to the control signal from the controller, synchronously or asynchronously with the display periods.

According to another aspect, a display device includes: a substrate; a plurality of first electrodes; a plurality of lines; a plurality of pixel electrodes; a display functional layer; a common electrode opposed to the pixel electrodes; a plurality of second electrodes; a plurality of third electrodes; and a controller. The substrate, the pixel electrodes, the display functional layer, and the common electrode are stacked in this order. The first electrodes are opposed to the second electrodes with a space therebetween, and an insulating layer is provided between the common electrode and the first and second electrodes. The controller is configured to perform processing during a plurality of display periods to display an image and during a sensing period in a time-division manner, and control the pixel electrodes, the common electrode, the lines, the first electrodes, and the second electrodes according to the periods. During the display periods, in response to a control signal from the controller, the pixel electrodes are supplied with a pixel signal through the lines, and the common electrode is supplied with a common signal. During the sensing period, in response to the control signal from the controller, the third electrodes are supplied with a first drive signal to generate a magnetic field to generate an electromotive force caused by the magnetic field in the lines. The first electrodes are supplied with a second drive signal to generate electrostatic capacitance between themselves and the second electrodes in response to the control signal from the controller, synchronously or asynchronously with the display periods.

According to still another aspect, a circuit board used in a display device including a plurality of first electrodes, a display functional layer, a common electrode opposed to the display functional layer, a plurality of second electrodes opposed to the first electrodes with a space therebetween, and an insulating layer provided between the common electrode and the first and second electrodes, includes: a substrate; a plurality of lines; a plurality of pixel electrodes; and a plurality of third electrodes. The substrate, the pixel electrodes, the display functional layer, and the common electrode are stacked in this order in the display device. During a display period, the pixel electrodes are supplied with a pixel signal through the lines, and the common electrode is supplied with a common signal. During a sensing period, the lines, the third electrodes, or both are supplied with a first drive signal to generate a magnetic field.

DETAILED DESCRIPTION

Figure 1:
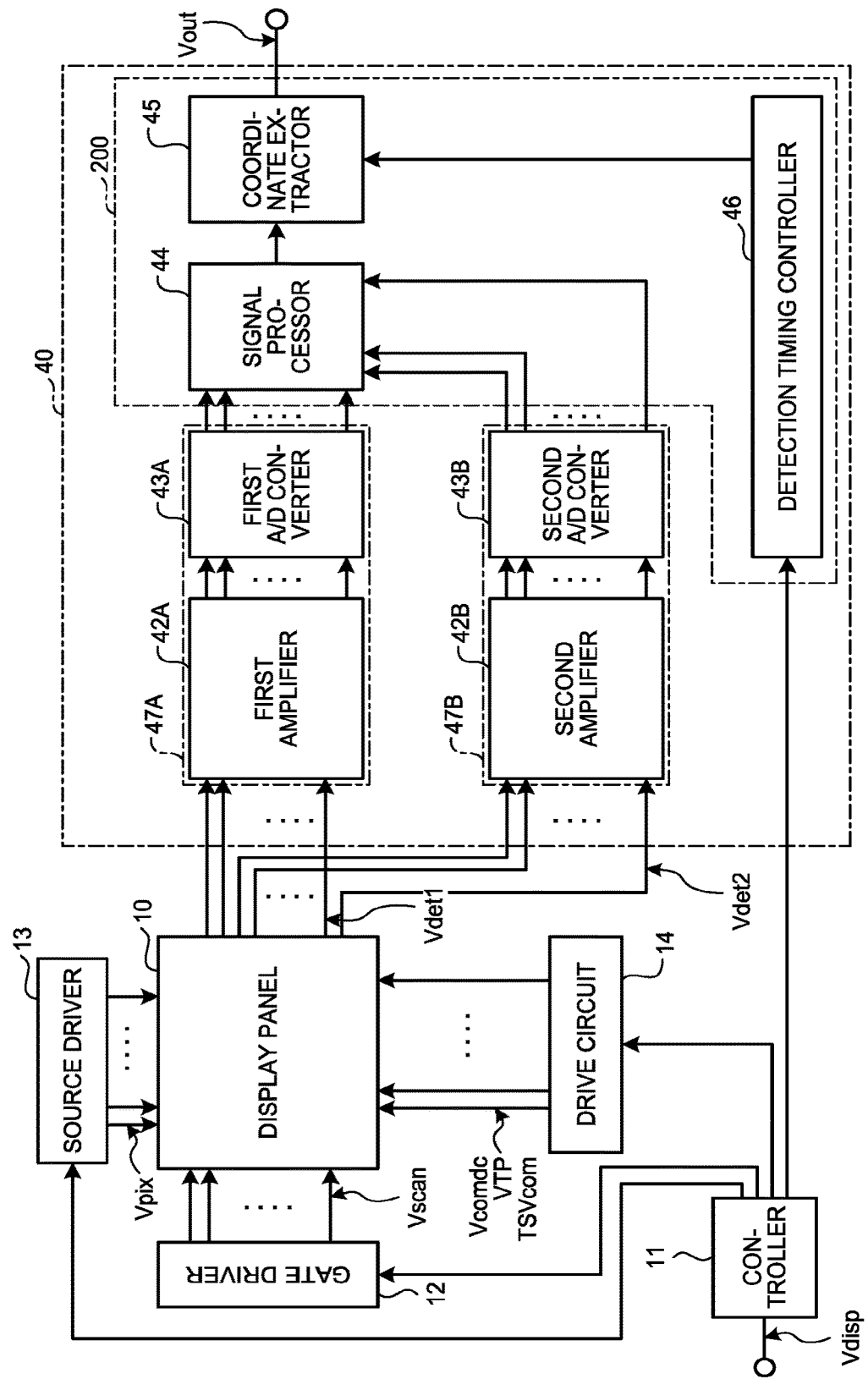
FIG. 1 is a block diagram illustrating a configuration example of a display device according to a first embodiment of the present disclosure.

The following describes embodiments for carrying out the present disclosure in detail with reference to the drawings. The present disclosure is not limited to the description of the embodiments given below. Components described below include those easily conceivable by those skilled in the art or those substantially identical thereto. Moreover, the components described below can be appropriately combined. The disclosure is merely an example, and the present disclosure naturally encompasses appropriate modifications easily conceivable by those skilled in the art while maintaining the gist of the present disclosure. To further clarify the description, widths, thicknesses, shapes, and other properties of various parts are schematically illustrated in the drawings, as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

FIG. 1 is a block diagram illustrating a configuration example of a display device according to a first embodiment of the present disclosure. A display device 1 of this embodiment incorporates a detection function to detect contact or proximity of a detection target body with or to a display surface. As illustrated in FIG. 1, the display device 1 includes a display panel 10, a controller 11, a gate driver 12, a source driver 13, a drive circuit 14, and a detector 40.

The display panel 10 includes a plurality of pixels including display elements. The display panel 10 has the display surface facing the pixels. The display panel 10 receives a video signal, and displays an image formed by the pixels on the display surface.

The controller 11 is a circuit that controls mainly display operations by supplying control signals to the gate driver 12, the source driver 13, and the drive circuit 14 based on an externally supplied video signal Vdisp.

The gate driver 12 has a function to sequentially select one horizontal line as a target of display driving of the display panel 10 based on a control signal supplied from the controller 11.

The source driver 13 is a circuit that supplies a pixel signal Vpix to each sub-pixel SPix of the display panel 10 based on the control signal supplied from the controller 11. The present disclosure is, however, not limited to this configuration. The controller 11 may generate the pixel signal Vpix and supply the pixel signal Vpix to the source driver 13.

The drive circuit 14 supplies a display drive signal Vcomdc to a common electrode COML (refer to FIG. 7), a first drive signal VTP for detection to signal lines SGL or third electrodes 24 (refer to FIG. 8), and a second drive signal TSVcom to first electrodes 33 (refer to FIG. 8), based on the control signal supplied from the controller 11.

The controller 11 controls a detection operation to detect the detection target body, such as a finger or a touch pen of a user (hereinafter, simply called the detection target body in some cases), on or above the display panel 10. The display panel 10 has a function to detect a position of a finger in contact with or in proximity to the display surface of the display panel 10 based on the basic principle of touch detection using a mutual-capacitive touch detection method. The display panel 10 also has a function to detect a position of a touch pen in contact with or in proximity to the display surface based on the basic principle of touch detection using an electromagnetic induction method.

When having detected the contact or the proximity of the touch pen using the electromagnetic induction method, the display panel 10 outputs a first detection signal Vdet1 to the detector 40. When having detected the contact or the proximity of the finger using the mutual-capacitance method, the display panel 10 outputs a second detection signal Vdet2 to the detector 40.

During the electromagnetic induction touch detection, the detector 40 detects whether the display surface of the display panel 10 is touched by the touch pen based on the control signal supplied from the controller 11 and the first detection signal Vdet1 output from the display panel 10. During the mutual-capacitive touch detection, the detector 40 detects whether the display surface is touched by the finger based on the control signal supplied from the controller 11 and the second detection signal Vdet2 output from the display panel 10. If the display surface is touched, the detector 40 obtains, for example, coordinates where the touch input is performed.

As illustrated in FIG. 1, the detector 40 includes a first analog front-end circuit 47A (hereinafter, referred to as the first AFE 47A), a second analog front-end circuit 47B (hereinafter, referred to as the second AFE 47B), a signal processor 44, a coordinate extractor 45, and a detection timing controller 46.

The first AFE 47A includes a first amplifier 42A and a first analog-to-digital (A/D) converter 43A. The second AFE 47B includes a second amplifier 42B and a second A/D converter 43B. The first amplifier 42A amplifies the first detection signal Vdet1 supplied from the display panel 10. The first A/D converter 43A samples each analog signal output from the first amplifier 42A, and converts the analog signal into a digital signal at a time synchronized with the first drive signal VTP. The first AFE 47A is an analog signal processing circuit that converts the first detection signal Vdet1 into the digital signal, and outputs it to the signal processor 44. In the same manner, the second amplifier 42B amplifies the second detection signal Vdet2 supplied from the display panel 10. The second A/D converter 43B samples each analog signal output from the second amplifier 42B, and converts the analog signal into a digital signal at a time synchronized with the second drive signal TSVcom. The second AFE 47B is an analog signal processing circuit that converts the second detection signal Vdet2 into the digital signal, and outputs it to the signal processor 44.

The signal processor 44 is a logic circuit that detects whether the display panel 10 is touched, based on the output signals from the first AFE 47A and the second AFE 47B. The signal processor 44 performs processing of extracting a signal of difference (absolute value $|\Delta V|$) in each of the detection signals caused by the detection target body. The signal processor 44 compares the absolute value $|\Delta V|$ with a predetermined threshold voltage. If the absolute value $|\Delta V|$ is lower than this threshold voltage, the signal processor 44 determines that the detection target body is in a non-contact state. If, instead, the absolute value $|\Delta V|$ is equal to or higher than the threshold voltage, the signal processor 44 determines that the detection target body is in a contact state or a proximate state. In this manner, the detector 40 can perform the touch detection.

In this specification, the term "contact state" includes a state where the detection target body is in contact with the display surface and a state where the detection target body is so proximate to the display surface as to be treatable as in contact therewith, and the term "non-contact state" includes a state where the detection target body is not in contact with the display surface and a state where the detection target body is not so proximate to the display surface as to be treatable as in contact therewith.

The coordinate extractor 45 is a logic circuit that obtains touchscreen panel coordinates of the touch when the touch is detected by the signal processor 44. The coordinate extractor 45 outputs the touchscreen panel coordinates as an output signal Vout. The coordinate extractor 45 may output the output signal Vout to the controller 11. The controller 11 can perform a predetermined operation of display or detection based on the output signal Vout.

The detection timing controller 46 controls, based on the control signal supplied from the controller 11, the first and second AFEs 47A and 47B, the signal processor 44, and the coordinate extractor 45 so as to operate them in synchronization with one another.

The first and second AFEs 47A and 47B, the signal processor 44, the coordinate extractor 45, and the detection timing controller 46 of the detector 40 are mounted on the display device 1. The present disclosure is, however, not limited to this configuration. All or some of the functions of the detector 40 may be incorporated in an external processor or the like. For example, the signal processor 44 and the coordinate extractor 45 may be incorporated in an external controller 200 separate from the display device 1.

Figure 2:
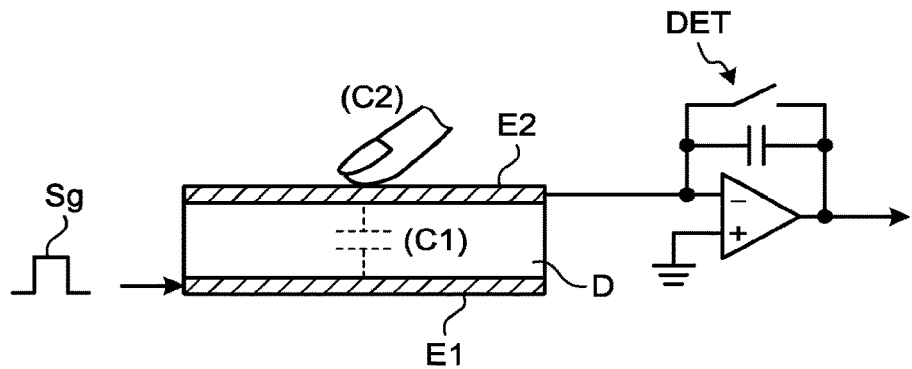
FIG. 2 is an explanatory diagram for explaining the basic principle of mutual-capacitive touch detection.

The display panel 10 performs touch control based on the basic principle of the capacitive touch detection and the touch control based on the basic principle of the electromagnetic induction touch detection. The following describes the basic principle of the touch detection using the mutual-capacitive touch detection method performed by the display panel 10 of this embodiment, with reference to FIG. 2. FIG. 2 is an explanatory diagram for explaining the basic principle of mutual-capacitive touch detection. FIG. 2 illustrates also a detection circuit. Although the following describes a case where the finger serving as the detection target body is in contact with or in proximity to the display surface, the detection target body is not limited to the finger, and may be, for example, a stylus pen.

For example, as illustrated in FIG. 2, a capacitive element C1 includes a pair of electrodes, that is, a drive electrode E1 and a detection electrode E2 that are disposed opposite to each other with a dielectric material D interposed therebetween. The capacitive element C1 generates lines of electric force between opposite surfaces of the drive electrode E1 and the detection electrode E2, and in addition, generates fringe components of the lines of electric force extending from ends of the drive electrode E1 toward the upper surface of the detection electrode E2. One end of the capacitive element C1 is coupled to an alternating-current signal source, and the other end thereof is coupled to a voltage detector DET. The voltage detector DET is included, for example, in the detector 40 illustrated in FIG. 1.

A square wave Sg having a predetermined frequency (ranging, for example, roughly from several kilohertz to several hundred kilohertz) is applied from the alternating-current signal source to the drive electrode E1 (at one end of the capacitive element C1). In the non-contact state, a current corresponding to the capacitance value of the capacitive element C1 flows in the voltage detector DET. The voltage detector DET converts variation in current corresponding to the square wave Sg into variation in voltage.

In the contact state, electrostatic capacitance C2 generated by the finger is in contact with the detection electrode E2 or is so proximate thereto as to be treatable as in contact therewith, as illustrated in FIG. 2. This condition causes the finger to interrupt the fringe components of the lines of electric force present between the drive electrode E1 and the detection electrode E2. This interruption causes the capacitive element C1 to act as a capacitive element having a smaller capacitance value than that in the non-contact state.

The amplitude of the voltage signal output from the voltage detector DET is smaller in the contact state than that in the non-contact state. The absolute value $|\Delta V|$ of the difference in the voltage signal varies depending on whether the detection target body is present. The detector 40 compares the absolute value $|\Delta V|$ with the predetermined threshold voltage to determine whether the detection target body is in the non-contact state, or in either the contact state or the proximate state.

Figure 3:
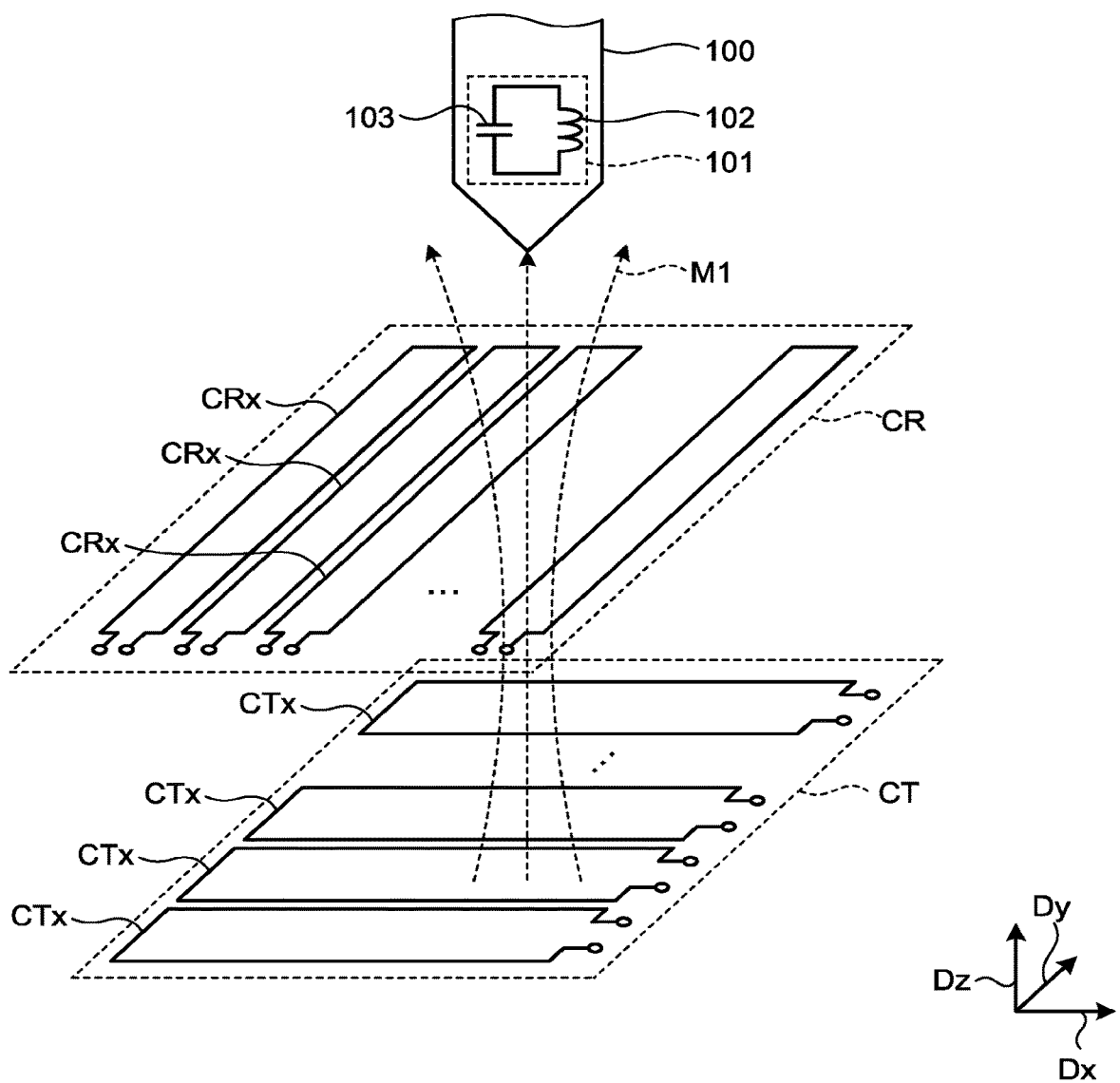
FIG. 3 is an explanatory diagram of a magnetic field generation period for explaining the basic principle of electromagnetic induction touch detection.
Figure 4:
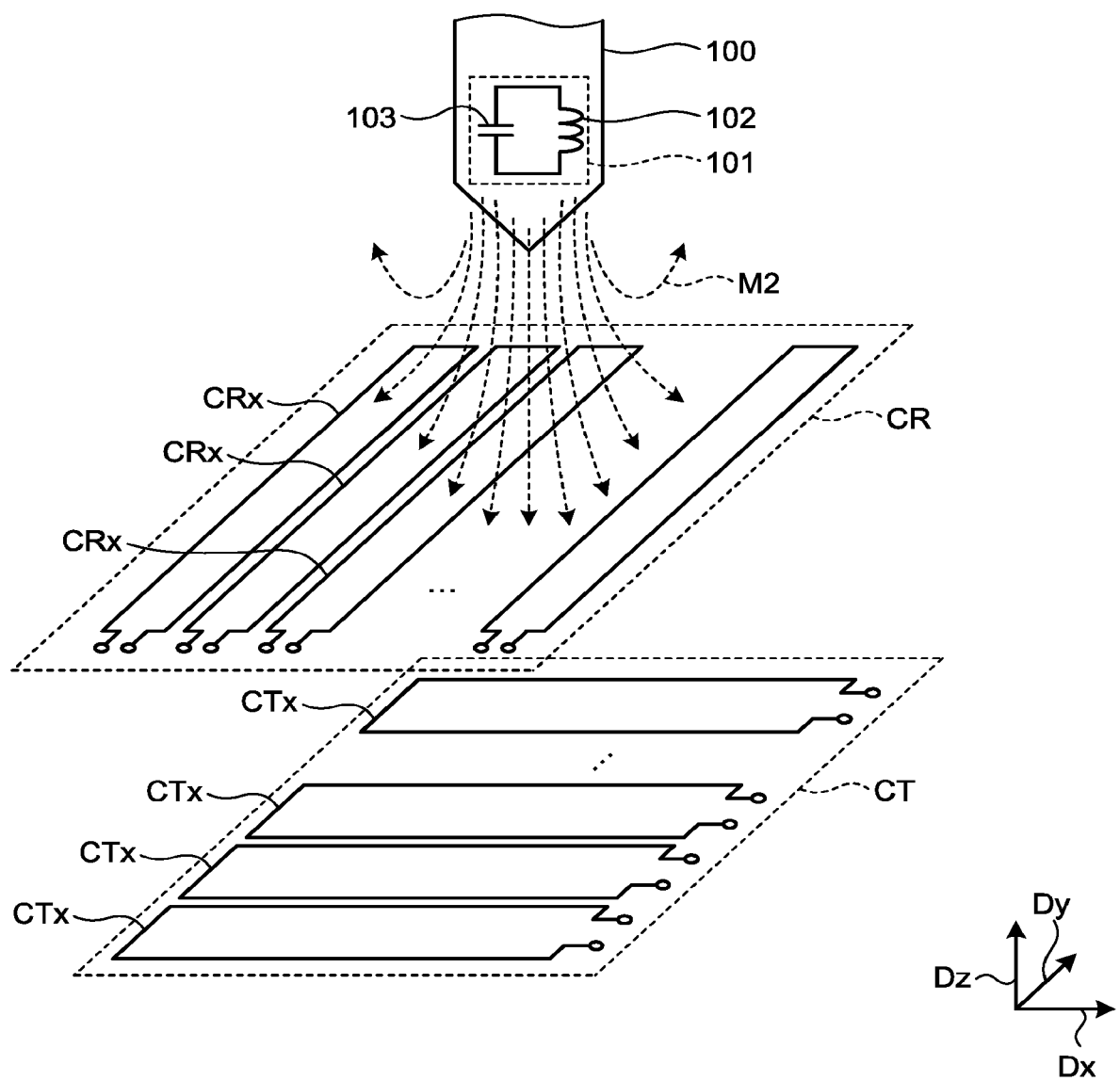
FIG. 4 is an explanatory diagram of a magnetic field detection period for explaining the basic principle of the electromagnetic induction touch detection.

The following describes the basic principle of the touch detection using the electromagnetic induction method performed by the display panel 10 of this embodiment, with reference to FIGS. 3 and 4. FIG. 3 is an explanatory diagram of a magnetic field generation period for explaining the basic principle of the electromagnetic induction touch detection. FIG. 4 is an explanatory diagram of a magnetic field detection period for explaining the basic principle of the electromagnetic induction touch detection.

As illustrated in FIGS. 3 and 4, in the electromagnetic induction touch detection, the contact or the proximity of a touch pen 100 is detected. A resonant circuit 101 is provided in the touch pen 100. The resonant circuit 101 is configured by coupling a coil 102 to a capacitive element 103 in parallel.

In the electromagnetic induction method, transmitting coils CT and receiving coils CR are provided so as to overlap with each other. Each transmitting coil CTx is formed to be longer in a first direction Dx. Each receiving coil CRx is formed to be longer in a second direction Dy. The receiving coils CRx are provided so as to intersect with the transmitting coils CTx in a plan view. The transmitting coil CTx is coupled to the alternating-current signal source (drive signal source). The receiving coil CRx is coupled to the voltage detector DET (refer to FIG. 2).

As illustrated in FIG. 3, during the magnetic field generation period, a square wave having a predetermined frequency (ranging, for example, roughly from several kilohertz to several hundred kilohertz) is applied from the alternating-current signal source to the transmitting coils CTx. As a result, a current flows in the transmitting coils CTx, and the transmitting coils CTx generate a magnetic field M1 corresponding to the change in current. When the touch pen 100 is in contact with or in proximity to the display surface, an electromotive force is generated in the coil 102 by mutual induction between the transmitting coils CTx and the coil 102, whereby the capacitive element 103 is charged.

Then, during the magnetic field detection period illustrated in FIG. 4, the coil 102 of the touch pen 100 generates a magnetic field M2 that varies with the resonant frequency of the resonant circuit 101. The magnetic field M2 passes through the receiving coils CRx, and as a result, an electromotive force is generated in the receiving coils CRx by mutual induction between the receiving coils CRx and the coil 102. A current corresponding to the electromotive force of the receiving coils CRx flows in the voltage detector DET. In this manner, the electromotive force is generated in the resonant circuit 101 of the touch pen 100 according to the magnetic field M1 generated in the transmitting coils CTx; the magnetic field M2 is generated in the coil 102 according to the electromotive force; and the electromotive force is generated in the receiving coils CRx according to the magnetic field M2. In view of the above description, the electromotive force of the receiving coils CRx can be said to be generated according to the magnetic field generated in the transmitting coils CTx. Although the description of the touch pen 100 and the magnetic field M2 will be omitted in following the embodiments, the magnetic field M1 generated in the transmitting coils CTx causes the generation of the electromotive force in the receiving coils CRx through the above-described process.

The voltage detector DET converts variation in current corresponding to the electromotive force of the receiving coil CRx into variation in voltage. As described above, the detector 40 compares the absolute value $|\Delta V|$ with the predetermined threshold voltage to determine whether the touch pen 100 is in the non-contact state, or in either the contact state or the proximate state. The detector 40 can detect the touch pen 100 based on the basic principle of the electromagnetic induction touch detection by scanning each of the transmitting coils CTx and the receiving coils CRx.

Figure 5:
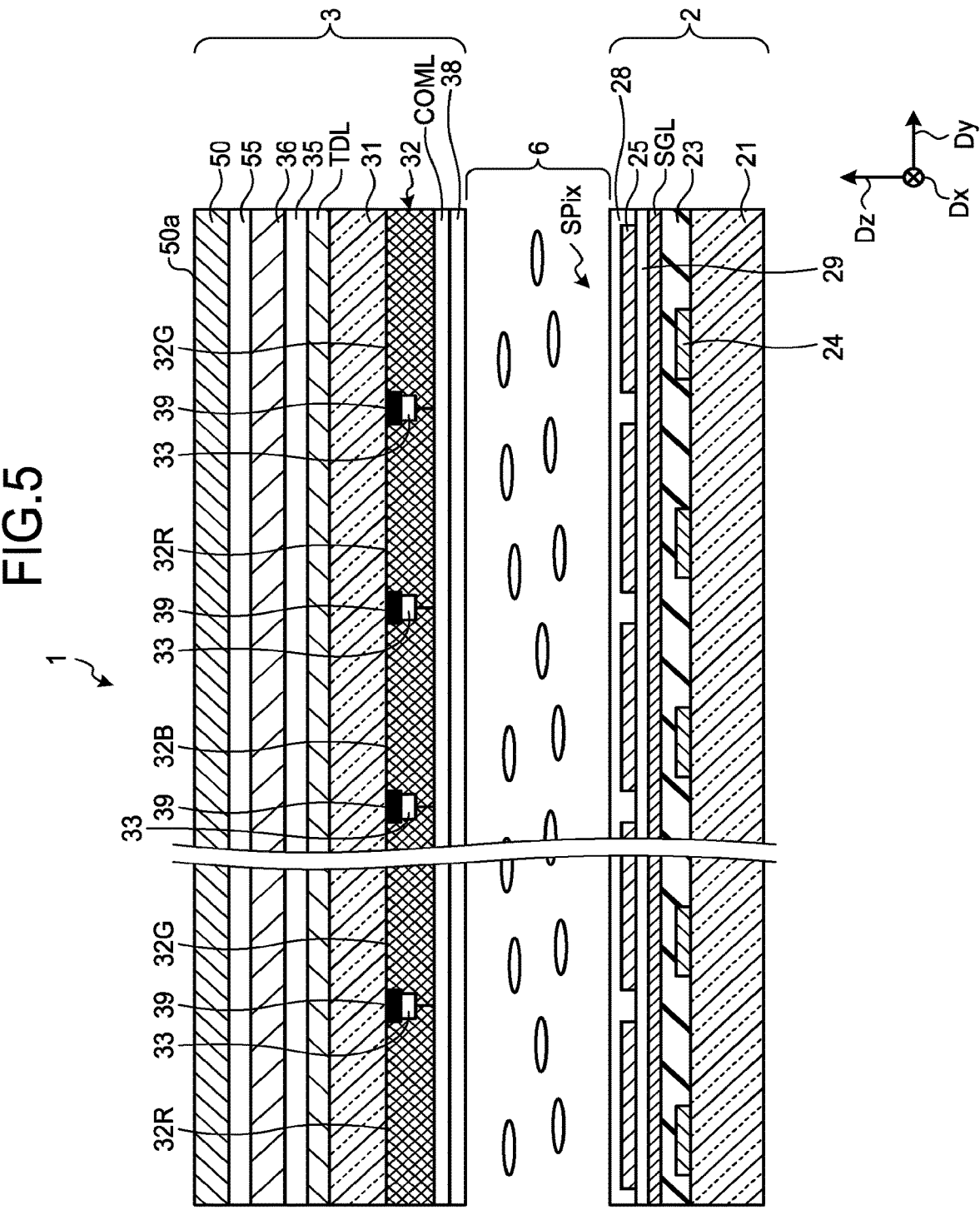
FIG. 5 is a schematic diagram illustrating a sectional structure of the display device according to the first embodiment.

The following describes a configuration example of the display device 1 of this embodiment. FIG. 5 is a schematic diagram illustrating a sectional structure of the display device according to the first embodiment. As illustrated in FIG. 5, the display device 1 includes a pixel substrate 2, a counter substrate 3, a liquid crystal layer 6 serving as a display functional layer, and a cover member 50. The counter substrate 3 is disposed so as to be opposed to a surface of the pixel substrate 2 in the vertical direction. The liquid crystal layer 6 is provided between the pixel substrate 2 and the counter substrate 3.

The cover member 50 is provided on a surface of the counter substrate 3. A first surface 50a of the cover member 50 is the display surface on which an image is displayed, and is a detection surface to which the detection target body comes in contact or proximity. In this embodiment, the touch detection includes a case of detecting the detection target body directly in contact with the first surface 50a. The touch detection also includes a case where the first surface 50a is provided thereon with a protective film (not illustrated), and the detection target body in contact with the protective film is detected.

The cover member 50 is bonded to a polarizing plate 36 with an adhesive layer 55 interposed therebetween. The cover member 50 may be a glass substrate or may be a film-like base material using a light-transmitting resin material or other materials. Light (external light) incident from outside on the first surface 50a side is reflected by pixel electrodes 25 in the pixel substrate 2 and is transmitted from the first surface 50a. The display device 1 of this embodiment is a reflective liquid crystal display device that displays the image using this reflected light.

In this specification, the first direction Dx refers to a direction parallel to the first surface 50a, and the second direction Dy refers to a direction intersecting with the first direction Dx in a plane parallel to the first surface 50a. A third direction Dz refers to a direction orthogonal to the first surface 50a. In this specification, in a direction orthogonal to a first substrate 21, the term "upper side" refers to a direction from the first substrate 21 toward a second substrate 31, and the term "lower side" refers to a direction from the second substrate 31 toward the first substrate 21. The term "plan view" refers to a case of viewing from a direction orthogonal to a surface of the first substrate 21.

The pixel substrate 2 includes the first substrate 21, the third electrodes 24, the pixel electrodes 25, the signal lines SGL, an insulating layer 23, a planarizing film 29, and an orientation film 28. The third electrodes 24, the signal lines SGL, and the pixel electrodes 25 are provided in this order to the first substrate 21. For example, a glass substrate is used as the first substrate 21. The first substrate 21 is provided with circuit elements and various types of wiring, such as gate lines GCL, which are not illustrated, in addition to the signal lines SGL. The circuit elements include switching elements, such as thin-film transistors (TFTs), and capacitive elements.

The pixel electrodes 25 are provided on the planarizing film 29. The orientation film 28 is disposed on the outermost surface of the pixel substrate 2, and is provided between the pixel electrodes 25 and the liquid crystal layer 6. The pixel electrodes 25 are made of, for example, a metal, such as aluminum (Al) or silver (Ag). The pixel electrodes 25 may also have a configuration stacked with such a metal material and a light-transmitting conductive material, such as indium tin oxide (ITO). The pixel electrodes 25 are made of a material having good reflectance, and are provided as reflective electrodes that diffusively reflect the light incident from outside.

The third electrodes 24 are provided between the first substrate 21 and the pixel electrodes 25 in the direction orthogonal to the surface of the first substrate 21. The third electrodes 24 are provided so as to overlap the pixel electrodes 25 with the insulating layer 23 and the planarizing film 29 in between. This configuration generates a retention capacitance 53 (refer to FIG. 6) between the third electrodes 24 and the pixel electrodes 25. In this embodiment, the third electrodes 24 also serve as the receiving coils CRx (refer to FIGS. 3 and 4) of the display panel 10.

The counter substrate 3 includes the second substrate 31, a color filter 32 provided on one surface of the second substrate 31, a light-shielding layer 39, the first electrodes 33, the common electrode COML, an orientation film 38, second electrodes TDL provided on the other surface of the second substrate 31, an insulating layer 35, and the polarizing plate 36. In this embodiment, the second substrate 31 is, for example, a glass substrate or a resin substrate. Each of the first electrodes 33 serves as the drive electrode E1 (refer to FIG. 2) of the display panel 10. Each of the second electrodes TDL serves as the detection electrode E2 (refer to FIG. 2) of the display panel 10.

The color filter 32 is opposed to the liquid crystal layer 6 in the direction orthogonal to the first substrate 21. The color filter 32 may be disposed on the first substrate 21. The color filter 32 includes, for example, three filters having a color region 32R (red), a color region 32G (green), and a color region 32B (blue). The color filter 32 may include a white (W) filter, or may include filters having five or more different colors. The light-shielding layer 39 is provided at boundary portions between the color regions 32R, 32G, and 32B. The light-shielding layer 39 is a colored resin layer or metal layer commonly called a black matrix. The first electrodes 33 are provided so as to overlap with the light-shielding layer 39, and are disposed between the second substrate 31 and the color filter 32.

The common electrode COML is provided on a side of the second substrate 31 opposite to another side thereof facing the second electrodes TDL. The common electrode COML is provided between the color filter 32 and the liquid crystal layer 6 in the direction orthogonal to the first substrate 21. The common electrode COML is made of a light-transmitting conductive material, such as ITO.

The liquid crystal layer 6 includes, for example, nematic liquid crystals. Liquid crystal molecules of the liquid crystal layer 6 are stationary in an initial orientation state while no electric field is generated between the common electrode COML and the pixel electrodes 25. During a display period Pd (refer to FIG. 9), the level of a voltage between the common electrode COML and each of the pixel electrodes 25 is changed, and an electric field is generated between the common electrode COML and the pixel electrode 25. As a result, the orientation of the liquid crystal molecules changes from the initial orientation. The electric field can differ between the pixel electrodes 25. Accordingly, light passing through the liquid crystal layer 6 is modulated on a per sub-pixel SPix basis.

With the configuration described above, the first substrate 21, the third electrodes 24, the pixel electrodes 25, the liquid crystal layer 6 serving as the display functional layer, the common electrode COML, and the second electrodes TDL are stacked in this order. The second substrate 31 serving as an insulating substrate is provided between the first electrodes 33 with the common electrode COML and the second electrodes TDL. The incident light incident from the first surface 50a side of the display device 1 passes through the counter substrate 3 and the liquid crystal layer 6, and reaches the pixel electrodes 25. The incident light is reflected by the pixel electrodes 25. The light reflected by the pixel electrodes 25 passes through the liquid crystal layer 6 to be modulated on a per sub-pixel SPix basis, and is transmitted from the first surface 50a.

Since the display device 1 is a reflective display device that performs display by reflecting the external light, a light source, such as a frontlight or a backlight, is not provided. The display device 1 is, however, not limited to this configuration, and may have a light source, such as the frontlight or the backlight. In this case, the frontlight is provided on the first surface 50a side, or the backlight is provided on the back surface of the pixel substrate 2, that is, on a side of the first substrate 21 opposite to another side thereof facing the liquid crystal layer 6. When the backlight is used, light from the backlight passes between the pixel electrodes 25 to reach the first surface 50a. The light from the backlight serves as auxiliary light.

Figure 6:
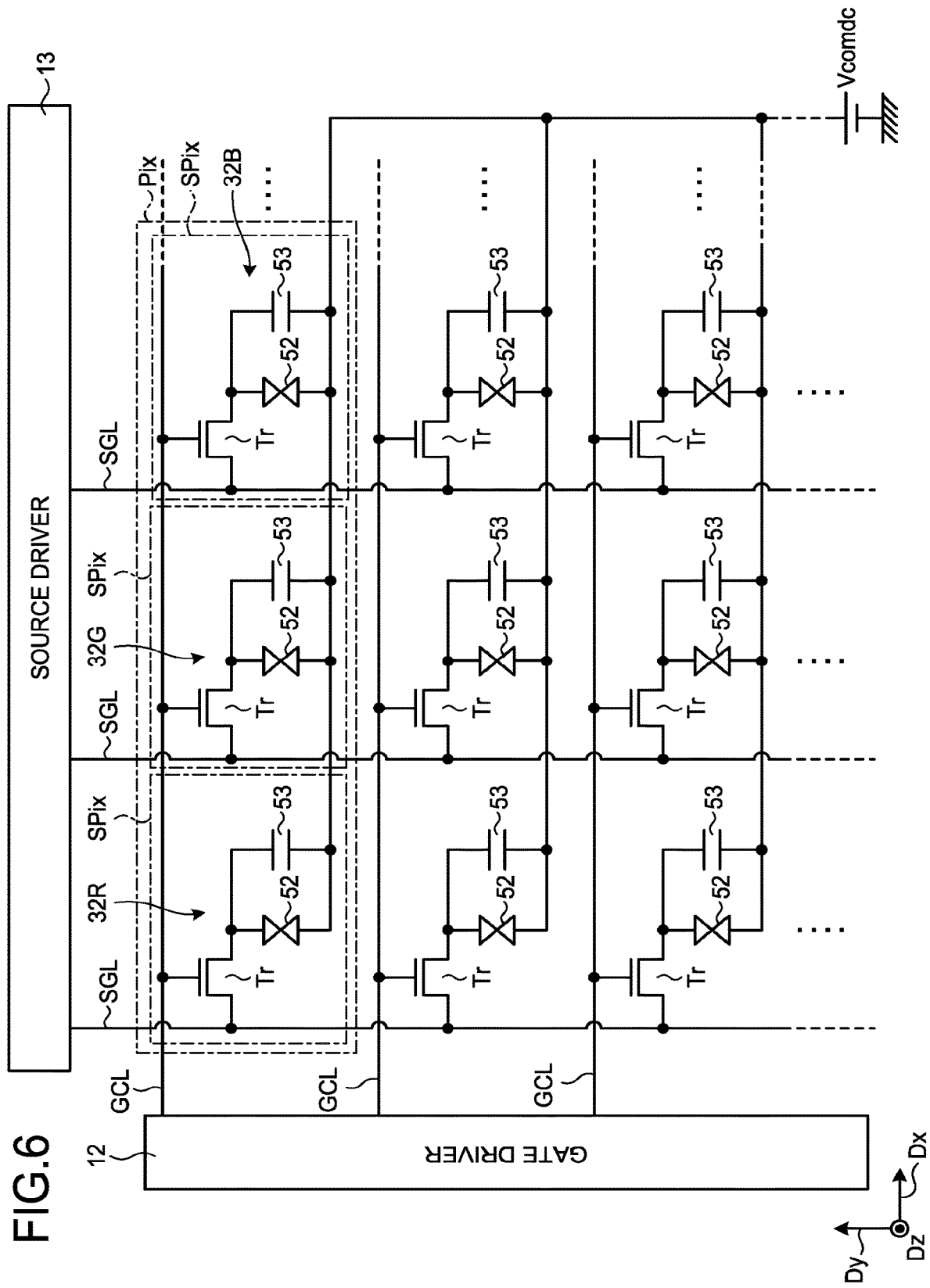
FIG. 6 is a circuit diagram illustrating a pixel array of the display device according to the first embodiment.

The following describes the display operation of the display device 1. FIG. 6 is a circuit diagram illustrating a pixel array of the display device according to the first embodiment. The first substrate 21 illustrated in FIG. 5 is provided with switching elements Tr of the respective sub-pixels SPix and wiring, such as the signal lines SGL for supplying the pixel signals Vpix to the corresponding pixel electrodes 25 and the gate lines GCL for supplying the drive signals for driving the switching elements Tr. The gate lines GCL and the signal lines SGL are provided so as to intersect with each other. The gate lines GCL and the signal lines SGL partition a display region Ad (refer to FIG. 7) into a matrix having a row-column configuration. Each of the partitioned regions is referred to as the sub-pixel SPix.

As illustrated in FIG. 6, the display device 1 includes the sub-pixels SPix arranged in a matrix having a row-column configuration. Each of the sub-pixels SPix includes the switching element Tr, a liquid crystal element 52, and the retention capacitor 53. The sub-pixel SPix is provided with the pixel electrode 25 (refer to FIG. 5), and the pixel electrode 25 is coupled to the switching element Tr. The switching element Tr is fabricated from a thin-film transistor (TFT), and in the present example, fabricated from an n-channel metal oxide semiconductor (MOS) TFT. The liquid crystal element 52 includes liquid crystal capacitance generated between the pixel electrode 25 and the common electrode COML. Capacitance generated between the pixel electrodes 25 and the third electrode 24 can be used as the retention capacitance 53. The sub-pixel SPix is not limited to this configuration, but may be provided with a capacitive element.

The gate lines GCL are coupled to the gate driver 12. The gate driver 12 sequentially selects the gate lines GCL. The gate driver 12 applies a scan signal Vscan (refer to FIG. 1) to the gate of each of the switching elements Tr through the selected one of the gate lines GCL. This operation sequentially selects one row (one horizontal line) of the sub-pixels SPix as a target of display driving. The signal lines SGL are coupled to the source driver 13. The source driver 13 supplies the pixel signal Vpix to each of the sub-pixels SPix included in the selected one horizontal line through the signal lines SGL. These sub-pixels SPix perform display of each horizontal line according to the supplied pixel signals Vpix.

When this display operation is performed, the drive circuit 14 (refer to FIG. 1) applies the display drive signal Vcomdc to the common electrode COML and the third electrodes 24. As a result, the common electrode COML and the third electrodes 24 serve as common electrodes for the pixel electrodes 25 during the display operation.

The color regions 32R, 32G, and 32B of the three colors of R, G, and B correspond to the sub-pixels SPix illustrated in FIG. 6 described above. The combination of the color regions 32R, 32G, 32B is regarded as a set. The sub-pixels SPix corresponding to the color regions 32R, 32G, and 32B of the three colors as a set constitute a pixel Pix.

Figure 7:
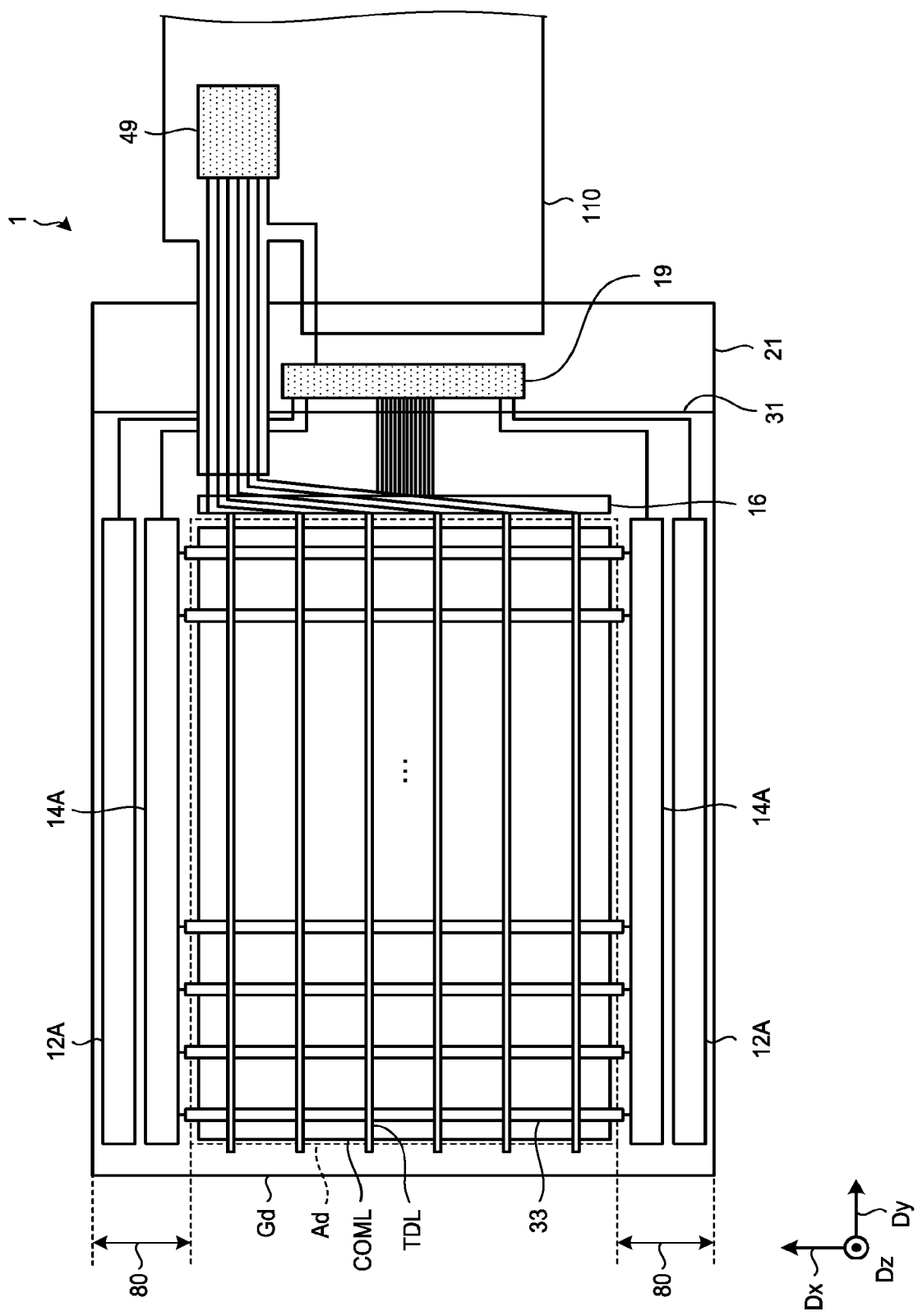
FIG. 7 is a plan view schematically illustrating the display device according to the first embodiment.

The following describes the configuration of the first electrodes 33, the second electrodes TDL, and the common electrode COML and the touch detection operation. FIG. 7 is a plan view schematically illustrating the display device according to the first embodiment. As illustrated in FIG. 7, the display device 1 is provided with the display region Ad and a peripheral region Gd. In this specification, the display region Ad is a region for displaying the image, and is a region overlapping with the pixels Pix (sub-pixels SPix). In this embodiment, a direction along a long side of the display region Ad is assumed to be the second direction Dy, and a direction intersecting with the second direction Dy is assumed to be the first direction Dx.

As illustrated in FIG. 7, the first electrodes 33, the second electrodes TDL, and the common electrode COML are provided in the display region Ad. The common electrode COML is continuously provided over the entire area of the display region Ad. The first electrodes 33 extend along the first direction Dx, and are arranged in the second direction Dy. The second electrodes TDL extend along the second direction Dy, and are arranged in the first direction Dx. That is, the first electrodes 33 and the second electrodes TDL are provided so as to intersect with each other in the plan view. Both the first electrodes 33 and the second electrodes TDL are formed into strips. Electrostatic capacitance is generated at intersecting portions between the first electrodes 33 and the second electrodes TDL, and at the peripheries of the intersecting portions.

A metal material having good conductivity is used as the first electrodes 33. The second electrodes TDL are made by forming thin metal wires having a width of several micrometers to several tens of micrometers into zigzag lines, wavy lines, or a mesh. In the same manner as the common electrode COML, the second electrodes TDL may be made of a light-transmitting conductive material, such as ITO.

As illustrated in FIG. 7, a flexible substrate 110 is coupled to the first substrate 21 and the second substrate 31 in the peripheral region Gd. The flexible substrate 110 is provided with a touch integrated circuit (IC) 49 for controlling the detection operation of the display panel 10. Each of The second electrodes TDL is electrically coupled to the touch IC 49. In addition, the first substrate 21 in the peripheral region Gd is provided with a driver IC 19 for controlling the display operation of the display panel 10. The common electrode COML is electrically coupled to the driver IC 19. The various circuits, such as the source driver 13 and the drive circuit 14, illustrated in FIG. 1 are provided in the driver IC 19. A multiplexer 16 is provided between the driver IC 19 and the display region Ad. The first and second AFEs 47A and 47B illustrated in FIG. 1 are provided in the touch IC 49.

Each of the long sides of the peripheral region Gd of the first substrate 21 is provided with various circuits, such as a gate scan circuit 12A and a first electrode scan circuit 14A. The gate scan circuit 12A is included in the gate driver 12 (refer to FIG. 1), and sequentially selects the gate lines GCL. The first electrode scan circuit 14A is a circuit that sequentially or simultaneously selects the first electrodes 33. The first electrode scan circuit 14A is electrically coupled to the first electrodes 33, and supplies various drive signals from the driver IC 19 to the first electrodes 33. A region of the peripheral region Gd provided with the gate scan circuit 12A and the first electrode scan circuit 14A serves as a peripheral circuit region 80.

With this configuration, when the mutual-capacitive touch detection is performed, the driver IC 19 supplies the second drive signal TSVcom to the first electrodes 33 in a time-division manner. In this case, the first electrode scan circuit 14A may simultaneously select more than one of the first electrodes 33 as a first electrode block Bk, and sequentially supply the second drive signal TSVcom to the first electrode block Bk on a block-by-block basis (refer to FIG. 14). The second detection signal Vdet2 corresponding to a change in electrostatic capacitance between the first electrodes 33 and the second electrodes TDL is output from the second electrodes TDL to the second touch IC 49. Thus, the touch of the detection target body is detected. That is, each of the first electrodes 33 corresponds to the drive electrode E1, and each of the second electrodes TDL corresponds to the detection electrode E2, in the basic principle of the mutual-capacitive touch detection described above.

Figure 8:
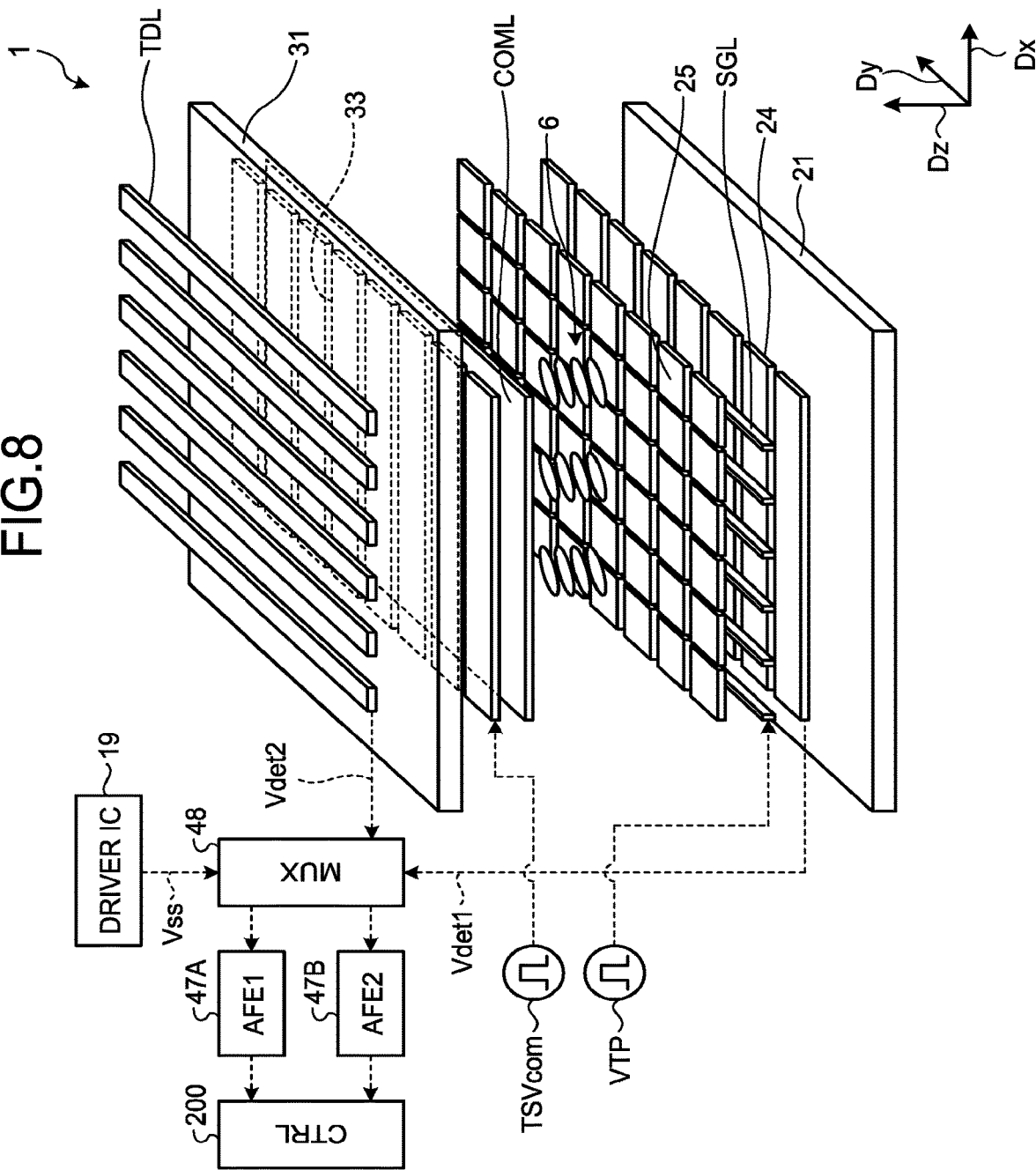
FIG. 8 is an exploded perspective view of the display device according to the first embodiment.

FIG. 8 is an exploded perspective view of the display device according to the first embodiment. As illustrated in FIG. 8, the third electrodes 24 are disposed between the first substrate 21 and the pixel electrodes 25. The third electrodes 24 extend along the first direction Dx, and are arranged in the second direction Dy. The signal lines SGL are disposed between the first substrate 21 and the liquid crystal layer 6. The signal lines SGL extend along the second direction Dy, and are arranged in the first direction Dx. The third electrodes 24 are provided so as to intersect with the signal lines SGL in the plan view. The first electrodes 33 and the second electrodes TDL are disposed facing one surface side of the common electrode COML, and the signal lines SGL and the third electrodes 24 are disposed facing the other surface side of the common electrode COML. The first electrodes 33 are provided so as to intersect with the signal lines SGL in the plan view, and extend along the third electrodes 24. The second electrodes TDL are provided so as to intersect with the first electrodes 33 and the third electrodes 24 in the plan view, and extend along the signal lines SGL.

The first AFE 47A is electrically coupled to the third electrodes 24 through a multiplexer 48. The second AFE 47B is electrically coupled to the second electrodes TDL through the multiplexer 48. The driver IC 19 supplies a switching signal Vss to the multiplexer 48. The multiplexer 48 is a circuit that changes the coupling states of the third electrodes 24 and the second electrodes TDL to the first AFE 47A and the second AFE 47B based on the switching signal Vss. The multiplexer 48 couples the third electrodes 24 to the first AFE 47A when the electromagnetic induction method is used, and couples the second electrodes TDL to the second AFE 47B when the mutual-capacitance method is used. The multiplexer 48 may be provided on the second substrate 31, or provided in the touch IC 49. The output signals from the first and second AFEs 47A and 47B are supplied to the external controller 200. The controller 200 is, for example, a host IC mounted on a control board.

When the electromagnetic induction touch detection is performed, the driver IC 19 supplies the first drive signal VTP to the signal lines SGL. The signal lines SGL serve as the transmitting coils CTx when the electromagnetic induction touch detection is performed. As a result, the electromagnetic induction is generated among the signal lines SGL, the touch pen 100, and the third electrodes 24. The electromotive force is generated in the third electrodes 24 by the mutual induction with the touch pen 100. The first detection signal Vdet1 corresponding to the electromotive force is supplied from the third electrodes 24 to the first AFE 47A through the multiplexer 48. As a result, the electromagnetic induction touch detection is performed.

When the mutual-capacitive touch detection is performed, the driver IC 19 supplies the second drive signal TSVcom to the first electrodes 33. The second detection signal Vdet2 corresponding to the change in electrostatic capacitance between the first electrodes 33 and the second electrodes TDL is supplied from the second electrodes TDL to the second AFE 47B through the multiplexer 48. As a result, the mutual-capacitive touch detection is performed.

In this embodiment, the signal lines SGL and the third electrodes 24 used for the electromagnetic induction touch detection are disposed on a first side of the common electrode COML, and the first electrodes 33 and the second electrodes TDL used for the mutual-capacitive touch detection are disposed on a second side of the common electrode COML opposite to the first side thereof. The first electrodes 33 and the second electrodes TDL are disposed on the second side of the common electrode COML, and the liquid crystal layer 6, the pixel electrodes 25, the signal lines SGL, and the third electrodes 24 are disposed on the first side of the common electrode COML. This configuration can restrain the electric field generated from the first electrodes 33 from affecting the liquid crystal layer 6 when the second drive signal TSVcom is supplied to the first electrodes 33. As a result, the mutual-capacitive touch detection can be performed synchronously or asynchronously with the display period.

Figure 9:
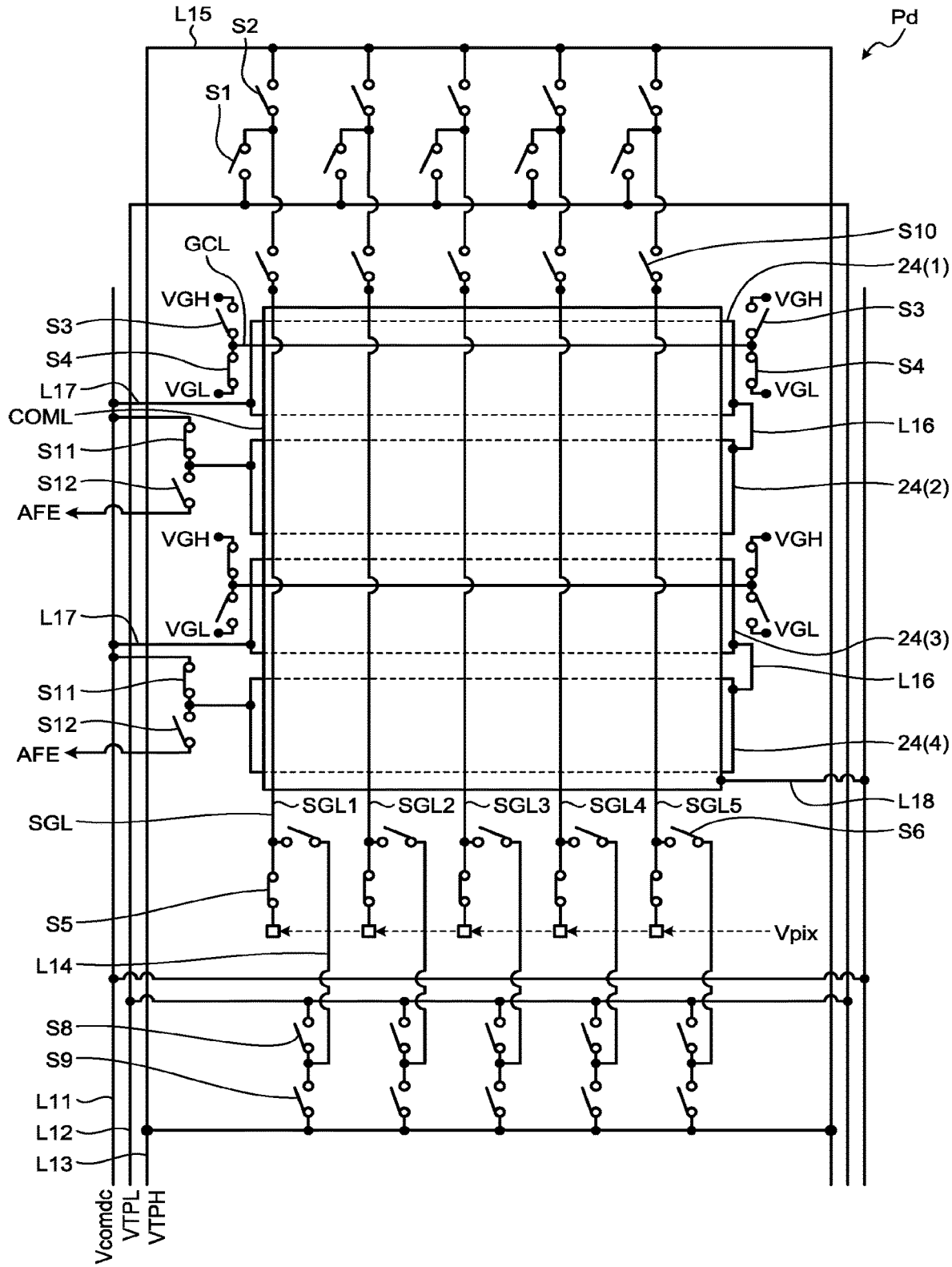
FIG. 9 is a circuit diagram illustrating a coupling configuration of signal lines, third electrodes, and common electrode during a display period.
Figure 10:
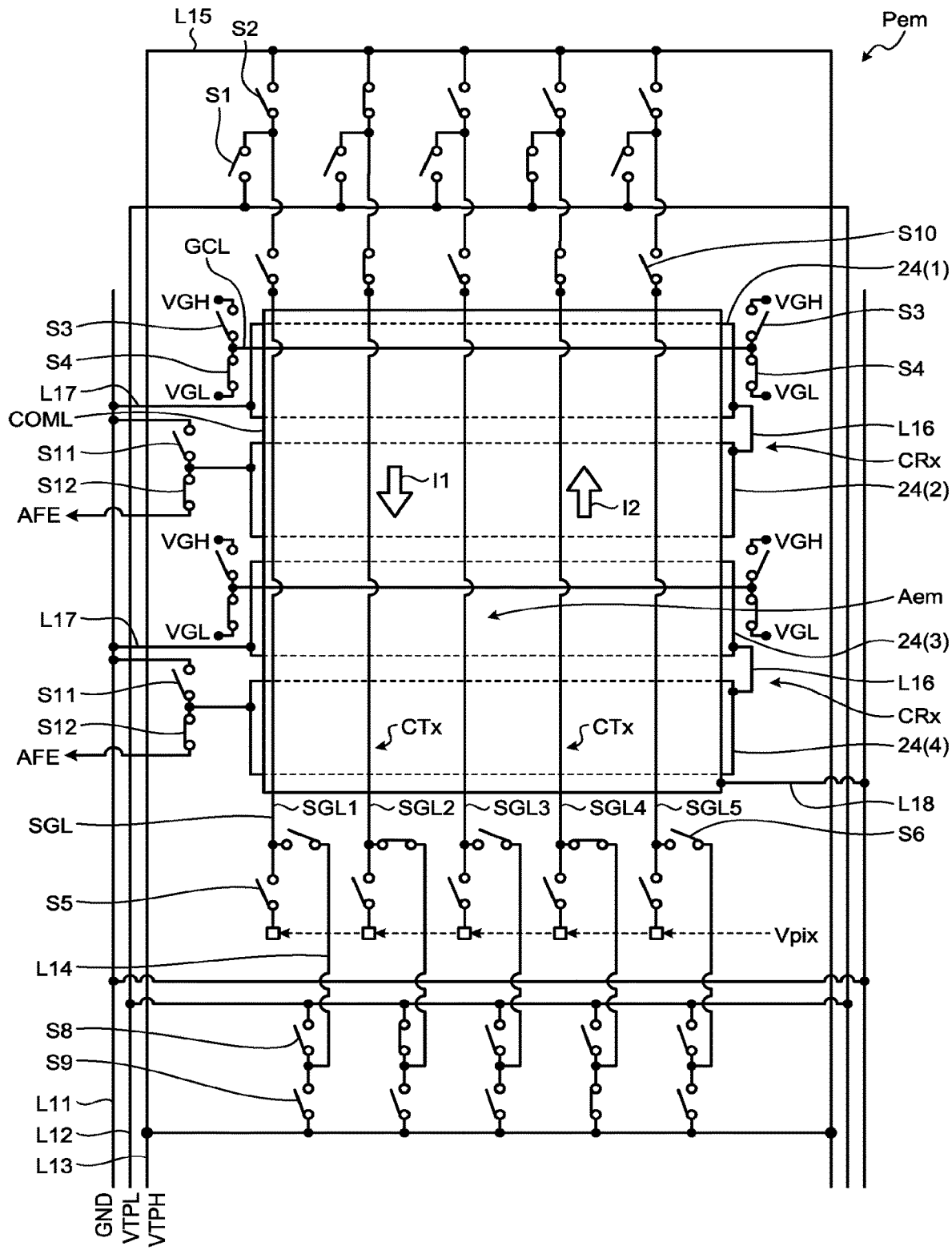
FIG. 10 is a circuit diagram illustrating a coupling configuration of the signal lines, the third electrodes, and the common electrode during a first sensing period.
Figure 11:
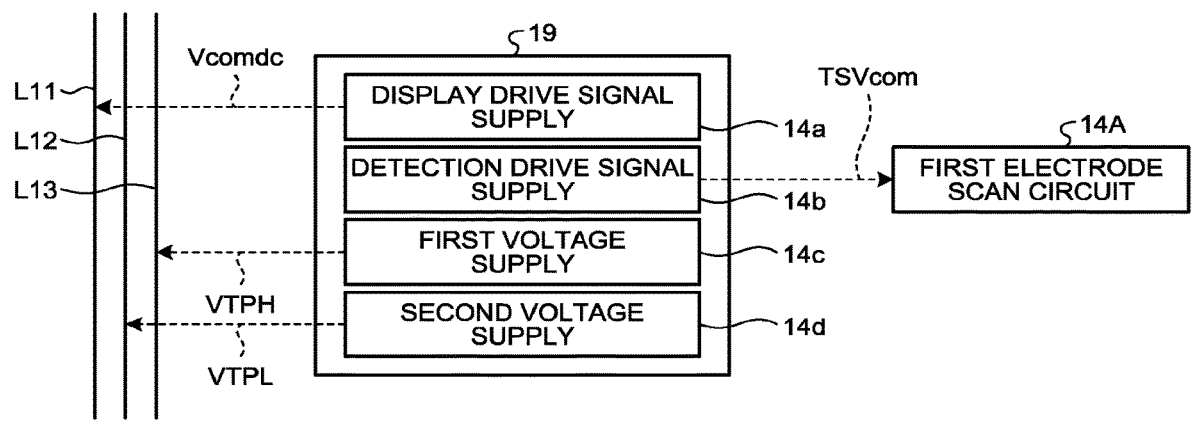
FIG. 11 is a block diagram illustrating a configuration example of supplies for supplying various signals.

The signal lines SGL have the function to supply the pixel signals Vpix during the display and the function of the transmitting coils CTx when the electromagnetic induction method is used. The third electrodes 24 have the function as the common electrodes during the display and the function of the receiving coils CRx when the electromagnetic induction method is used. Therefore, the coupling state thereof needs to be changed according to the operations of the respective functions. The following describes coupling configurations of the signal lines SGL and the third electrodes 24. FIG. 9 is a circuit diagram illustrating a coupling configuration of the signal lines, the third electrodes, and the common electrodes during the display period. FIG. 10 is a circuit diagram illustrating a coupling configuration of the signal lines, the third electrodes, and the common electrodes during a first sensing period. FIG. 11 is a block diagram illustrating a configuration example of supplies for supplying various signals.

As illustrated in FIGS. 9 and 10, a plurality of signal lines SGL1, SGL2, SGL3, SGL4, and SGL5 are arranged. In the following description, the signal lines SGL1, SGL2, SGL3, SGL4, and SGL5 will each be referred to as a signal line SGL when they need not be distinguished from one another. A plurality of third electrodes 24(1), 24(2), 24(3), and 24(4) are arranged so as to intersect with the signal lines SGL. In the following description, the third electrodes 24(1), 24(2), 24(3), and 24(4) will each be referred to as a third electrode 24 when they need not be distinguished from one another. The common electrode COML is provided so as to overlap with the signal lines SGL and the third electrodes 24.

As illustrated in FIGS. 9 and 10, the display drive signal Vcomdc is supplied to the common electrode COML through wiring L11. A second voltage VTPL is supplied to the signal lines SGL through wiring L12. A first voltage VTPH is supplied to the signal lines SGL through wiring L13. Wiring L14 couples the signal lines SGL to the wiring L12 and L13. Wiring L15 couples the ends on the same sides of the signal lines SGL to one another.

As illustrated in FIG. 11, the driver IC 19 supplies the various signals to the signal lines SGL, the third electrodes 24, the common electrode COML, and the first electrodes 33 (refer to FIG. 8) through the wiring L11, L12, and L13 and the first electrode scan circuit 14A. The drive circuit 14 (refer to FIG. 1) includes a display drive signal supply 14a, a detection drive signal supply 14b, a first voltage supply 14c, and a second voltage supply 14d. These supplies 14a to 14d are incorporated in the driver IC 19.

The display drive signal supply 14a supplies the display drive signal Vcomdc to the common electrode COML and the third electrodes 24 through the wiring L11. The detection drive signal supply 14b supplies the second drive signal TSVcom for detection to the first electrodes 33 through the first electrode scan circuit 14A. The first voltage supply 14c supplies the first voltage VTPH of a direct current having a first potential to the signal lines SGL through the wiring L13. The second voltage supply 14d supplies the second voltage VTPL to the signal lines SGL through the wiring L12. The second voltage VTPL is a direct-current voltage signal having a second potential lower than the first potential.

As illustrated in FIGS. 9 and 10, a switch S1 is provided between the wiring L12 and one end of the signal line SGL. A switch S2 is provided between the wiring L15 and one end of the signal line SGL. In the following description, one end of each of the signal lines SGL is referred to as the upper end, and the other end thereof is referred to as the lower end, with reference to FIGS. 9 and 10. A high-level voltage VGH of the scan signal Vscan (refer to FIG. 1) is supplied to the gate lines GCL through switches S3. A low-level voltage VGL of the scan signal Vscan is supplied to the gate lines GCL through switches S4. The pixel signals Vpix are supplied to the signal lines SGL through switches S5.

Switches S6 are provided between the signal lines SGL and the wiring L14. Switches S8 are provided between the wiring L12 and the wiring L14 coupled to the signal lines SGL. Switches S9 are provided between the wiring L13 and the wiring L14 coupled to the signal lines SGL. Switches S10 are provided on the upper ends of the signal lines SGL, and provided between the signal lines SGL and the wiring L12 and L13.

Of a pair of the third electrodes 24(1) and 24(2), one end of the third electrode 24(1) is coupled to the wiring L11 through wiring L17. In the following description, one end of the third electrode 24 is referred to as the left end, and the other end thereof is referred to as the right end, with reference to FIGS. 9 and 10. The right ends on the same side of the third electrodes 24(1) and 24(2) are coupled to each other through wiring L16. As a result, the pair of the third electrodes 24(1) and 24(2) are coupled together so as to form a loop. The left end of the third electrode 24(2) is coupled to the wiring L11 through a switch S11, or coupled to the first AFE 47A through a switch S12. A pair of the third electrodes 24(3) and 24(4) are coupled together so as to form a loop in the same manner.

As illustrated in FIGS. 9 and 10, the common electrode COML is coupled to the wiring L11 through wiring L18. During the display period Pd, the common electrode COML is coupled to the display drive signal supply 14a (refer to FIG. 11) through the wiring L18 and L11. As a result, the display drive signal Vcomdc is supplied to the common electrode COML through the wiring L11.

During the display period Pd, the switches S11 are turned on and the switches S12 are turned off in response to the control signal from the controller 11. As a result, the left end of each of the third electrodes 24 is coupled to the wiring L11 through the wiring L17 or the switch S11. As a result, the display drive signal Vcomdc is supplied to each of the third electrodes 24 through the wiring L11. In this manner, the display drive signal Vcomdc is supplied to the common electrode COML, and also to the third electrodes 24 opposed to the common electrode COML.

The switches S3 and the switches S4 coupled to the gate lines GCL operate in a manner inverted from each other. The switches S3 are sequentially turned on to supply the high-level voltage VGH of the scan signal Vscan to a selected one of the gate lines GCL. The other of the gate lines GCL not selected are supplied with the low-level voltage VGL. The switches S5 are turned on to supply the pixel signals Vpix to the signal lines SGL.

During the display period Pd, the switches S6 and S10 are turned off to uncouple the signal lines SGL from the wiring L11, L12, and L13. As a result, the first voltage VTPH and the second voltage VTPL are not supplied to the signal lines SGL.

As described above, during the display period Pd, the pixel signals Vpix are supplied to the pixel electrodes 25 through the signal lines SGL, and the display drive signal Vcomdc as a common signal is supplied to the common electrode COML and the third electrodes 24.

As illustrated in FIG. 10, during a first sensing period Pem in which the electromagnetic induction touch detection is performed, the switches S5 are turned off and two of the switches S6 and two of the switches S10 are turned on in response to the control signal from the controller 11. As a result, two of the signal lines SGL are coupled to the supplies illustrated in FIG. 11 through the wiring L12, L13, and L15.

The following specifically describes a case illustrated in FIG. 10 where the signal lines SGL2 and SGL4 form the transmitting coil CTx (refer to FIG. 3). A region between the signal lines SGL2 and SGL4 serves as a detection region Aem. Specifically, the switches S10 coupled to the upper ends of the signal lines SGL2 and SGL4 are turned on. The switches S6 coupled to the lower ends of the signal lines SGL2 and SGL4 are also turned on.

On the upper end side of the signal line SGL2, the switch S1 is turned off, and the switch S2 is turned on. As a result, the upper end of the signal line SGL2 is electrically coupled to the wiring L15 and L13. On the lower end side of the signal line SGL2, the switch S8 is turned on, and the switch S9 is turned off. As a result, the lower end of the signal line SGL2 is electrically coupled to the wiring L12.

On the upper end side of the signal line SGL4, the switch S1 is turned on, and the switch S2 is turned off. As a result, the upper end of the signal line SGL4 is electrically coupled to the wiring L12. On the lower end side of the signal line SGL4, the switch S8 is turned off, and the switch S9 is turned on. As a result, the lower end of the signal line SGL4 is electrically coupled to the wiring L13.

As a result, during the first sensing period Pem, in response to the control signal from the controller 11, the first voltage supply 14c (refer to FIG. 11) is coupled to the upper end of at least one of the signal lines SGL (signal line SGL2), and the second voltage supply 14d (refer to FIG. 11) is coupled to the lower end thereof. In addition, the second voltage supply 14d is coupled to the upper end of the signal line SGL (signal line SGL4) different from the at least one of the signal lines SGL (signal line SGL2), and the first voltage supply 14c is coupled to the lower end thereof.

The first voltage supply 14c supplies the first voltage VTPH to the upper end of the signal line SGL2 through the wiring L13 and L15. The second voltage supply 14d supplies the second voltage VTPL to the lower end of the signal line SGL2 through the wiring L12. As a result, a potential difference is generated between the upper end and the lower end of the signal line SGL2 to cause a current I1 to flow in a direction from the upper end toward the lower end thereof.

The first voltage supply 14c supplies the first voltage VTPH to the lower end of the signal line SGL4 through the wiring L13 and L14. The second voltage supply 14d supplies the second voltage VTPL to the upper end of the signal line SGL4 through the wiring L12. As a result, a potential difference is generated between the upper end and the lower end of the signal line SGL4 to cause a current I2 to flow in a direction from the lower end toward the upper end thereof.

In this embodiment, the first voltage VTPH and the second voltage VTPL supplied to both ends of the signal lines SGL are changed over to each other at a predetermined frequency by switching the operations of the switches S1, S2, S8, and S9. As a result, the signal lines SGL are supplied with the first drive signal VTP serving as an alternating-current voltage signal.

The currents I1 and I2 flowing in the signal lines SGL generate the magnetic field to cause the electromagnetic induction. As illustrated in FIG. 10, the currents I1 and I2 flow in directions opposite to each other. As a result, the magnetic field generated by the current I1 overlaps with the magnetic field generated by the current I2 in the detection region Aem. This overlap can increase the strength of the magnetic field passing through the detection region Aem. The magnetic fields generated by the current I1 and the current I2 correspond to the magnetic field M1 generated during the magnetic field generation period of the electromagnetic induction method illustrated in FIG. 3. The signal lines SGL2 and SGL4 correspond to the transmitting coil CTx.

The controller 11 sequentially selects the signal lines SGL. As a result, the touch detection is performed over the entire display region Ad using the electromagnetic induction method. In FIG. 10, the transmitting coil CTx is formed by two of the signal lines SGL. However, the transmitting coil CTx is not limited to this example, and may be formed by two or more of the signal lines SGL disposed on one side of the detection region Aem and two or more of the signal lines SGL disposed on the other side of the detection region Aem. The numbers of the signal lines SGL on both sides of the detection region Aem need not be equal to each other. A configuration can be employed in which the number of the signal lines SGL on one side differs from that of the signal lines SGL on the other side. In the above-described cases, the ends on the same side of the signal lines SGL are electrically coupled to one another through the switches S10 and S2 and the wiring L15 that are provided on the upper side. During periods (display period Pd and second sensing period Pes) different from the first sensing period Pem, each pair of the signal lines SGL is brought into an uncoupled state by operation of the switches.

During the first sensing period Pem, the wiring L11 is grounded, and a ground voltage GND is supplied to the left end of the third electrode 24(1) and the left end of the third electrode 24(3). The switches S11 coupled to the respective left ends of the third electrodes 24(2) and 24(4) are turned off, and the switches S12 coupled thereto are turned on. As a result, the left end of the third electrode 24(2) and the left end of the third electrode 24(4) are coupled to the first AFE 47A through the corresponding switches S12. As a result, a pair of the third electrodes 24(1) and 24(2) is provided as the receiving coil CRx (refer to FIG. 3). A pair of the third electrodes 24(3) and 24(4) is also provided as the receiving coil CRx. An electromotive force based on the electromagnetic induction is generated in each pair of the third electrodes 24. A current corresponding to this electromotive force is supplied to the first AFE 47A.

The switches S1, S2, and S10 coupled to the upper end sides of the signal lines SGL1, SGL3, and SGL5 are turned off, and the switches S5, S6, S8, and S9 coupled to the lower end sides thereof are turned off. As a result, the signal lines SGL1, SGL3, and SGL5 are not supplied with the ground voltage GND, the first voltage VTPH, and the second voltage VTPL, and are placed in a floating state.

During the first sensing period Pem, all the switches S3 are turned off, and all the switches S4 are turned on. As a result, the gate lines GCL are supplied with the low-level voltage VGL as a direct-current voltage signal. All the switches S5 are turned off, and thus, none of the signal lines SGL are supplied with the pixel signal Vpix.

Figure 12:
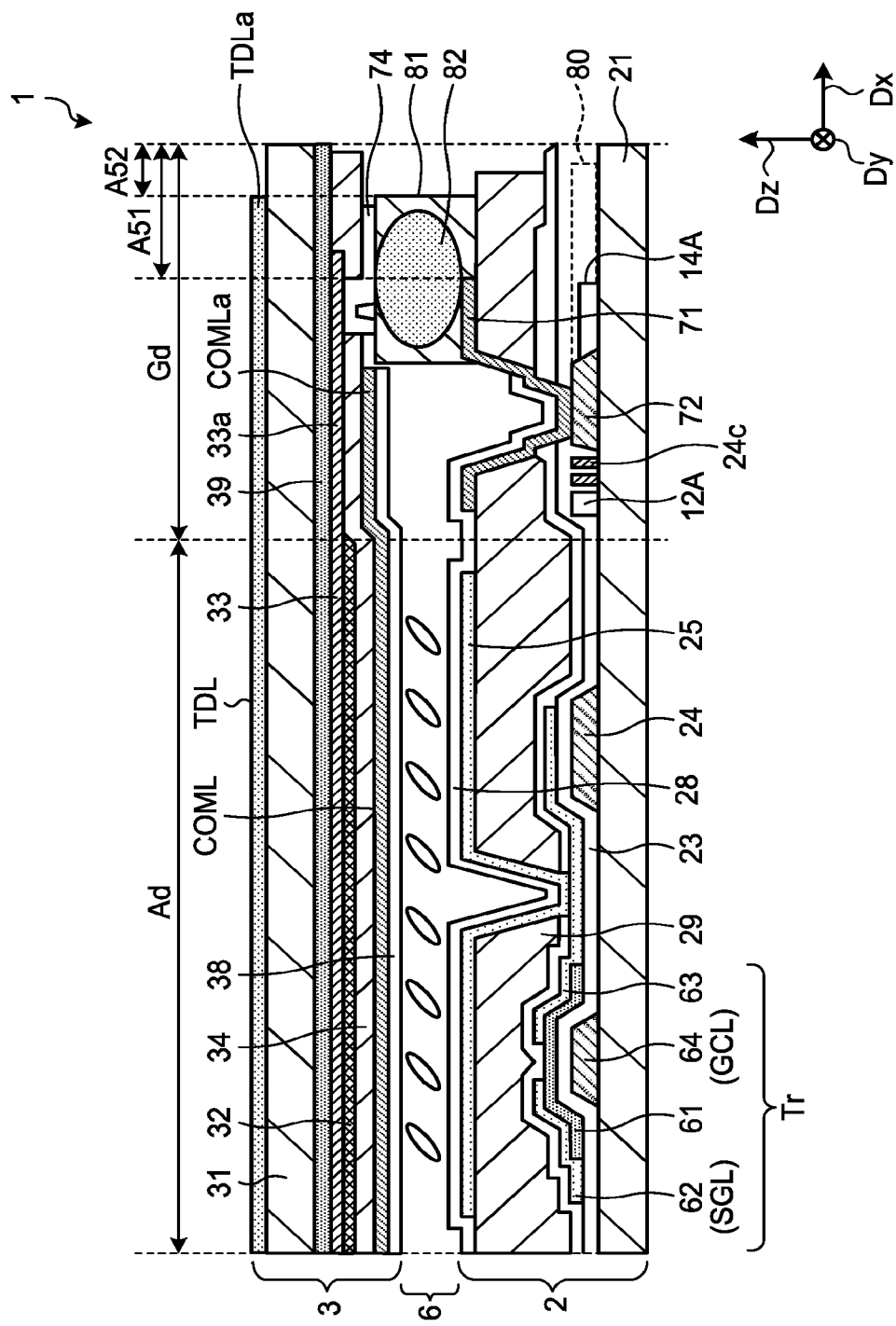
FIG. 12 is a schematic sectional diagram for explaining a coupling configuration of first electrodes.
Figure 13:
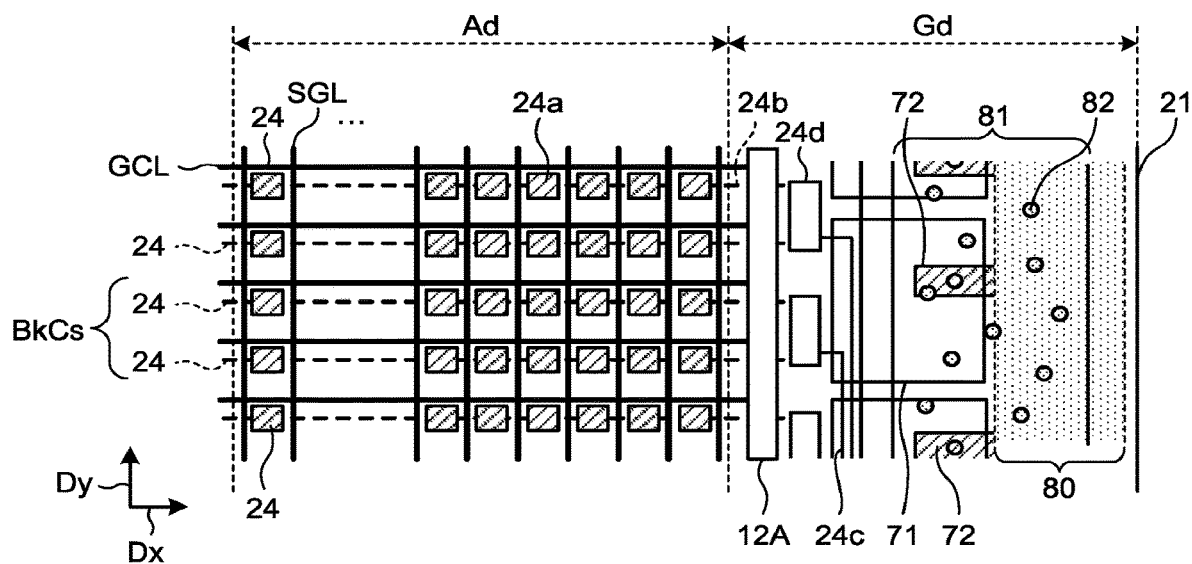
FIG. 13 is a plan view schematically illustrating the third electrodes and a conductive portion.
Figure 14:
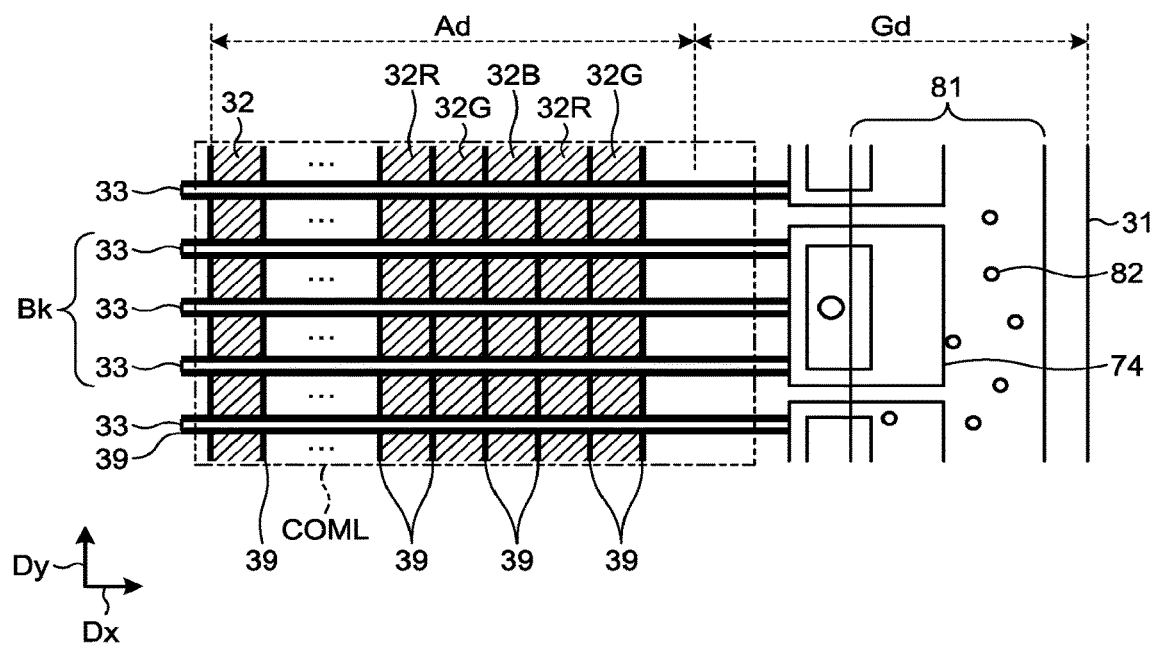
FIG. 14 is a plan view schematically illustrating the first electrodes and the conductive portion.

During the mutual-capacitive touch detection, the signal lines SGL and the third electrodes 24 illustrated in FIG. 10 are not driven. The first electrodes 33 illustrated in FIG. 8 are brought into conduction with the first substrate 21, and are driven as the drive electrodes E1 of the mutual capacitance method. The following describes a coupling configuration between the first electrodes 33 and the first substrate 21. FIG. 12 is a schematic sectional diagram for explaining a coupling configuration of the first electrodes. FIG. 13 is a plan view schematically illustrating the third electrodes and a conductive portion. FIG. 14 is a plan view schematically illustrating the first electrodes and the conductive portion.

FIG. 12 illustrates a portion for one pixel at the outermost circumference of the display region Ad and the peripheral region Gd adjacent thereto. As illustrated in FIG. 12, in the pixel substrate 2, for example, the switching elements Tr, the pixel electrodes 25, the third electrodes 24, coupling wiring 24c, coupling electrodes 72, the insulating layer 23, the planarizing film 29, and the orientation film 28 are provided on the first substrate 21. The orientation film 28 is provided so as to cover the pixel electrodes 25 in the display region Ad. The orientation film 28 is provided in a region not overlapping with a conductive portion 81 in the peripheral region Gd, and overlaps with a part of a conductive layer 71. The switching element Tr includes a gate electrode 64, a source electrode 62, a semiconductor layer 61, and a drain electrode 63. The gate electrode 64 is provided in the same layer as that of the gate lines GCL. A part of each of the gate lines GCL may be used as the gate electrode 64. The source electrode 62 is provided in the same layer as that of the signal lines SGL. A part of each of the signal lines SGL may be used as the source electrode 62.

Each of the pixel electrodes 25 is coupled to the drain electrode 63 through a contact hole provided in the planarizing film 29. Each of the third electrodes 24 is provided in the same layer as that of the gate electrode 64 (gate line GCL). The third electrode 24 is provided so as to overlap with the drain electrode 63 and the pixel electrode 25 when viewed from the direction orthogonal to the surface of the first substrate 21.

As illustrated in FIG. 12, in the counter substrate 3, the light-shielding layer 39, the first electrodes 33, the color filter 32, an overcoat layer 34, the common electrode COML, and the orientation film 38 stacked on one surface of the second substrate 31 in this order. The second electrodes TDL is disposed on the other surface of the second substrate 31. That is, the overcoat layer 34 serving as an insulating layer is provided on the common electrode COML. The first electrodes 33 and the second electrodes TDL opposed to the first electrodes 33 with a space therebetween are provided on the overcoat layer 34.

The first electrodes 33 are continuously provided from the display region Ad to the peripheral region Gd. Portions of the first electrodes 33 provided in the peripheral region Gd serve as coupling portions 33a. The overcoat layer 34 is provided so as to cover the color filter 32 and the coupling portions 33a. The common electrode COML is provided between the overcoat layer 34 and the liquid crystal layer 6. The common electrode COML is continuously provided from the display region Ad to the peripheral region Gd. A portion of the common electrode COML provided in the peripheral region Gd serves as a coupling portion COMLa. The orientation film 38 is provided so as to cover the common electrode COML in the display region Ad. The orientation film 38 is provided in a region not overlapping with the conductive portion 81 in the peripheral region Gd, and overlaps with the coupling portion COMLa. A conductive layer 74 is coupled to the coupling portions 33a through a contact hole provided in the overcoat layer 34 in the peripheral region Gd. The conductive layer 74 is a light-transmitting conductive material, such as ITO.

In the peripheral region Gd, the conductive portion 81 is provided between the first substrate 21 and the second substrate 31. The conductive portion 81 is a seal portion that seals between the first substrate 21 and the second substrate 31. The conductive portion 81 includes a plurality of conductive particles 82 dispersed in a sealing material. The conductive portion 81 is provided on the peripheral circuit region 80 with the planarizing film 29 interposed therebetween. FIG. 12 is merely a schematic illustration, and illustrates only one of the conductive particles 82 in the conductive portion 81. The present disclosure is, however, not limited to this illustration. The conductive particles 82 are dispersed in the conductive portion 81.

The conductive layer 74 is coupled to the conductive layer 71 through the conductive particles 82 of the conductive portion 81. The conductive layer 71 is a light-transmitting conductive material, such as ITO. Thus, the first electrodes 33 are electrically coupled to the conductive layer 71. The conductive layer 71 is coupled to the coupling electrodes 72. The coupling electrodes 72 are coupled to the first electrode scan circuit 14A provided in the peripheral circuit region 80. With the above-described configuration, the first electrodes 33 are electrically coupled to the first electrode scan circuit 14A provided on the first substrate 21. With this configuration, during the mutual-capacitive touch detection, the first electrode scan circuit 14A sequentially selects the first electrode block Bk including more than one of the first electrodes 33 (refer to FIG. 14), and supplies the second drive signal TSVcom to the first electrode block Bk.

Although not illustrated, with the same configuration, the common electrode COML is also coupled to the first substrate 21 side through the conductive portion 81. In this case, the conductive portion 81 coupled to the common electrode COML is electrically isolated from the conductive portion 81 coupled to the first electrodes 33. With this configuration, the supplies 14a to 14d of the driver IC 19 (refer to FIG. 11) can supply different signals to the common electrode COML and the first electrodes 33.

A region A51 denotes a region outside the central portion of the conductive portion 81 up to the outer circumference of the second substrate 31. A region A52 denotes a region outside end portions TDLa of the second electrodes TDL up to the outer circumference of the second substrate 31, the end portions TDLa being provided in the peripheral region Gd. The coupling portion COMLa is preferably provided from the boundary between the display region Ad and the peripheral region Gd to the vicinity of the conductive portion 81. The coupling portions 33a of the first electrodes 33 are preferably provided up to the region A52. With this configuration, the coupling portions 33a are provided between the peripheral circuit region 80 and the second electrodes TDL. This configuration allows the coupling portions 33a to shield noise from the peripheral circuit region 80.

As illustrated in FIG. 13, the third electrodes 24 include capacitive electrodes 24a and wiring 24b. The capacitive electrodes 24a are provided so as to overlap with the drain electrodes 63 and the pixel electrodes 25, and generate retention capacitance between themselves and both the drain electrodes 63 and the pixel electrodes 25. The wiring 24b couples the capacitive electrodes 24a arranged in the first direction Dx to one another. With the above-described configuration, the third electrodes 24 are longer in the first direction Dx as a whole. In other words, the third electrodes 24 are longer in the same direction as that of the first electrodes 33 illustrated in FIG. 14. As illustrated in FIG. 14, the color regions 32R, 32G, and 32B of the color filter 32 are longer in a direction intersecting with the first electrodes 33 in the plan view.

More than one of the third electrodes 24 are coupled to one coupling portion 24d. The more than one of third electrodes 24 constitute a third electrode block BkCs. During the electromagnetic induction touch detection, a plurality of such third electrode blocks BkCs form the receiving coils CRx. The coupling wiring 24c is coupled to the coupling portion 24d, and couples the third electrode block BkCs to the first AFE 47A or the wiring L11 (refer to FIG. 10).

As illustrated in FIG. 14, the light-shielding layer 39 includes portions extending along the gate lines GCL and portions extending along the signal lines SGL. The portions of the light-shielding layer 39 extending along the signal lines SGL are provided so as to overlap with the boundaries between the color regions 32R, 32G, and 32B. The first electrodes 33 are provided so as to overlap with the portions of the light-shielding layer 39 extending along the gate lines GCL. In other words, the first electrodes 33 are provided along the first direction Dx.

More than one of the first electrodes 33 arranged in the second direction Dy are coupled to one of the conductive layers 74. This configuration forms the first electrode block Bk including the more than one of the first electrodes 33, and the same signal is supplied to the more than one of the first electrodes 33 included in the first electrode block Bk. The first electrodes 33 other than those in the first electrode block Bk serve as a non-selected electrode block NBk. The first electrode block Bk serves as the drive electrode E1 in the mutual-capacitive touch detection.

Whereas the common electrode COML is made of ITO, the first electrodes 33, the second electrodes TDL, the third electrodes 24, and the signal lines SGL are made of a metal. Therefore, the first electrodes 33 and the signal lines SGL are significantly lower in resistance than the common electrode COML. As a result, using the first electrodes 33 or the signal lines SGL as the drive electrodes can reduce dulling of the first drive signal VTP and the second drive signal TSVcom each having a square wave (alternating-current rectangular wave). This point will be described with reference to FIG. 15.

Figure 15:
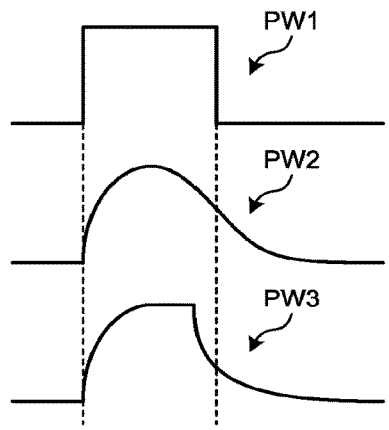
FIG. 15 is an explanatory diagram for explaining a pulse wave applied to drive electrodes.

FIG. 15 is an explanatory diagram for explaining a pulse wave applied to the drive electrodes. Each of a first pulse wave PW1, a second pulse wave PW2, and a third pulse wave PW3 illustrated in FIG. 15 exemplifies one pulse wave of a plurality of pulse waves included in the first drive signal VTP and the second drive signal TSVcom. The first pulse wave PW1 represents an ideal waveform of the pulse wave applied to the drive electrodes. The second pulse wave PW2 represents a waveform when only the common electrode COML made of ITO is used as the drive electrode. Since ITO has a high resistance, the waveform of the square wave applied thereto is made duller than that of the first pulse wave PW1. The waveform is made duller particularly when falling.

In contrast, the third pulse wave PW3 represents a waveform when the first electrodes 33 or the signal lines SGL are used as the drive electrodes. The first electrodes 33 and the signal lines SGL are metallic. Therefore, the first electrodes 33 and the signal lines SGL are significantly lower in resistance than ITO. As a result, overall response of the drive electrodes is improved, and in particular, the falling of the third pulse wave PW3 is made steeper than that of the second pulse wave PW2. As a result, in this embodiment, responses to the drive signals are improved and the detection sensitivity is improved in both cases of the electromagnetic induction method and the mutual-capacitance method.

The common electrode COML and the pixel electrodes 25 lie between both the first electrodes 33 and the second electrodes TDL and both the signal lines SGL and the third electrodes 24. Also in this case, the common electrode COML is supplied with a fixed voltage signal (such as the display drive signal Vcomdc or the ground potential GND), and the pixel electrodes 25 are substantially in the floating state. As a result, the common electrode COML and the pixel electrodes 25 can be restrained from hindering the function of the first electrodes 33 and the signal lines SGL as the drive electrodes.

Figure 16:
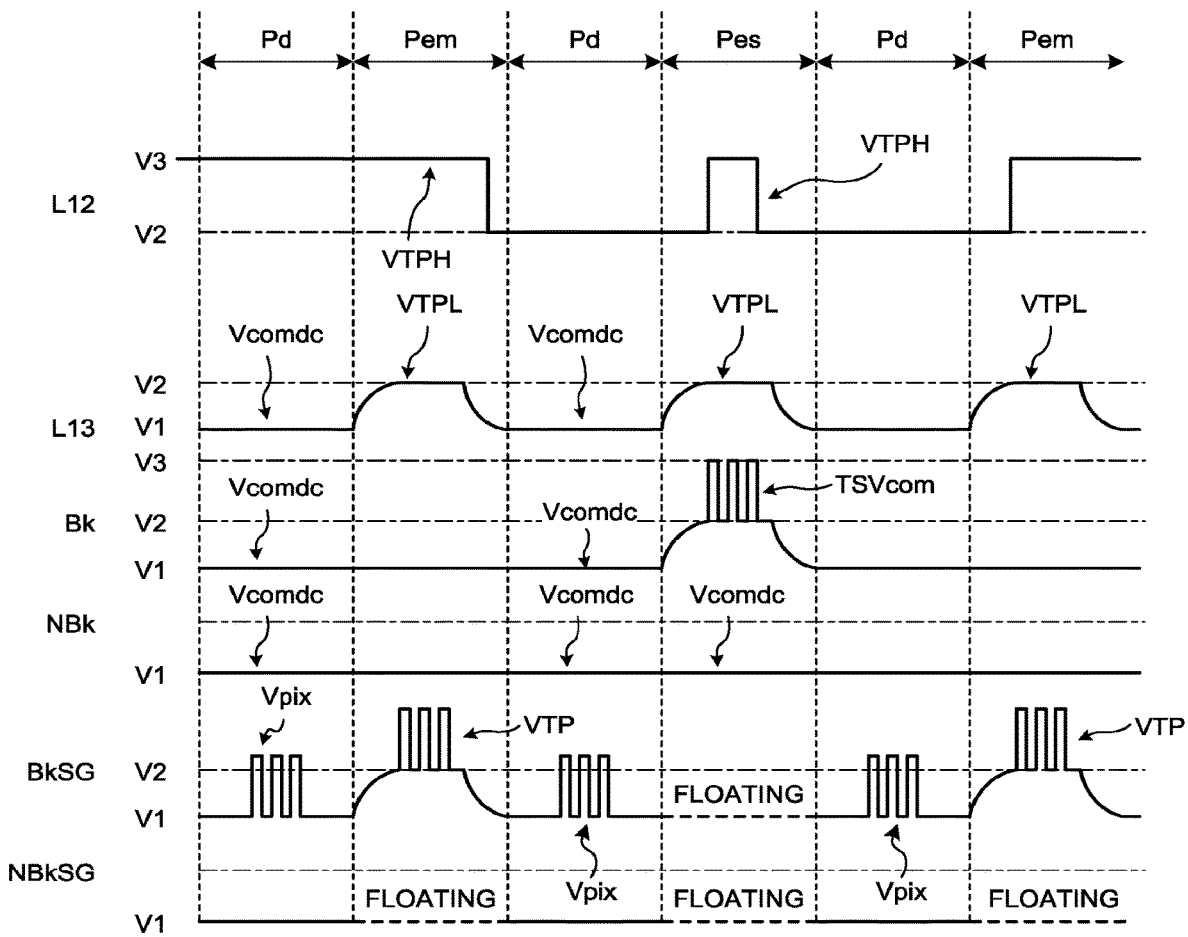
FIG. 16 is a timing waveform diagram illustrating an operation example of the display device according to the first embodiment.

FIG. 16 is a timing waveform diagram illustrating an operation example of the display device according to the first embodiment. The display device 1 performs the touch detection operation (detection period) and the display operation (display period) in a time-division manner. The touch detection operation and the display operation may be divided in any way. The following describes, for example, a method in which the touch detection and the display are performed in a time-division manner in one frame period of the display panel 10, that is, in a time required for displaying video information for one screen.

As illustrated in FIG. 16, the display period Pd, the first sensing period Pem, and the second sensing period Pes are alternately arranged.

The above-described display operation is performed during the display period Pd. As illustrated in FIG. 9, the driver IC 19 supplies the display drive signal Vcomdc to the common electrode COML and the third electrodes 24 through the wiring L13. During the same period, the pixel signals Vpix are supplied to the signal lines SGL (signal line block BkSG) opposed to the common electrode COML.

During the first sensing period Pem, as illustrated in FIG. 10, the driver IC 19 alternately supplies the first voltage VTPH and the second voltage VTPL to both ends of the transmitting coil CTx. This operation supplies the first drive signal VTP to the signal line block BkSG constituting the transmitting coil CTx. A non-selected signal line block NBkSG is not supplied with the first drive signal VTP, and is placed in the floating state.

As illustrated in FIG. 16, the first voltage VTPH is a voltage signal having a potential V3. The second voltage VTPL is a voltage signal having a potential V2 lower than the potential V3. The display drive signal Vcomdc is a voltage signal having a potential V1 lower than the potential V2.

During the second sensing period Pes, the driver IC 19 supplies the second drive signal TSVcom to the first electrode block Bk. The non-selected electrode block NBk is supplied with the display drive signal Vcomdc. The signal supplied to the non-selected electrode block NBk only needs to be a fixed potential, and the non-selected electrode block NBk may be supplied with, for example, the second voltage VTPL. The signal line block BkSG and the non-selected signal line block NBkSG are in the floating state.

The timing waveform diagram illustrated in FIG. 16 is merely an example, and can be changed as appropriate. For example, the order of the display period Pd, the first sensing period Pem, and the second sensing period Pes can be changed as appropriate. One frame period may be provided with only either of the first sensing period Pem and the second sensing period Pes. The lengths of the display period Pd, the first sensing period Pem, and the second sensing period Pes may differ from one another.

Figure 17:
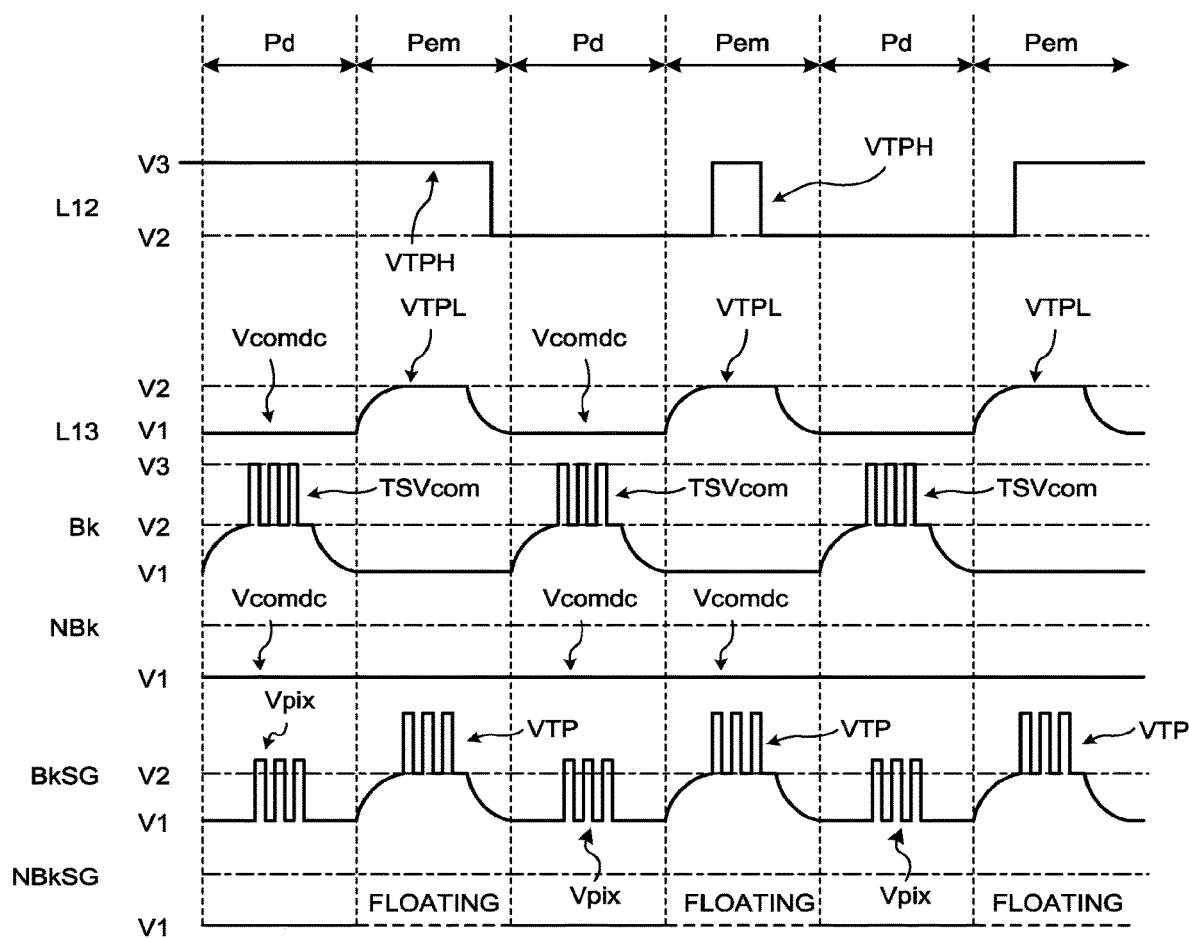
FIG. 17 is a timing waveform diagram illustrating another operation example of the display device according to the first embodiment.

FIG. 17 is a timing waveform diagram illustrating another operation example of the display device according to the first embodiment. As illustrated in FIG. 17, the display period Pd and the first sensing period Pem are alternately arranged. In this embodiment, the mutual-capacitive touch detection can be performed in synchronization with the display period Pd. The pixel signals Vpix are supplied to the signal lines SGL (signal line block BkSG) during the display period Pd, and the second drive signal TSVcom is supplied to the first electrode block Bk during the same period. Since the common electrode COML is provided between the first electrodes 33 and both the pixel electrodes 25 and the signal lines SGL, the second drive signal TSVcom can be restrained from hindering the display operation.

The present disclosure is not limited to the example illustrated in FIG. 17. The mutual-capacitive touch detection may be performed during the same period as the first sensing period Pem. In other words, the first drive signal VTP is supplied to the signal lines SGL during the first sensing period Pem, and the second drive signal TSVcom is supplied to the first electrodes 33 during the same period.

Second Embodiment

Figure 18:
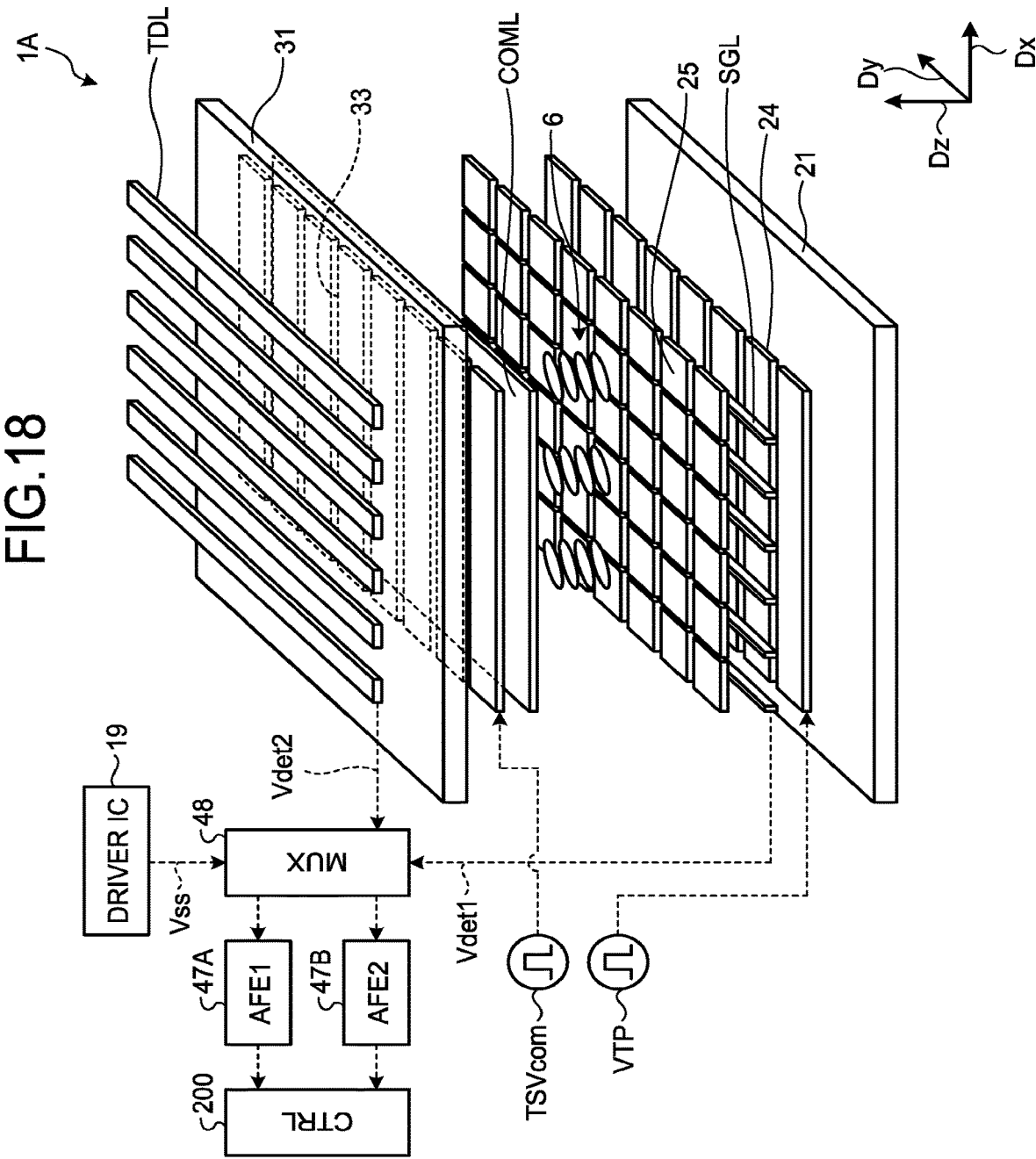
FIG. 18 is an exploded perspective view of a display device according to a second embodiment of the present disclosure.

FIG. 18 is an exploded perspective view of a display device according to a second embodiment of the present disclosure. As illustrated in FIG. 18, in a display device 1A of this embodiment, the configurations and the order of stacking of the first electrodes 33, the second electrodes TDL, the third electrodes 24, and the signal lines SGL are the same as those of the first embodiment.

In this embodiment, during the electromagnetic induction touch detection, the driver IC 19 supplies the first drive signal VTP to the third electrodes 24. The third electrodes 24 serve as the transmitting coils CTx during the electromagnetic induction touch detection. As a result, the electromagnetic induction is generated among the third electrodes 24, the touch pen 100, and the signal lines SGL. The electromotive force is generated in the signal lines SGL by the mutual induction with the touch pen 100. The first detection signal Vdet1 corresponding to this electromotive force is supplied from the signal lines SGL to the first AFE 47A through the multiplexer 48. The signal lines SGL serve as the receiving coils CRx during the electromagnetic induction touch detection.

In this embodiment, the third electrodes 24 are driven in the electromagnetic induction method. The third electrodes 24 are metallic, and have a large area including the capacitive electrodes 24a for generating the retention capacitance of the pixels Pix (sub-pixels SPix). Therefore, the third electrodes 24 have a significantly lower resistance than that obtained by ITO. As a result, the response to the first drive signal VTP is improved in the same manner as in the first embodiment. In the mutual-capacitance method, the first electrodes 33 are driven in the same manner as in the first embodiment. As a result, the response to the second drive signal TSVcom is improved.

Figure 19:
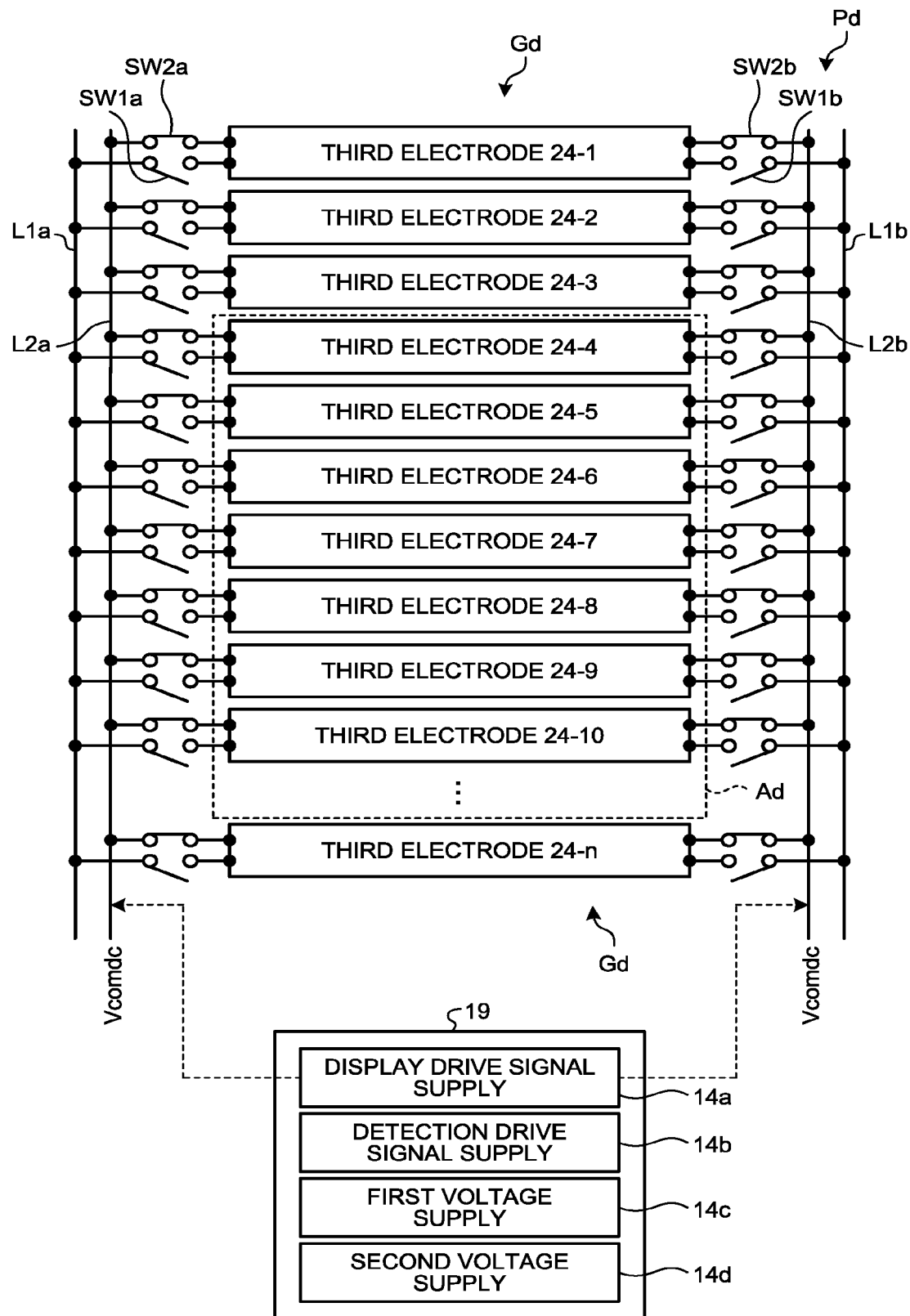
FIG. 19 is a circuit diagram for explaining a coupling configuration of the third electrodes during the display period according to the second embodiment.
Figure 20:
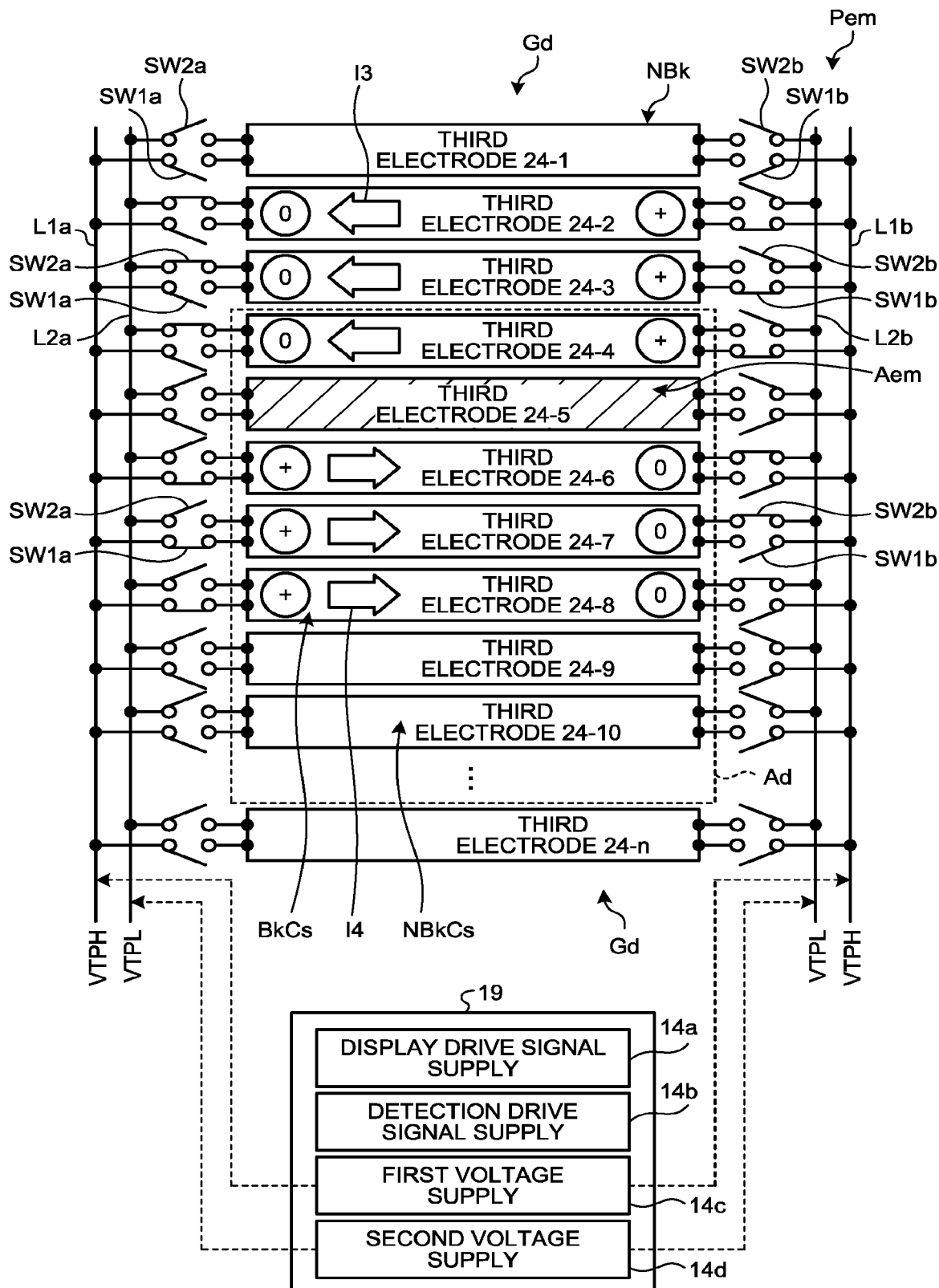
FIG. 20 is a circuit diagram illustrating a coupling configuration of the third electrodes during the first sensing period according to the second embodiment.

The following describes coupling configurations of the third electrodes 24 in the display device 1A of this embodiment. FIG. 19 is a circuit diagram for explaining a coupling configuration of the third electrodes during the display period according to the second embodiment. FIG. 20 is a circuit diagram illustrating a coupling configuration of the third electrodes during the first sensing period according to the second embodiment.

As illustrated in FIGS. 19 and 20, a plurality of third electrodes 24-1, 24-2, . . . , 24-n are arranged. In the following description, the third electrodes 24-1, 24-2, . . . , 24-n will each be referred to as the third electrode 24 when they need not be distinguished from one another.

First wiring L1a and second wiring L2a are provided on the left end side of the third electrodes 24, and first wiring L1b and second wiring L2b are provided on the right end side of the third electrodes 24. A switch SW1a is provided between the left end of each of the third electrodes 24 and the first wiring L1a. A switch SW2a is provided between the left end of the third electrode 24 and the second wiring L2a. The switch SW1a and the switch SW2a are coupled in parallel to the left end of the third electrode 24. A switch SW1b is provided between the right end of the third electrode 24 and the first wiring L1b. A switch SW2b is provided between the right end of the third electrode 24 and the second wiring L2b. The switch SW1b and the switch SW2b are coupled in parallel to the right end of the third electrode 24.

As illustrated in FIG. 19, during the display period Pd, all the switches SW1a and SW1b are turned off, and all the switches SW2a and SW2b are turned on, in response to the control signal from the controller 11. As a result, all the third electrodes 24 are uncoupled from the first wiring L1a and L1b; the second wiring L2a is coupled to the left ends of all the third electrodes 24; and the second wiring L2b is coupled to the right ends of all the third electrodes 24.

As a result, during the display period Pd, the display drive signal supply 14a supplies the display drive signal Vcomdc to all the third electrodes 24 through the second wiring L2a and L2b. At the same time, the display drive signal supply 14a also supplies the display drive signal Vcomdc to the common electrode COML (refer to FIG. 18).

As illustrated in FIG. 20, during the first sensing period Pem, the switches SW1a and SW1b and the switches SW2a and SW2b operate in response to the control signal from the controller 11, and the third electrode block BkCs is selected. Specifically, the third electrodes 24-2, 24-3, and 24-4 and the third electrodes 24-6, 24-7, and 24-8 are selected as the third electrode block BkCs. The other third electrodes 24 serve as a non-selected electrode block NBkCs. A region between the third electrode 24-4 and the third electrode 24-6 serves as the detection region Aem for detecting the detection target body.

The switches SW1a and SW1b and the switches SW2a and SW2b for the third electrodes 24 in the non-selected electrode block NBkCs are turned off in response to the control signal from the controller 11. This operation brings the non-selected electrode block NBkCs into the floating state.

On the left side of the third electrodes 24-2, 24-3, and 24-4, the switches SW1a are turned off, and the switches SW2a are turned on. As a result, the left ends of the third electrodes 24-2, 24-3, and 24-4 are electrically coupled to the second wiring L2a. On the right side of the third electrodes 24-2, 24-3, and 24-4, the switches SW1b are turned on, and the switches SW2b are turned off. As a result, the right ends of the third electrodes 24-2, 24-3, and 24-4 are electrically coupled to the first wiring L1b.

On the left side of the third electrodes 24-6, 24-7, and 24-8, the switches SW1a are turned on, and the switches SW2a are turned off. As a result, the left ends of the third electrodes 24-6, 24-7, and 24-8 are electrically coupled to the first wiring L1a. On the right side of the third electrodes 24-6, 24-7, and 24-8, the switches SW1b are turned off, and the switches SW2b are turned on. As a result, the right ends of the third electrodes 24-6, 24-7, and 24-8 are electrically coupled to the second wiring L2b.

As a result, during the first sensing period Pem, in response to the control signal from the controller 11, the first voltage supply 14c is coupled to the left end of at least one third electrode (third electrodes 24-6, 24-7, and 24-8), and the second voltage supply 14d is coupled to the right end thereof. In addition, the second voltage supply 14d is coupled to the left ends of the third electrodes (third electrodes 24-2, 24-3, and 24-4) other than the at least one third electrodes, and the first voltage supply 14c is coupled to the right ends thereof.

The second voltage supply 14d supplies the second voltage VTPL to the left ends of the third electrodes 24-2, 24-3, and 24-4 through the second wiring L2a. The first voltage supply 14c supplies the first voltage VTPH to the right ends of the third electrodes 24-2, 24-3, and 24-4 through the first wiring L1b. As a result, potential differences between the left ends and the right ends of the third electrodes 24-2, 24-3, and 24-4 are generated, and currents I3 thus flow in a direction from the right ends toward the left ends thereof.

The first voltage supply 14c supplies the first voltage VTPH to the left ends of the third electrodes 24-6, 24-7, and 24-8 through the first wiring L1a. The second voltage supply 14d supplies the second voltage VTPL to the right ends of the third electrodes 24-6, 24-7, and 24-8 through the second wiring L2b. As a result, potential differences between the left ends and the right ends of the third electrodes 24-6, 24-7, and 24-8 are generated, and currents I4 thus flow in a direction from the left ends toward the right ends thereof.

In this manner, by switching the operations of the switches SW1a, SW2a, SW1b, and SW2b, the first voltage VTPH and the second voltage VTPL supplied to both ends of the third electrodes 24 are changed over to each other at the predetermined frequency. As a result, the third electrodes 24 are supplied with the first drive signal VTP serving as the alternating-current voltage signal.

The currents I3 and I4 flowing in the third electrodes 24 generate magnetic fields, thus generating the electromagnetic induction. The currents I3 and the currents I4 flow in directions opposite to each other. As a result, the magnetic field generated by the currents I3 overlaps with the magnetic field generated by the currents I4 in the detection region Aem. This overlap can increase the strength of the magnetic field passing through the detection region Aem. The magnetic field generated by the currents I3 and the currents I4 corresponds to the magnetic field M1 generated during the magnetic field generation period of the electromagnetic induction method illustrated in FIG. 3. The third electrodes 24-2, 24-3, and 24-4 and the third electrodes 24-6, 24-7, and 24-8 included in the third electrode block BkCs correspond to the transmitting coil CTx.

The controller 11 sequentially selects the third electrodes 24-1 to 24-n. As a result, the touch detection is performed over the entire display region Ad using the electromagnetic induction method. As illustrated in FIG. 20, the third electrodes 24-1, 24-2, 24-3, and 24-n are also provided in the peripheral region Gd. This configuration can also generate magnetic fields in the peripheral portion of the display region Ad. In this case, the third electrodes 24-1, 24-2, 24-3, and 24-n are provided in positions not overlapping with the detection region Aem.

In FIG. 20, the transmitting coil CTx is formed by six of the third electrodes 24. However, the transmitting coil CTx is not limited to this example, and may be formed by one or two of the third electrodes 24 disposed on one side of the detection region Aem and one or two of the third electrodes 24 disposed on the other side of the detection region Aem. The transmitting coil CTx may be formed by four or more of the third electrodes 24 disposed on one side of the detection region Aem and four or more of the third electrodes 24 disposed on the other side of the detection region Aem. The numbers of the third electrodes 24 on both sides of the detection region Aem need not be the same as each other. A configuration can be employed in which the number of third electrodes 24 on one side differs from that of the third electrodes 24 on the other side.

Also in this embodiment, the common electrode COML is provided between both the first electrodes 33 and the second electrodes TDL and both the third electrodes 24 and the signal lines SGL. With this configuration, the capacitive touch detection can be performed synchronously or asynchronously with the display period Pd.

Figure 21:
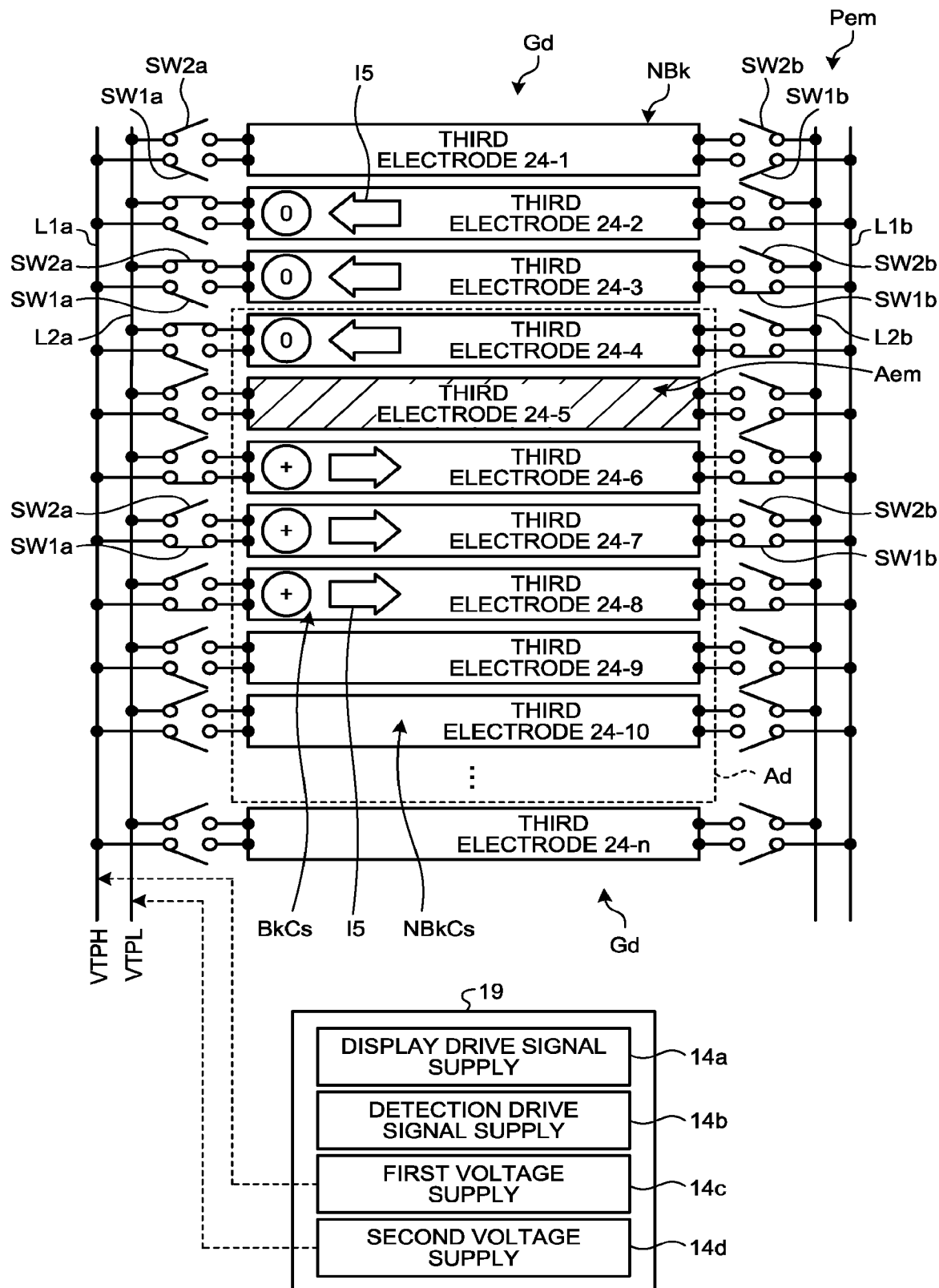
FIG. 21 is a circuit diagram illustrating another example of the coupling configuration of the third electrodes during the first sensing period according to the second embodiment.

FIG. 21 is a circuit diagram illustrating another example of the coupling configuration of the third electrodes during the first sensing period according to the second embodiment. As illustrated in FIG. 21, on the right side of the third electrodes 24-6, 24-7, and 24-8, the switches SW1b are turned on, and the switches SW2b are turned off. The operations of the switches SW1a and SW2a on the left side of the third electrodes 24-6, 24-7, and 24-8 and the switches SW1a, SW1b, SW2a, and SW2b coupled to the third electrodes 24-2, 24-3, and 24-4 are the same as those in the example illustrated in FIG. 20.

The supplies 14a to 14d of the driver IC 19 do not supply the various signals to the first wiring L1b and the second wiring L2b disposed on the right end side of the third electrodes 24.

With the configuration described above, the right ends of the third electrodes 24-2, 24-3, and 24-4 are electrically coupled to the right ends of the third electrodes 24-6, 24-7, and 24-8 through the switches SW1b and the first wiring L1b. That is, the third electrodes 24-2, 24-3, and 24-4, the first wiring L1b, and the third electrodes 24-6, 24-7, and 24-8 are coupled together so as to form a loop surrounding the detection region Aem.

The first voltage supply 14c supplies the first voltage VTPH to the left ends of the third electrodes 24-6, 24-7, and 24-8 through the first wiring L1a. The second voltage supply 14d supplies the second voltage VTPL to the left ends of the third electrodes 24-2, 24-3, and 24-4 through the second wiring L2a. As a result, currents I5 flow from the left ends of the third electrodes 24-6, 24-7, and 24-8 to the left ends of the third electrodes 24-2, 24-3, and 24-4 through the first wiring L1b. The currents I5 generate a magnetic field passing through the detection region Aem.

As described above, the switches SW1b are provided that couple together the ends on the same side of a pair of groups of the third electrodes 24 (the third electrodes 24-2, 24-3, and 24-4 and the third electrodes 24-6, 24-7, and 24-8) among the third electrodes 24. During the first sensing period Pem, the controller 11 couples together the pair of groups of the third electrodes 24 by operating the switches SW1b and SW2b. During a period different from the first sensing period Pem, that is, for example, during the display period Pd, the controller 11 brings the pair of groups of the third electrodes 24 into an uncoupled state by operating the switches SW1b and SW2b.

Also with the configuration described above, the third electrodes 24 constitute the transmitting coil CTx during the first sensing period Pem. The direction of the currents I5 flowing in the third electrodes 24-2, 24-3, and 24-4 is opposite to the direction of the currents I5 flowing in the third electrodes 24-6, 24-7, and 24-8. This configuration can increase the strength of the magnetic field passing through the detection region Aem.

Figure 22:
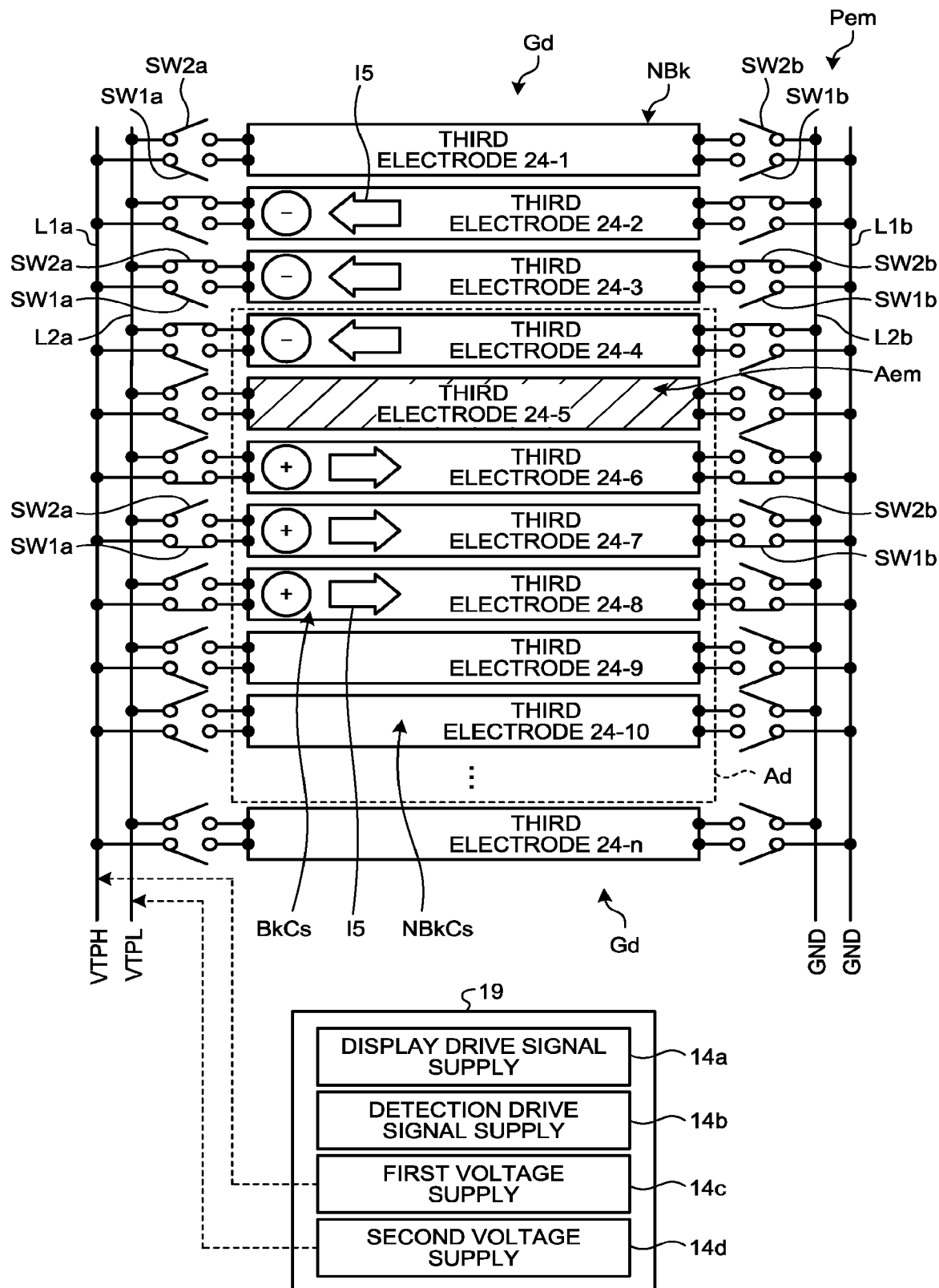
FIG. 22 is a circuit diagram illustrating still another example of the coupling configuration of the third electrodes during the first sensing period according to the second embodiment.

FIG. 22 is a circuit diagram illustrating still another example of the coupling configuration of the third electrodes during the first sensing period according to the second embodiment. In this example, on the right side of the third electrodes 24, the first wiring L1b and the second wiring L2b are supplied with the ground potential GND. The right ends of the third electrodes 24-2, 24-3, and 24-4 are coupled to the second wiring L2b through the switches SW2b. The operations of the switches on the left side of the third electrodes 24-2, 24-3, and 24-4 and the third electrodes 24-6, 24-7, and 24-8 are the same as those of the example illustrated in FIG. 21.

The first voltage supply 14c supplies the first voltage VTPH to the left ends of the third electrodes 24-6, 24-7, and 24-8 through the first wiring L1a. The potential difference between the first voltage VTPH and the ground potential GND causes the currents I5 to flow from the left ends toward the right ends of the third electrodes 24-6, 24-7, and 24-8. The second voltage supply 14d supplies the second voltage VTPL to the left ends of the third electrodes 24-2, 24-3, and 24-4 through the second wiring L2a. The potential difference between the second voltage VTPL and the ground potential GND causes the currents I5 to flow from the right ends toward the left ends of the third electrodes 24-2, 24-3, and 24-4. The currents I5 generate the magnetic field passing through the detection region Aem. Also with the configuration described above, the third electrodes 24 constitute the transmitting coil CTx during the first sensing period Pem.

Figure 23:
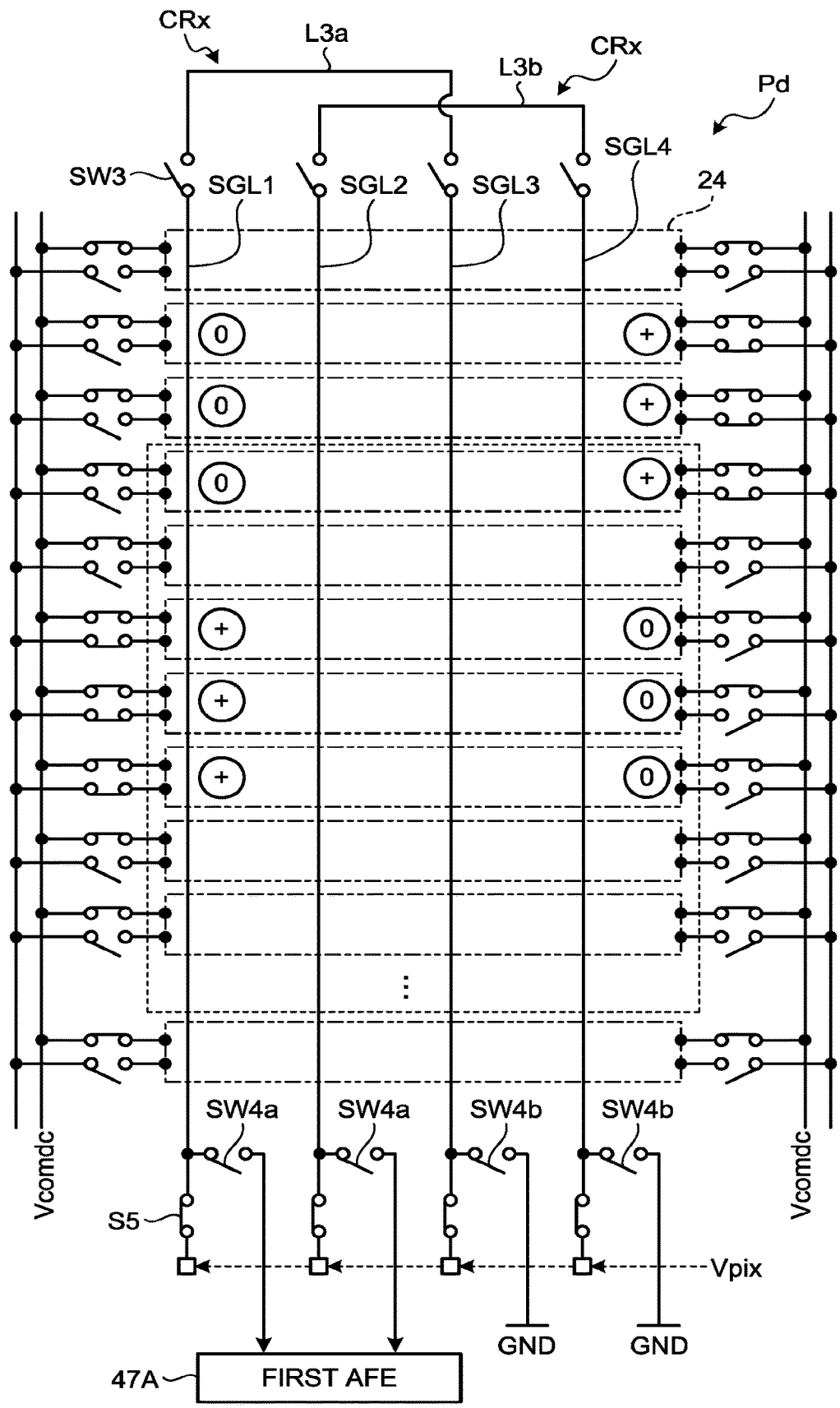
FIG. 23 is a circuit diagram for explaining a coupling configuration of the signal lines during the display period according to the second embodiment.
Figure 24:
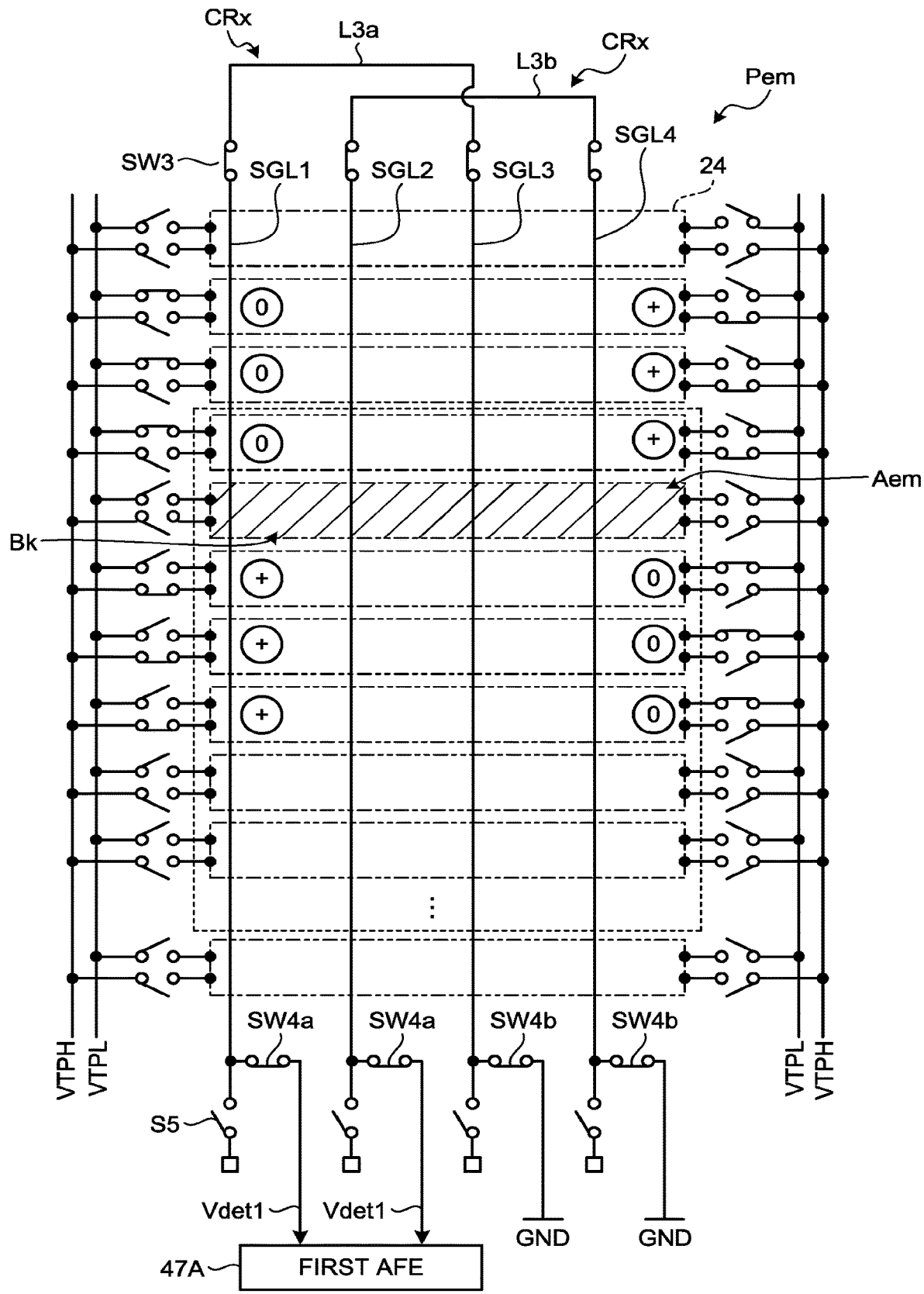
FIG. 24 is a circuit diagram illustrating a coupling configuration of the signal lines during the first sensing period according to the second embodiment.

The following describes coupling configurations of the signal lines SGL in the display device 1A of this embodiment. FIG. 23 is a circuit diagram for explaining a coupling configuration of the signal lines during the display period according to the second embodiment. FIG. 24 is a circuit diagram illustrating a coupling configuration of the signal lines during the first sensing period according to the second embodiment.

FIGS. 23 and 24 illustrate four signal lines SGL1, SGL2, SGL3, and SGL4 among the signal lines SGL. In the following description, the signal lines SGL1, SGL2, SGL3, and SGL4 will each be referred to as the signal line SGL when they need not be distinguished from one another. In FIGS. 23 and 24, the third electrodes 24 are each indicated by a long dashed double-short dashed line.

As illustrated in FIGS. 23 and 24, the signal lines SGL are provided so as to intersect with the third electrodes 24 in the plan view. Switches SW3 and wiring L3a and L3b are provided on the upper end side of the signal lines SGL1, SGL2, SGL3, and SGL4. Two of the switches SW3 and the wiring L3a couple upper ends of a pair of the signal lines SGL1 and SGL3 to each other. The other two of the switches SW3 and the wiring L3b couple upper ends of a pair of the signal lines SGL2 and SGL4 to each other. Switches SW4a, SW4b, and S5 are coupled to the lower end side of the signal lines SGL1, SGL2, SGL3, and SGL4.

As illustrated in FIG. 23, during the display period Pd, the switches SW3 are turned off in response to the control signal from the controller 11. As a result, the upper ends of the signal lines SGL1, SGL2, SGL3, and SGL4 are uncoupled from one another. The switches SW4a and SW4b are turned off, and the switches S5 are turned on. As a result, the lower ends of the signal lines SGL1, SGL2, SGL3, and SGL4 are uncoupled from the first AFE 47A and the ground potential GND. The pixel signals Vpix are supplied to the signal lines SGL through the switches S5.

As illustrated in FIG. 24, during the first sensing period Pem, the switches SW3 are turned on in response to the control signal from the controller 11. As a result, the upper ends of the pair of the signal lines SGL1 and SGL3 are coupled to each other through the wiring Lia. The upper ends of the pair of the signal lines SGL2 and SGL4 are coupled to each other through the wiring L3b. On the lower end side of the signal lines SGL, the switches S5 are turned off, and the switches SW4a and SW4b are turned on. As a result, each of the lower ends of the signal lines SGL1 and SGL2 is coupled to the first AFE 47A. Each of the lower ends of the signal lines SGL3 and SGL4 is coupled to the ground potential GND.

With the above-described configuration, the pair of the signal lines SGL1 and SGL3 are coupled together so as to form a loop, and are formed as a receiving coil CRx. In addition, the pair of the signal lines SGL2 and SGL4 are coupled together so as to form a loop, and are formed as another receiving coil CRx. The receiving coils CRx are provided so as to overlap with the detection region Aem formed by the third electrodes 24.

When the magnetic field M2 from the touch pen 100 (refer to FIG. 4) passes through a region surrounded by the pair of the signal lines SGL1 and SGL3 and the wiring L3a or a region surrounded by the pair of the signal lines SGL2 and SGL4 and the wiring L3b, an electromotive force corresponding to a variation in the magnetic field M2 is generated in a corresponding one of the receiving coils CRx. The first detection signal Vdet1 corresponding to the electromotive force is supplied to the first AFE 47A. Thus, the touch pen 100 can be detected.

In this embodiment, the adjacent receiving coils CRx are arranged so as to partially overlap with each other. Specifically, the region surrounded by the pair of the signal lines SGL1 and SGL3 and the wiring L3a constituting one of the receiving coils CRx contains the signal line SGL2 of the other of the receiving coils CRx. In addition, the region surrounded by the pair of the signal lines SGL2 and SGL4 and the wiring L3b constituting the other of the receiving coils CRx contains the signal line SGL3 of one of the receiving coils CRx. This configuration can restrain generation of a region in which the detection sensitivity of the magnetic field is reduced, or an insensitive region in which the magnetic field cannot be detected, in the display region Ad.

As described above, in this embodiment, the switches SW3 are provided that couple together the ends on the same side of a pair of the signal lines SGL (such as the signal lines SGL1 and SGL3) among the signal lines SGL. The controller 11 couples together a pair of the signal lines SGL by operating the switches SW3 during the first sensing period Pem, and brings the pair of the signal lines SGL into the uncoupled state by operating the switches SW3 during the periods (display period Pd and second sensing period Pes) different from the first sensing period Pem. In this manner, the signal lines SGL are formed as the receiving coils CRx, and generate the electromotive force based on the electromagnetic induction.

Figure 25:
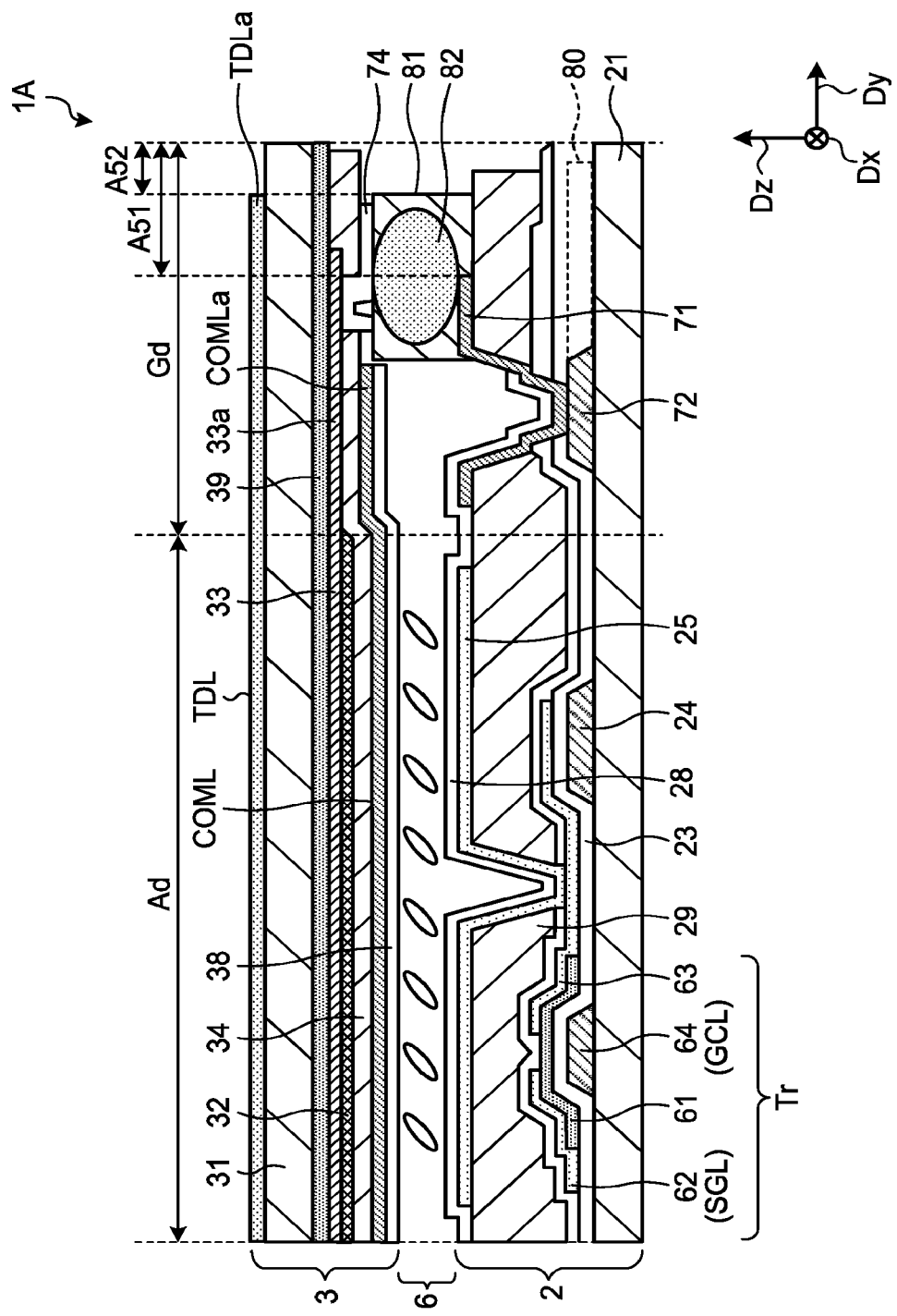
FIG. 25 is a schematic sectional diagram for explaining a coupling configuration of the first electrodes according to the second embodiment.
Figure 26:
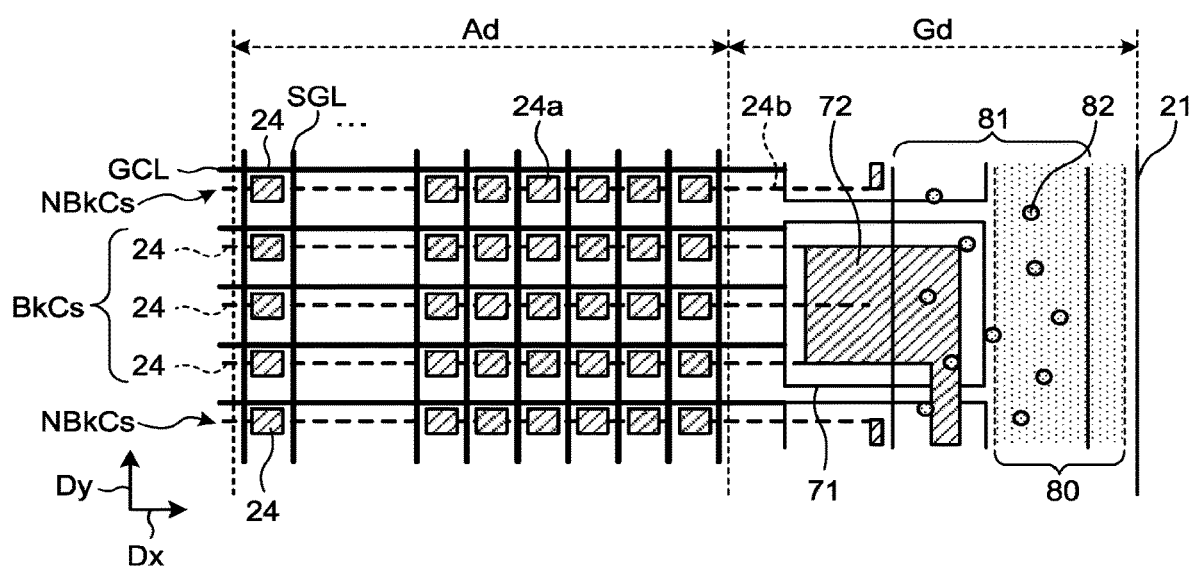
FIG. 26 is a plan view schematically illustrating the third electrodes and the conductive portion.

The following describes coupling configurations of the first electrodes 33. FIG. 25 is a schematic sectional diagram for explaining a coupling configuration of the first electrodes according to the second embodiment. FIG. 26 is a plan view schematically illustrating the third electrodes and the conductive portion. The configuration of the first electrodes 33, the light-shielding layer 39, and the conductive portion 81 in the plan view is the same that of FIG. 14, and hence will not be described.

FIG. 25 illustrates a portion for one pixel at the outermost circumference of the display region Ad and the peripheral region Gd adjacent thereto. The display device 1A illustrated in FIG. 25 differs in configuration from that described with reference to FIGS. 12 to 14 in that the third electrodes 24 are coupled to the coupling electrodes 72.

As illustrated in FIG. 25, the first electrodes 33 are electrically coupled to the conductive layer 71 and the coupling electrodes 72 of the first substrate 21 through the coupling portions 33a, the conductive layers 74, and the conductive portion 81. As illustrated in FIG. 26, the third electrodes 24 are formed to be longer in the first direction Dx as a whole, and are electrically coupled to the coupling electrodes 72. The signal lines SGL are provided so as to intersect with the third electrodes 24, and are uncoupled from the coupling electrodes 72.

With the above-described configuration, the third electrodes 24 are electrically coupled to the first electrodes 33 opposed thereto through the coupling electrodes 72 and the conductive portion 81. FIG. 26 illustrates a case where three of the third electrodes 24 are selected as the third electrode block BkCs. The third electrodes 24 other than those in the third electrode block BkCs serve as the non-selected electrode block NBkCs. As described above, the driver IC 19 (refer to FIG. 18) supplies the various drive signals to the third electrode block BkCs.

More than one of first electrodes 33 overlapping with and opposed to the third electrode block BkCs are electrically coupled to the third electrode block BkCs through the conductive portion 81. The more than one of the first electrodes 33 are supplied with the same signals as the various drive signals supplied to the third electrode block BkCs. The more than one of the first electrodes 33 overlapping with the non-selected electrode block NBkCs are also driven in the same manner as the non-selected electrode block NBkCs.

In other words, during the display period Pd, the first electrodes 33 overlapping with and opposed to the third electrodes 24 are also supplied with the same potential signal as the display drive signal Vcomdc.

During the first sensing period Pem, more than one of the first electrodes 33 overlapping with and opposed to the third electrodes 24-2, 24-3, and 24-4 and the third electrodes 24-6, 24-7, and 24-8 also serve as the transmitting coil CTx. That is, such first electrodes 33 are supplied with the same potential signal as the first drive signal VTP from the driver IC 19, and generate the magnetic field M1. The magnetic field M1 generated from such first electrodes 33 overlaps with the magnetic field generated from the third electrodes 24 in the detection region Aem.

In the mutual-capacitance method, the third electrodes 24 overlapping with and opposed to the first electrodes 33 are also supplied with the same potential signal as the second drive signal TSVcom from the driver IC 19.

As described above, in the display device 1A of this embodiment, the first electrodes 33 and the third electrodes 24 are supplied with the first drive signal VTP and the second drive signal TSVcom during the first sensing period Pem and the second sensing period Pes, respectively, in response to the control signal from the controller 11. As a result, the responses to the first drive signal VTP and the second drive signal TSVcom are improved in the same manner as in the first embodiment.

Figure 27:
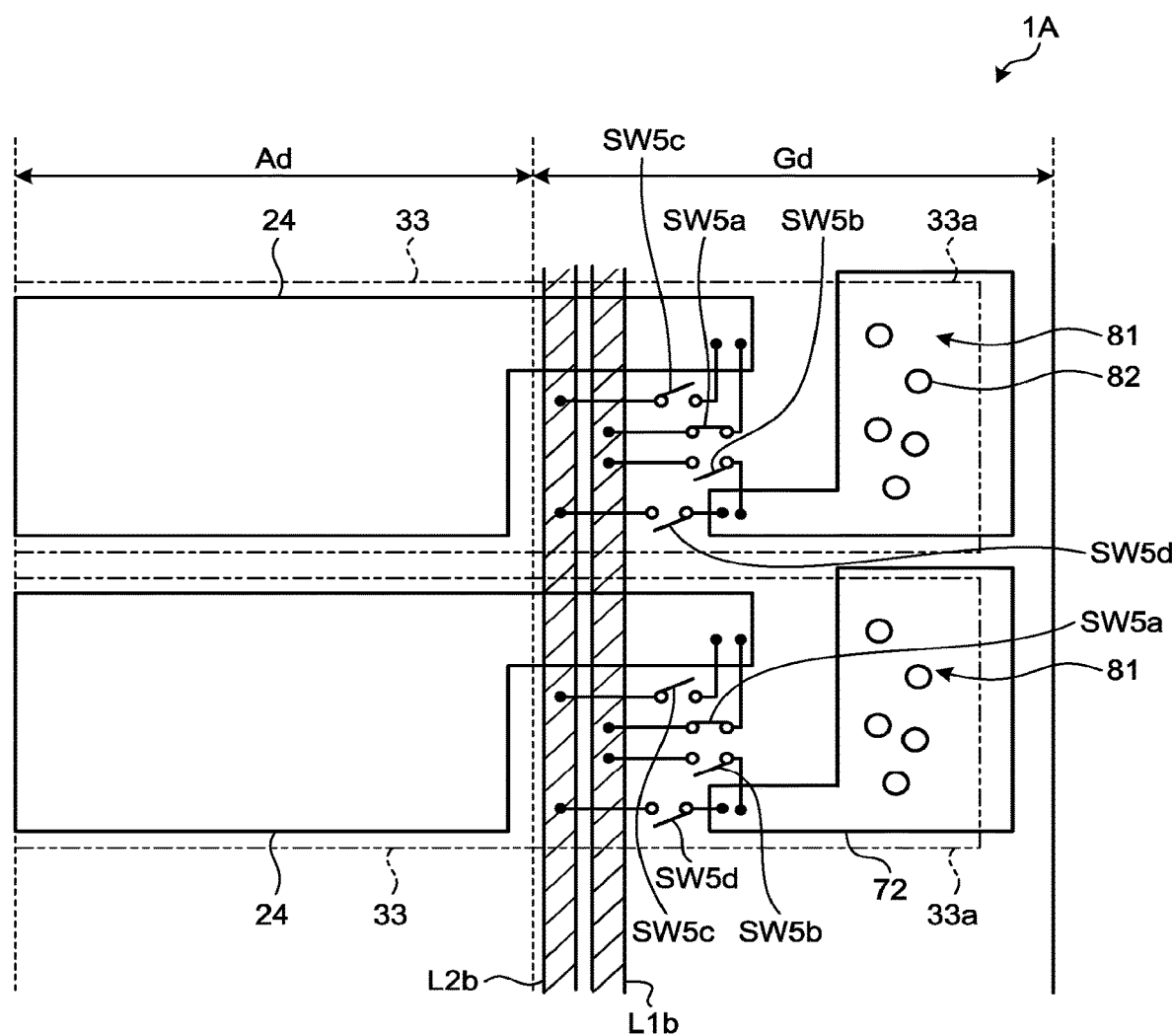
FIG. 27 is a plan view schematically illustrating the first electrodes, the third electrodes, and the conductive portion according to a modification of the second embodiment.

FIG. 27 is a plan view schematically illustrating the first electrodes, the third electrodes, and the conductive portion according to a modification of the second embodiment. FIG. 27 illustrates the first electrodes 33 with long dashed double-short dashed lines. For ease of viewing, FIG. 27 illustrates one of the first electrodes 33 and one of the third electrodes 24 for each of the coupling electrodes 72. Actually, however, more than one of the first electrodes 33 and more than one of the third electrodes 24 are provided for each of the coupling electrodes 72, as illustrated in FIGS. 13 and 14.

As illustrated in FIG. 27, the first wiring L1b and the second wiring L2b are provided in the peripheral region Gd of the display device 1A of the present modification. A switch SW5a is provided between the third electrode 24 and the first wiring L1b. A switch SW5c is provided between the third electrode 24 and the second wiring L2b. The first electrode 33 is electrically coupled to the coupling electrode 72 through the conductive portion 81. A switch SW5b is provided between the coupling electrode 72 and the first wiring L1b. A switch SW5d is provided between the coupling electrode 72 and the second wiring L2b.

The switches SW5a, SW5b, SW5c, and SW5d are switched between on and off in response to the control signal from the controller 11. The operations of the switches SW5a, SW5b, SW5c, and SW5d individually drive the first electrode 33 and the third electrodes 24. Although not illustrated, in the same manner as in FIGS. 19 to 22, these switches and wiring are provided at both ends of the first electrode 33 and the third electrodes 24.

In the present modification, during the electromagnetic induction touch detection, either of the switches SW5a and SW5c is turned on, and the switches SW5b and SW5d are turned off. As a result, the third electrode 24 is coupled to either of the first wiring L1b and the second wiring L2b, and supplied with the first drive signal VTP from the driver IC 19. The first electrode 33 is uncoupled from the first wiring L1b and the second wiring L2b. During the electromagnetic induction touch detection, only the third electrode 24 is driven as the transmitting coil CTx, and the first electrode 33 is placed in the floating state.

During the mutual-capacitive touch detection, the switches SW5a and SW5c are turned off, and either of the switches SW5b and SW5d is turned on. As a result, during the mutual-capacitive touch detection, only the first electrode 33 is driven as the drive electrode, and the third electrode 24 is placed in the floating state.

Third Embodiment

Figure 28:
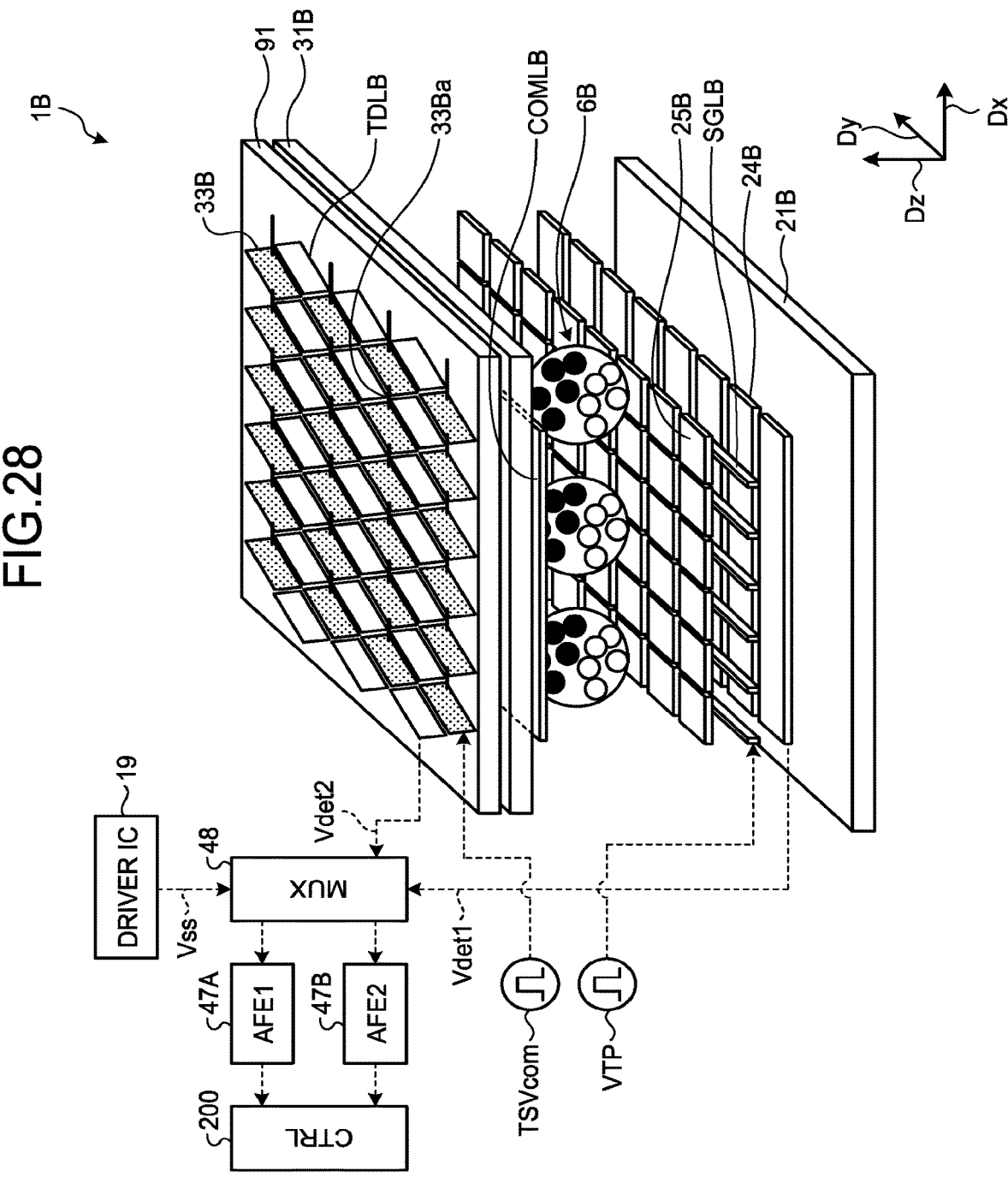
FIG. 28 is an exploded perspective view of a display device according to a third embodiment of the present disclosure.
Figure 29:
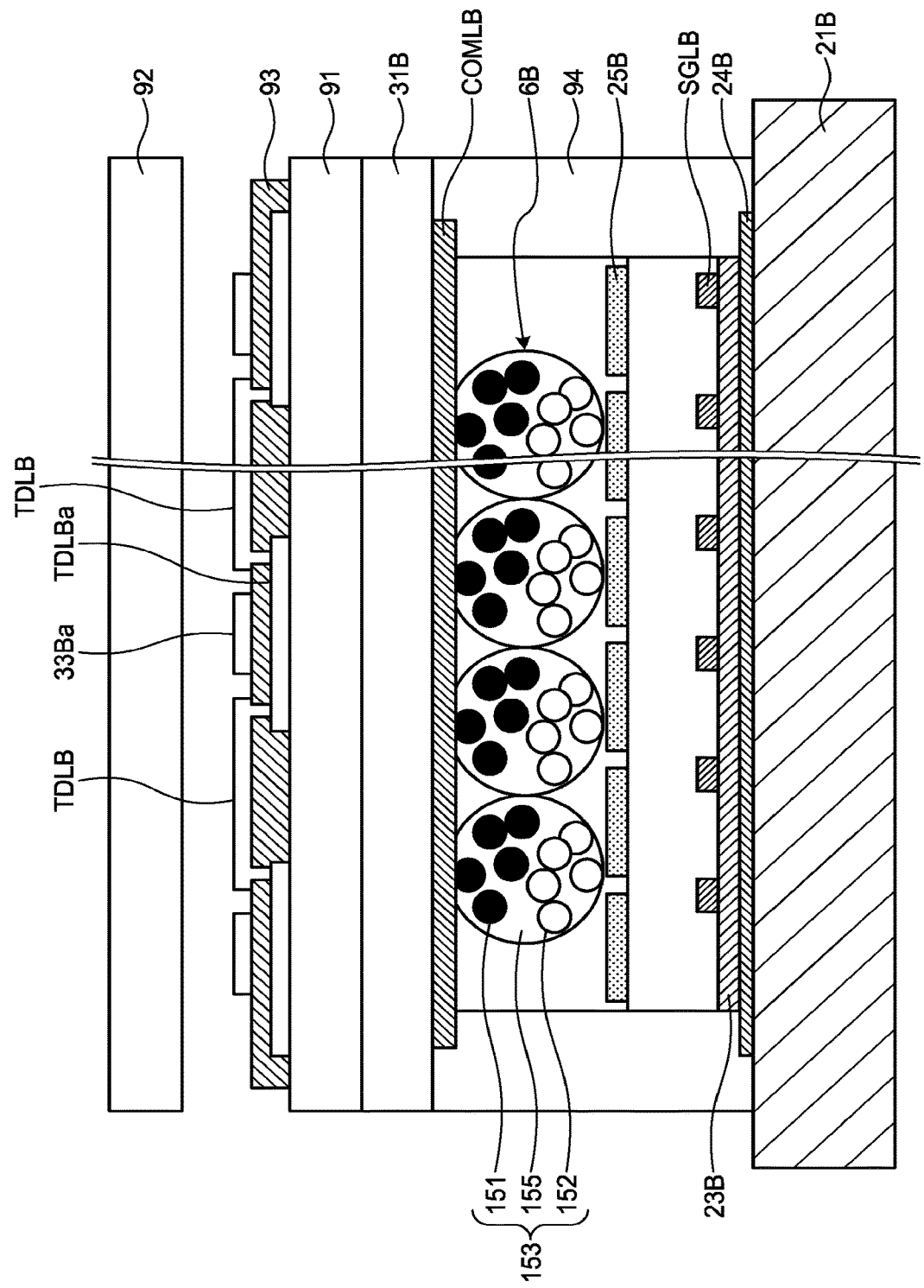
FIG. 29 is a schematic diagram illustrating a sectional structure of the display device according to the third embodiment.
Figure 30:
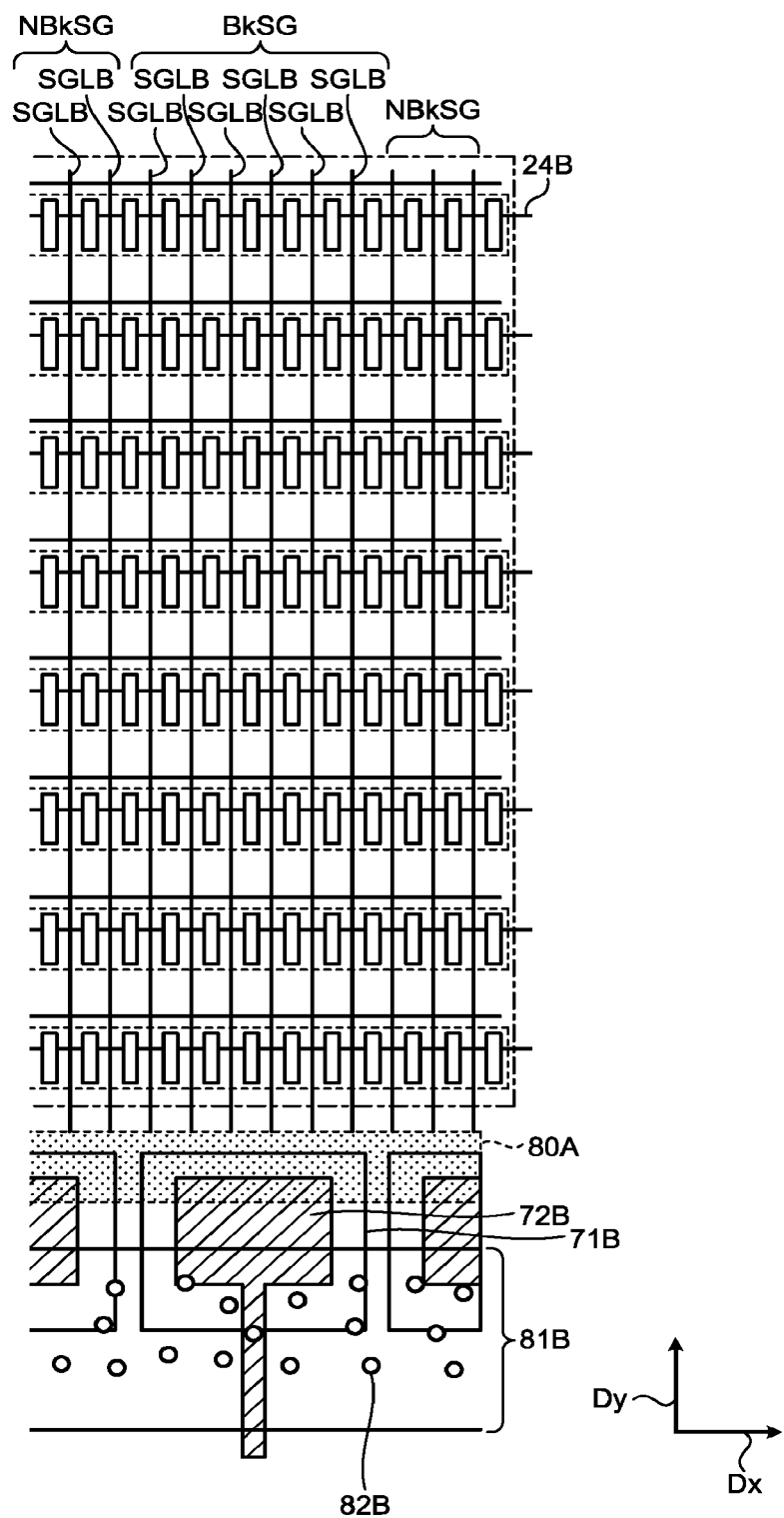
FIG. 30 is a plan view schematically illustrating third electrodes, signal lines, and a conductive portion.

FIG. 28 is an exploded perspective view of a display device according to a third embodiment of the present disclosure. FIG. 29 is a schematic diagram illustrating a sectional structure of the display device according to the third embodiment. FIG. 30 is a plan view schematically illustrating third electrodes, signal lines, and a conductive portion.

As illustrated in FIGS. 28 and 29, a display device 1B of this embodiment includes a first substrate 21B, a second substrate 31B, and an electrophoretic layer 6B. The display device 1B of this embodiment is an electrophoretic display panel using the electrophoretic layer 6B as a display functional layer. FIG. 29 illustrates an enlarged view of a plurality of pixels.

In this embodiment, as illustrated in FIG. 28, third electrodes 24B, signal lines SGLB, pixel electrodes 25B, the electrophoretic layer 6B, a common electrode COMLB, and the second substrate 31B are stacked in this order on the first substrate 21B. First electrodes 33B and second electrodes TDLB are provided on the second substrate 31B, and a barrier film 91 is interposed between the second substrate 31B and the first and second electrodes 33B and TDLB.

As illustrated in FIG. 29, the second substrate 31B is disposed so as to be opposed to the first substrate 21B. A seal portion 94 is provided between the second substrate 31B and the first substrate 21B. The electrophoretic layer 6B is sealed in an internal space surrounded by the second substrate 31B, the first substrate 21B, and the seal portion 94. The first substrate 21B is a glass substrate or a resin substrate having a light-transmitting property. A light-transmitting resin film is used as the second substrate 31B.

The barrier film 91 and an optical film 92 are provided on the upper side of the second substrate 31B. The first electrodes 33B and the second electrodes TDLB are provided between the barrier film 91 and the optical film 92. A color filter may be provided between the second substrate 31B and the optical film 92, or on the optical film 92. In the case where the color filter is not provided, the display device 1B is a display device for monochrome display.

The common electrode COMLB is provided on a surface of the second substrate 31B opposed to the first substrate 21B. The common electrode COMLB is disposed so as to be opposed to the pixel electrodes 25B. The electrophoretic layer 6B is provided between the common electrode COMLB and the pixel electrodes 25B.

The electrophoretic layer 6B includes a plurality of microcapsules 153. The electrophoretic layer 6B is formed, for example, by applying ink containing the microcapsules 153 to the second substrate 31B provided with the common electrode COMLB. A plurality of black fine particles 151, a plurality of white fine particles 152, and a dispersion liquid 155 are sealed in each of the microcapsules 153. The black fine particles 151 and the white fine particles 152 are dispersed in the dispersion liquid 155.

The dispersion liquid 155 is a light-transmitting liquid, such as a silicone oil. The black fine particles 151 are electrophoretic particles, and are made of, for example, negatively charged graphite. The white fine particles 152 are electrophoretic particles, and are made of, for example, positively charged titanium oxide ($TiO_2$).

The dispersion state of the black fine particles 151 and the white fine particles 152 is changed by an electric field generated between the pixel electrodes 25B and the common electrode COMLB. The transmission state of light transmitted through the electrophoretic layer 6B changes with the dispersion state of the black fine particles 151 and the white fine particles 152. Thus, an image is displayed on the display surface. For example, when a positive potential is applied to the common electrode COMLB and a negative potential is applied to the pixel electrodes 25B, the black fine particles 151 move toward the second substrate 31B, and the white fine particles 152 move toward the first substrate 21B. In this case, black is displayed.

As illustrated in FIG. 30, the third electrodes 24B and the signal lines SGLB are provided so as to intersect with each other in the plan view. The signal lines SGLB are electrically coupled to coupling electrodes 72B through a switching circuit 80A. The switching circuit 80A switches the coupling state of the signal lines SGLB between the display period Pd and the sensing periods. The switching circuit 80A includes, for example, the switches S1, S2, S5, S6, and S10 illustrated in FIGS. 9 and 10. The coupling state of the third electrodes 24B is also switched in the same manner as in the configurations illustrated in FIGS. 9 and 10.

As illustrated in FIG. 28, during the electromagnetic induction touch detection, the driver IC 19 supplies the first drive signal VTP to the signal lines SGLB. The signal lines SGLB serve as the transmitting coils CTx during the electromagnetic induction touch detection. As a result, the electromagnetic induction is generated among the signal lines SGLB, the touch pen 100, and the third electrodes 24B.

As illustrated in FIG. 28, the first electrodes 33B and the second electrodes TDLB are provided in the same layer. The second substrate 31B is provided between the common electrode COMLB and both the first electrodes 33B and the second electrodes TDLB. The first electrodes 33B are arranged in the first direction Dx. The first electrodes 33B adjacent in the first direction Dx are coupled to each other through a coupling line 33Ba. The first electrodes 33B coupled in the first direction Dx are arranged in the second direction Dy. The second electrodes TDLB are arranged in the second direction Dy. As illustrated in FIG. 29, bridge wiring TDLBa is provided in a layer different from that of the first electrodes 33B and the second electrodes TDLB, and an insulating layer 93 is interposed between the layer in which the first electrodes 33B and the second electrodes TDLB are arranged and the layer in which the bridge wiring TDLBa is arranged. The second electrodes TDLB adjacent in the second direction Dy are coupled to each other through the bridge wiring TDLBa.

The first electrodes 33B and the second electrodes TDLB are made by forming thin metal wires into zigzag lines, wavy lines, or a mesh, the thin metal wires having a width of several micrometers to several tens of micrometers. In the same manner as the common electrode COML, the first electrodes 33B and the second electrodes TDLB may be made of a light-transmitting conductive material, such as ITO.

With this configuration, the electrostatic capacitance is generated between the first electrodes 33B and the second electrodes TDLB. During the mutual-capacitive touch detection, the driver IC 19 (refer to FIG. 7) supplies the second drive signal TSVcom to the first electrodes 33B. The second detection signal Vdet2 corresponding to the change in electrostatic capacitance between the first electrodes 33B and the second electrodes TDLB is supplied from the second electrodes TDLB to the second AFE 47B through the multiplexer 48. As a result, the mutual-capacitive touch detection is performed.

As described above, by being provided with the circuit substrate including the first substrate 21B, the third electrodes 24B, the signal lines SGLB, and the pixel electrodes 25B, the display device 1B including the electrophoretic layer 6B can also satisfactorily perform the electromagnetic induction touch detection.

Fourth Embodiment

Figure 31:
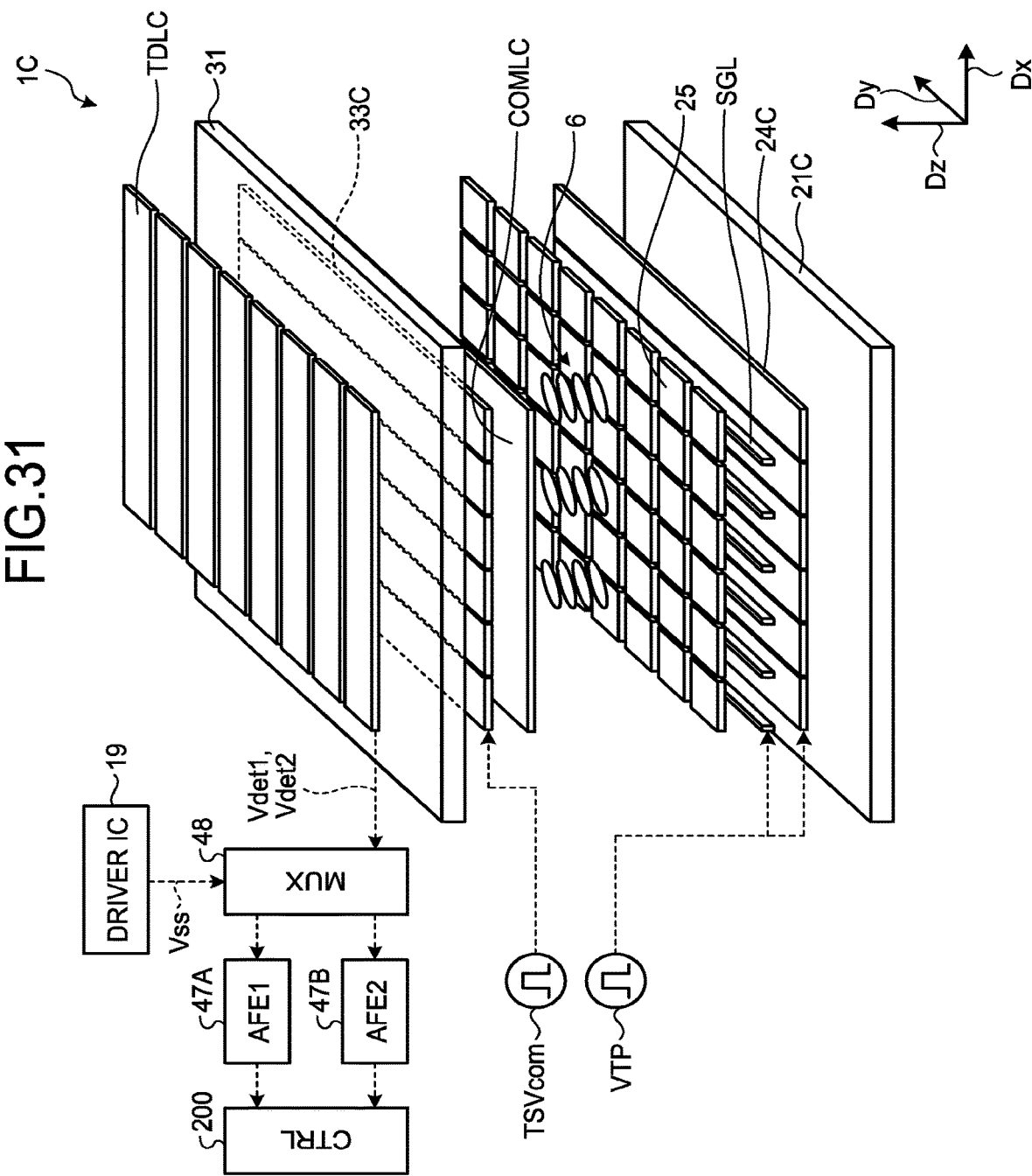
FIG. 31 is an exploded perspective view of a display device according to a fourth embodiment of the present disclosure.

FIG. 31 is an exploded perspective view of a display device according to a fourth embodiment of the present disclosure. Also in a display device 1C of this embodiment, a first substrate 21C, a plurality of third electrodes 24C, the signal lines SGL, the pixel electrodes 25, the liquid crystal layer 6 serving as the display functional layer, a common electrode COMLC, a plurality of first electrodes 33C and a plurality of second electrodes TDLC are stacked in this order.

The second electrodes TDLC extend along the first direction Dx, and are arranged in the second direction Dy. The first electrodes 33C extend along the second direction Dy, and are arranged in the first direction Dx. The third electrodes 24C extend along the second direction Dy, and are arranged in the first direction Dx. That is, the second electrodes TDLC are provided so as to intersect with the signal lines SGL in the plan view, and the first electrodes 33C are provided so as to intersect with the second electrodes TDLC and extend along the signal lines SGL in the plan view. The third electrodes 24C are provided between the first substrate 21C and the pixel electrodes 25, and extend along the signal lines SGL in the plan view.

During the electromagnetic induction touch detection, the driver IC 19 supplies the first drive signal VTP to the signal lines SGL. The signal lines SGL serve as the transmitting coils CTx during the electromagnetic induction touch detection. In this embodiment, the third electrodes 24C opposed to the signal lines SGL supplied with the first drive signal VTP are coupled to the signal lines SGL. The third electrodes 24C serve as the transmitting coils CTx in an integrated manner with the signal lines SGL. As a result, the electromagnetic induction is generated among the signal lines SGL, the third electrodes 24C, the touch pen 100, and the second electrodes TDLC. The electromotive force is generated in the second electrodes TDLC by the mutual induction with the touch pen 100. The first detection signal Vdet1 corresponding to this electromotive force is supplied from the second electrodes TDLC to the first AFE 47A through the multiplexer 48.

The mutual-capacitive touch detection is the same as that of the first embodiment. In other words, the driver IC 19 supplies the second drive signal TSVcom to the first electrodes 33C. The second detection signal Vdet2 corresponding to the change in electrostatic capacitance between the first electrodes 33C and the second electrodes TDLC is supplied from the second electrodes TDLC to the second AFE 47B through the multiplexer 48. In this embodiment, the second electrodes TDLC have the function of the receiving coils CRx in the electromagnetic induction method and the function of the detection electrodes E2 in the mutual-capacitance method.

In this embodiment, the first electrodes 33C and the second electrodes TDLC are disposed on a first side of the common electrode COMLC, and the liquid crystal layer 6, the pixel electrodes 25, the signal lines SGL, and the third electrodes 24C are disposed on a second side of the common electrode COMLC opposite to the first side thereof. This configuration can restrain the electric field generated from the first electrodes 33C from affecting the liquid crystal layer 6 when the second drive signal TSVcom is supplied to the first electrodes 33C. As a result, the mutual-capacitive touch detection can be performed synchronously or asynchronously with the display period.

Figure 32:
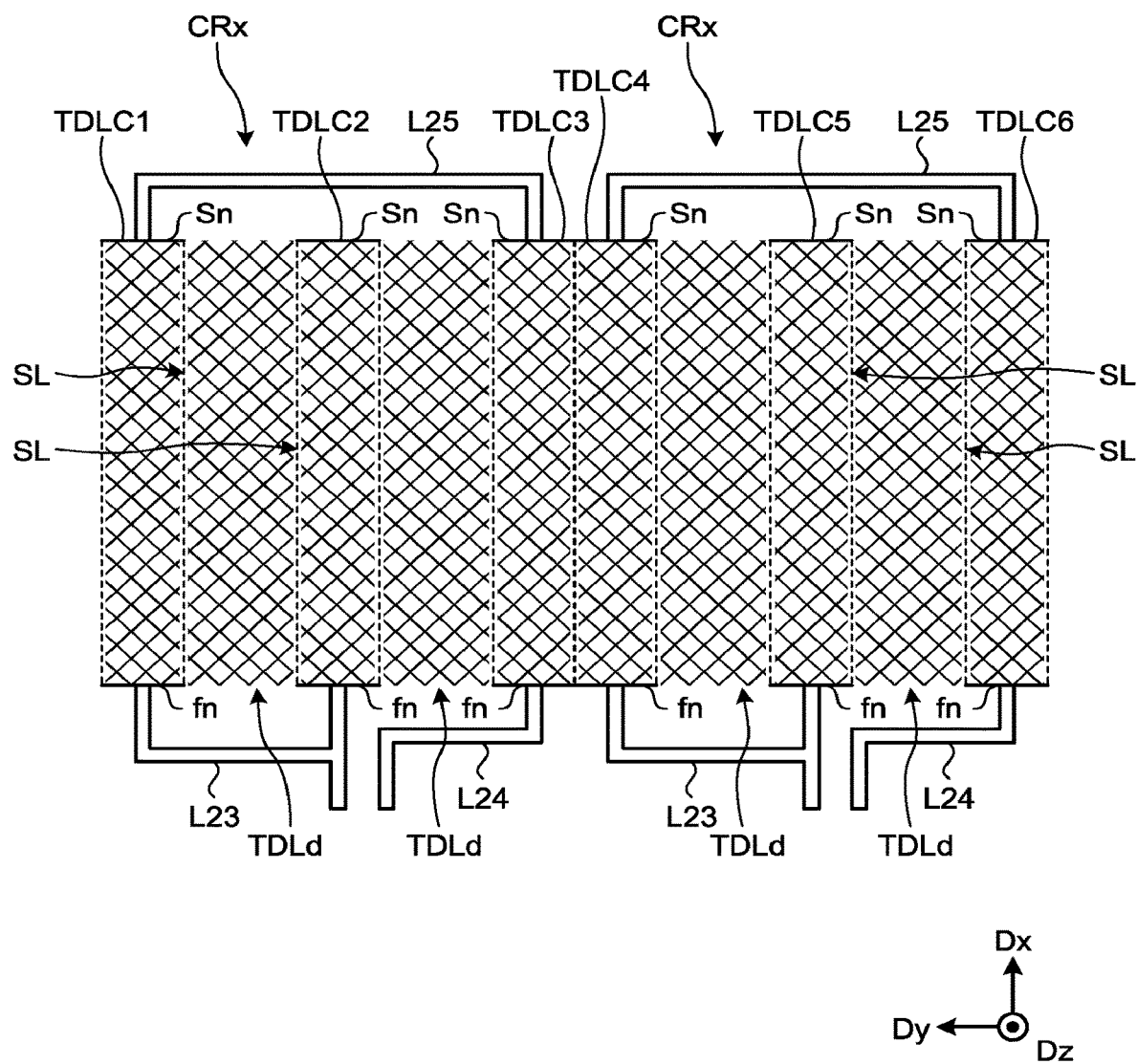
FIG. 32 is a plan view schematically illustrating second electrodes according to the fourth embodiment.

The following describes the configuration of the second electrodes TDLC of this embodiment. FIG. 32 is a plan view schematically illustrating the second electrodes according to the fourth embodiment. FIG. 32 illustrates six second electrodes TDLC1, TDLC2, TDLC3, TDLC4, TDLC5, and TDLC6 of the second electrodes TDLC. In the following description, the six second electrodes TDLC1, TDLC2, TDLC3, TDLC4, TDLC5, and TDLC6 will each be referred to as a second electrode TDLC when they need not be distinguished from one another.

The second electrodes TDLC are made by forming thin metal wires into a mesh, the thin metal wires having a width of several micrometers to several tens of micrometers. A dummy electrode TDLd is provided between the adjacent second electrodes TDLC. The dummy electrode TDLd is made of mesh-shaped thin metal wires similar to those of the second electrode TDLC. The dummy electrodes TDLd are isolated by slits SL from the second electrodes TDLC, and are not coupled to wiring L3, L4, and L5. That is, the dummy electrodes TDLd are in the floating state. The configuration described above reduces the difference in light transmittance between a portion provided with the second electrodes TDLC and a portion provided with the dummy electrodes TDLd.

A lower end fn of the second electrode TDLC1 is coupled to the lower end fn of the second electrode TDLC2 through wiring L23. Wiring L24 is coupled to the lower end fn of the second electrode TDLC3. An upper end Sn of the second electrode TDLC1 is coupled to the upper end Sn of the second electrode TDLC3 through wiring L25. Either one of the wiring L23 and the wiring L24 is coupled to the first AFE 47A and the second AFE 47B through the multiplexer 48 (refer to FIG. 31). The other one of the wiring L23 and the wiring L24 is coupled to the ground (not illustrated). The same configuration applies to the second electrodes TDLC4, TDLC5, and TDLC6.

In this manner, the second electrode TDLC1, the wiring L25, and the second electrode TDLC3 are coupled together so as to form a loop surrounding the dummy electrodes TDLd and the second electrode TDLC2. As a result, the second electrode TDLC1, the wiring L25, and the second electrode TDLC3 constitute the receiving coil CRx in the electromagnetic induction method. Specifically, when the magnetic field M2 from the touch pen 100 (refer to FIG. 4) passes through a region surrounded by the second electrode TDLC1, the wiring L25, and the second electrode TDLC3, an electromotive force corresponding to a variation in the magnetic field M2 is generated in the second electrode TDLC1, the wiring L25, and the second electrode TDLC3. A signal corresponding to this electromotive force is supplied to the first AFE 47A.

In the capacitance method, the second electrodes TDLC1, TDLC2, and TDLC3 are electrically coupled to one another, and serve as one detection electrode block. The second electrodes TDLC1, TDLC2, and TDLC3 supply a signal corresponding to a change in capacitance between themselves and the first electrodes 33C to the second AFE 47B.

Figure 33:
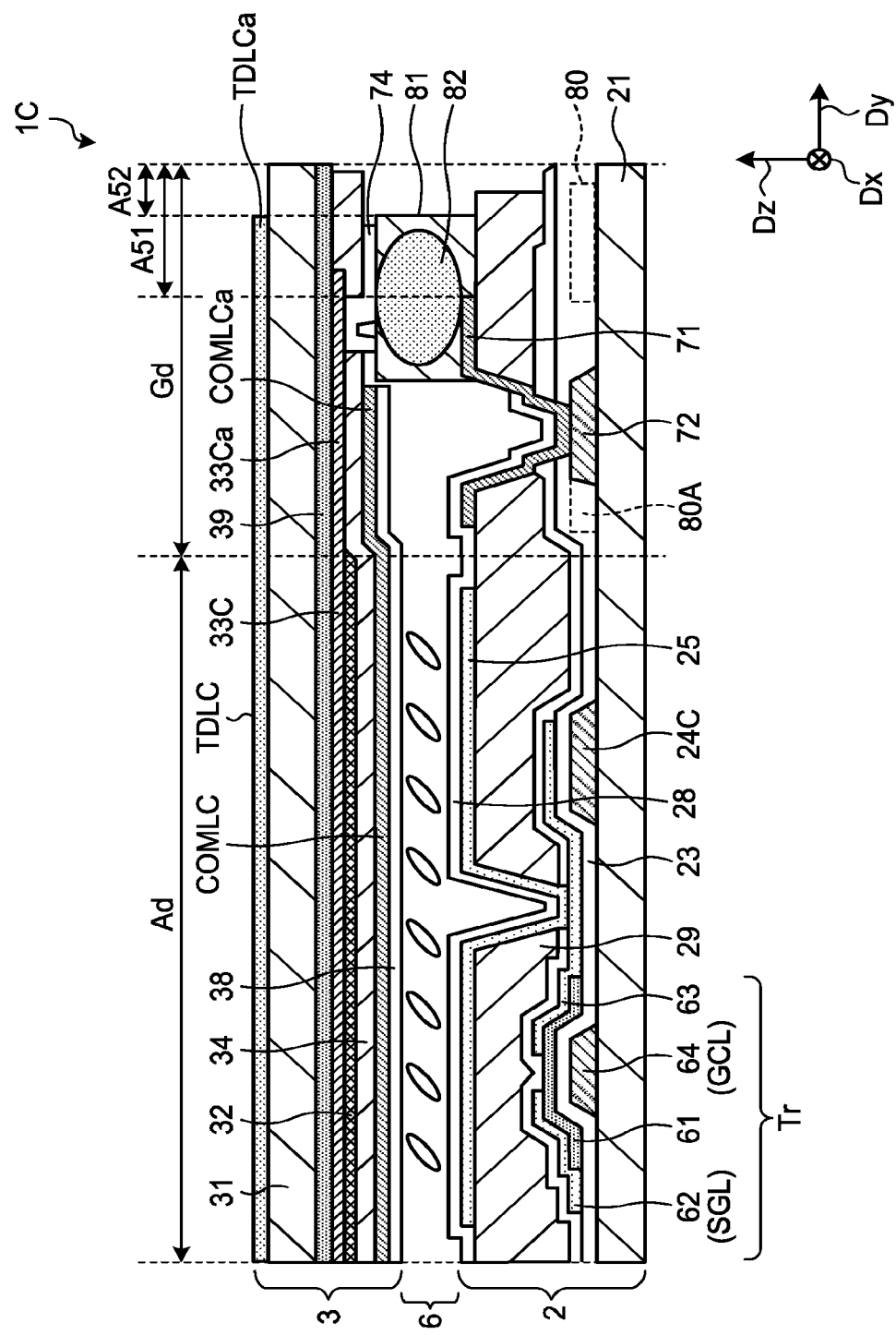
FIG. 33 is a schematic sectional diagram for explaining a coupling configuration of the first electrodes according to the fourth embodiment.
Figure 34:
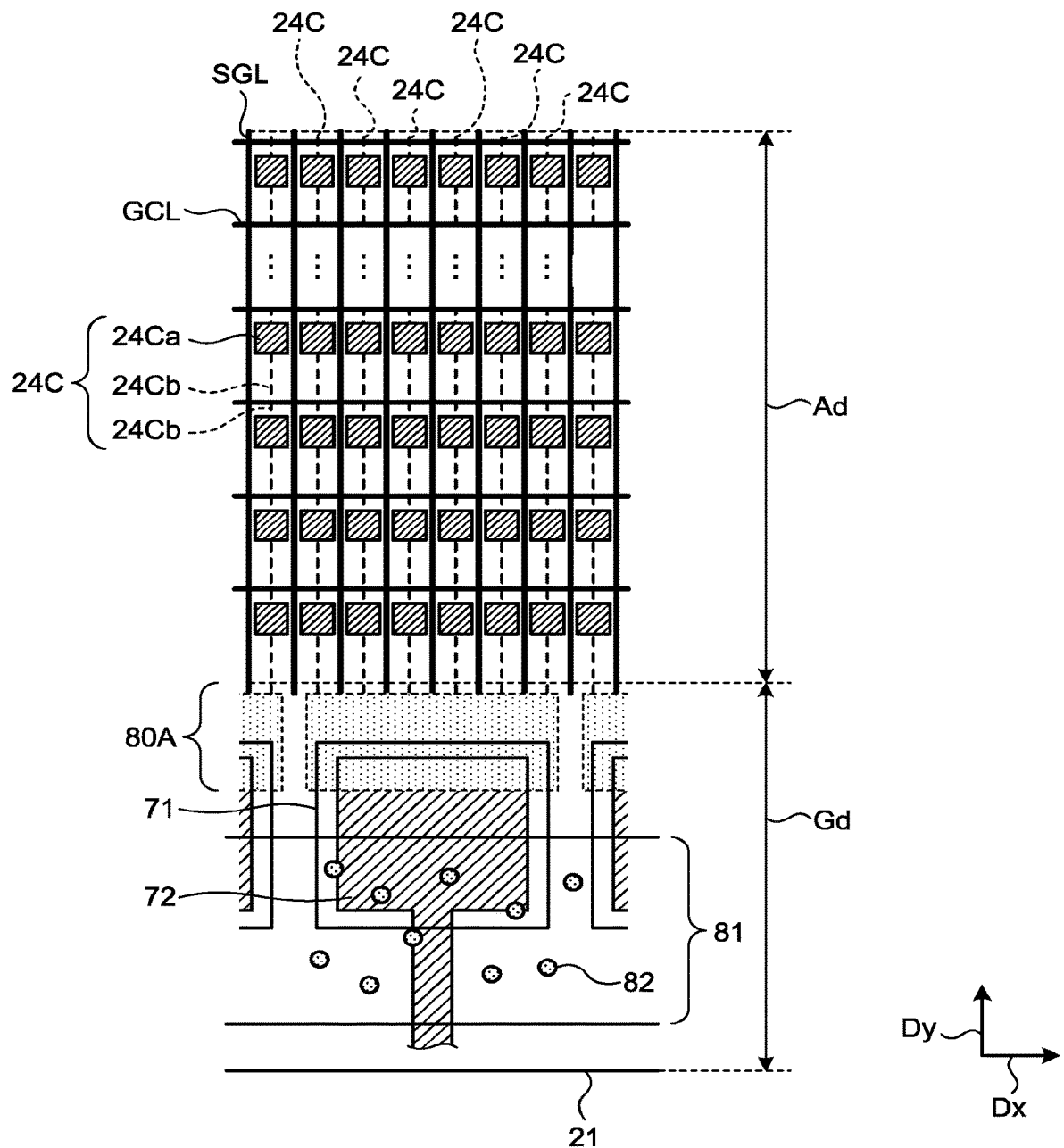
FIG. 34 is a plan view schematically illustrating the third electrodes and the conductive portion according to the fourth embodiment.
Figure 35:
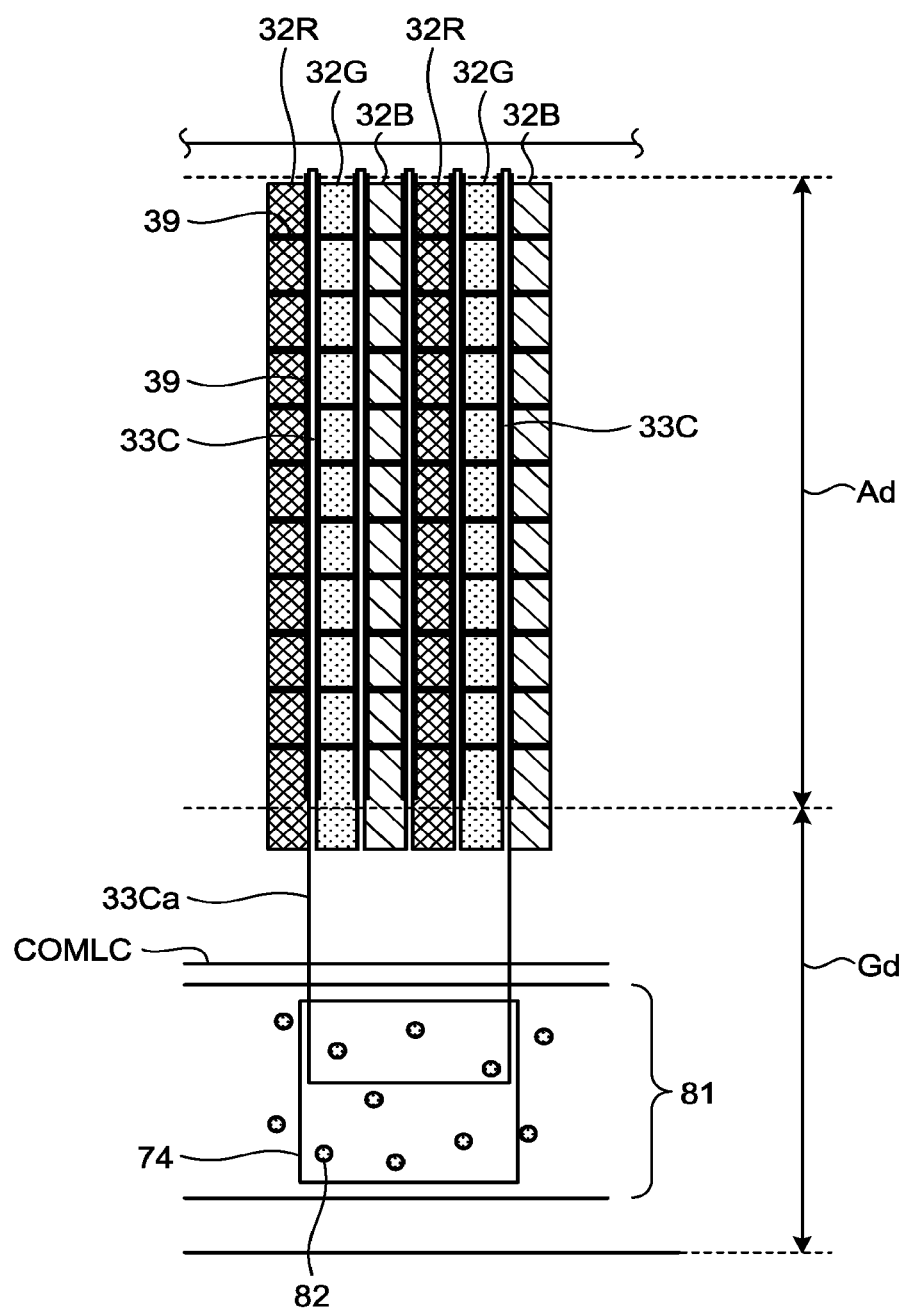
FIG. 35 is a plan view schematically illustrating the first electrodes and the conductive portion according to the fourth embodiment.

FIG. 33 is a schematic sectional diagram for explaining a coupling configuration of the first electrodes according to the fourth embodiment. FIG. 34 is a plan view schematically illustrating the third electrodes and the conductive portion according to the fourth embodiment. FIG. 35 is a plan view schematically illustrating the first electrodes and the conductive portion according to the fourth embodiment.

As illustrated in FIG. 33, the switching circuit 80A is coupled to the coupling electrodes 72. The switching circuit 80A switches the coupling state of the signal lines SGL and the third electrodes 24C, and includes, for example, the switches S1, S2, S5, S6, and S10 illustrated in FIGS. 9 and 10.

As illustrated in FIGS. 34 and 35, the third electrodes 24C are longer in the same direction as that of the signal lines SGL and the first electrodes 33C. As illustrated in FIG. 34, more than one of the third electrodes 24C and more than one of the signal lines SGL are coupled to one of the coupling electrodes 72. During the display period Pd, the signal lines SGL and the third electrodes 24C are uncoupled from each other by an operation of the switching circuit 80A, and are individually driven. During the first sensing period Pem, the signal lines SGL supplied with the first drive signal VTP are coupled to the third electrodes 24C opposed to the signal lines SGL. As a result, the third electrodes 24C are supplied with the same potential signal as the first drive signal VTP.

Also in the display device 1C of this embodiment, during the first sensing period Pem, the signal lines SGL and the third electrodes 24C are supplied with the same signal as each other in response to the control signal from the controller 11. As a result, the response to the first drive signal VTP is improved in the same manner as in the first embodiment.

As illustrated in FIG. 35, more than one of the first electrodes 33C are coupled in a bundle to a single coupling portion 33Ca. The coupling portion 33Ca is coupled to the conductive layer 74. With this configuration, the first electrodes 33C are coupled to the peripheral circuit region 80 provided on the first substrate 21 (refer to FIG. 33) through the conductive particles 82 of the conductive portion 81. Also in the display device 1C of this embodiment, during the second sensing period Pes, the first electrodes 33C are supplied with the second drive signal TSVcom in response to the control signal from the controller 11. As a result, the response to the second drive signal TSVcom is improved in the same manner as in the first embodiment. As illustrated in FIG. 35, the color regions 32R, 32G, and 32B of the color filter 32 extend along the first electrodes 33C in the plan view.

Fifth Embodiment

Figure 36:
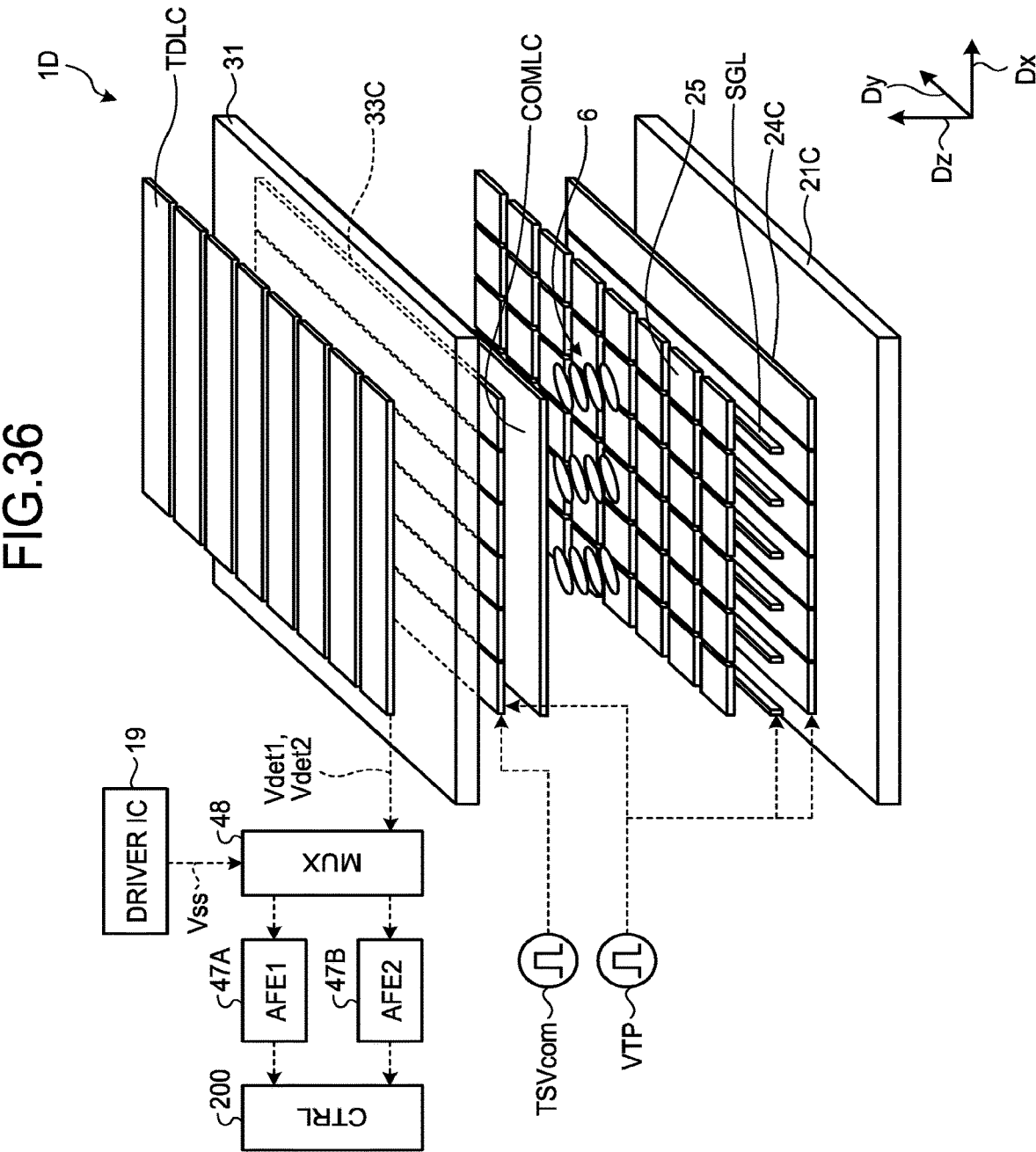
FIG. 36 is an exploded perspective view of a display device according to a fifth embodiment of the present disclosure.

FIG. 36 is an exploded perspective view of a display device according to a fifth embodiment of the present disclosure. In a display device 1D of this embodiment, the configurations and the order of stacking of the first substrate 21C, the third electrodes 24C, the signal lines SGL, the pixel electrodes 25, the liquid crystal layer 6 serving as the display functional layer, the common electrode COMLC, the first electrodes 33C and the second electrodes TDLC are the same as those of the fourth embodiment.

During the electromagnetic induction touch detection, the driver IC 19 supplies the first drive signal VTP to the signal lines SGL. In this embodiment, the third electrodes 24C and the first electrodes 33C opposed to the signal lines SGL supplied with the first drive signal VTP are coupled to the signal lines SGL. With this configuration, the third electrodes 24C and the first electrodes 33C are supplied with the same potential signal as that of the signal lines SGL, and integrally serve as the transmitting coil CTx. As a result, the electromagnetic induction is generated among the signal lines SGL, the third electrodes 24C, the first electrodes 33C, the touch pen 100, and the second electrodes TDLC. The magnetic field generated by the first electrodes 33C overlaps with the magnetic fields generated by the signal lines SGL and the third electrodes 24C. This overlap can increase the strength of the magnetic field passing through the detection region Aem.

For example, the switching circuit 80A illustrated in FIGS. 33 and 34 can switch the coupling state of the first electrodes 33C. As a result, during the mutual-capacitive touch detection, the first electrodes 33C are driven in the same manner as in the fourth embodiment.

Sixth Embodiment

Figure 37:
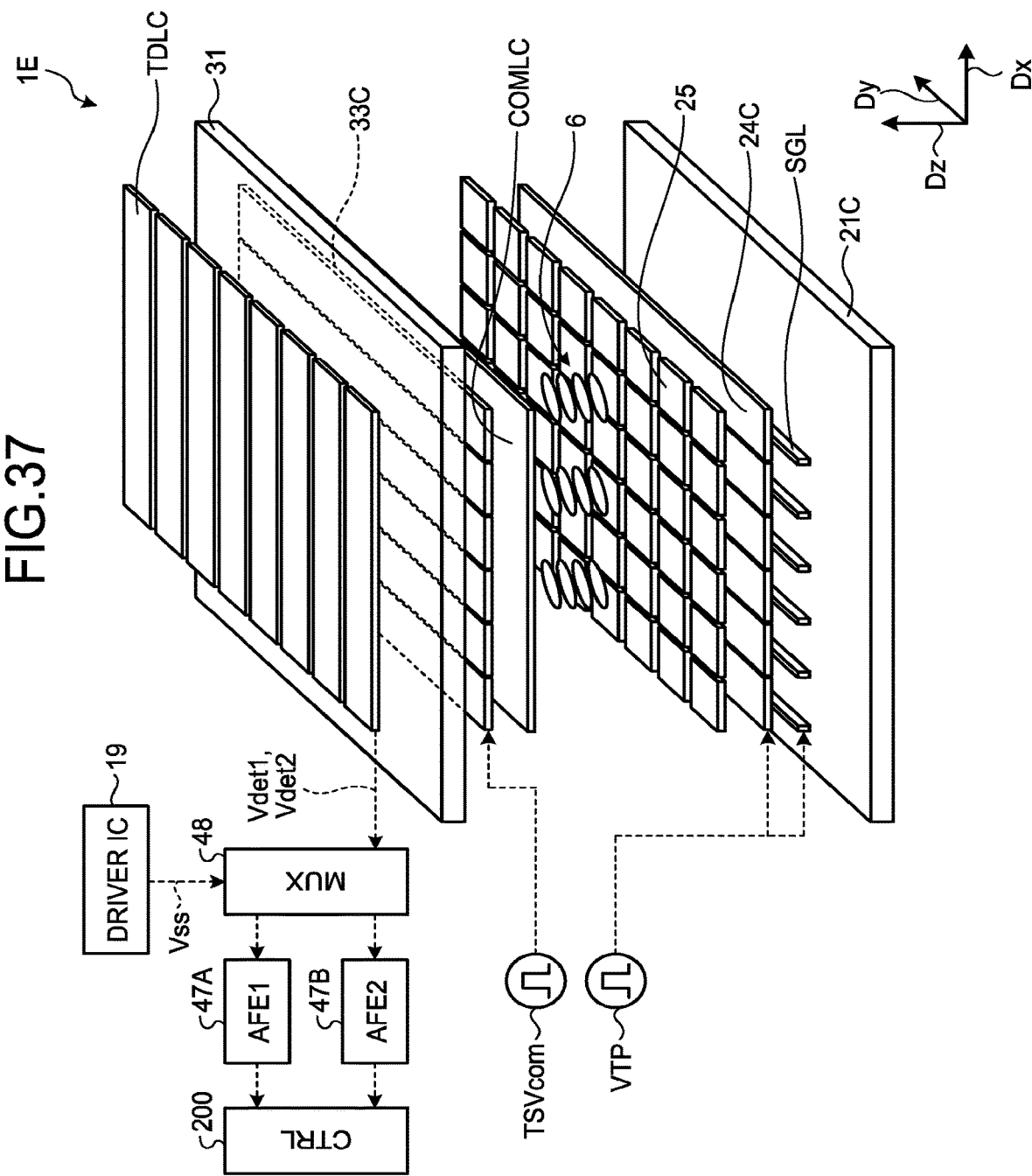
FIG. 37 is an exploded perspective view of a display device according to a sixth embodiment of the present disclosure.
Figure 38:
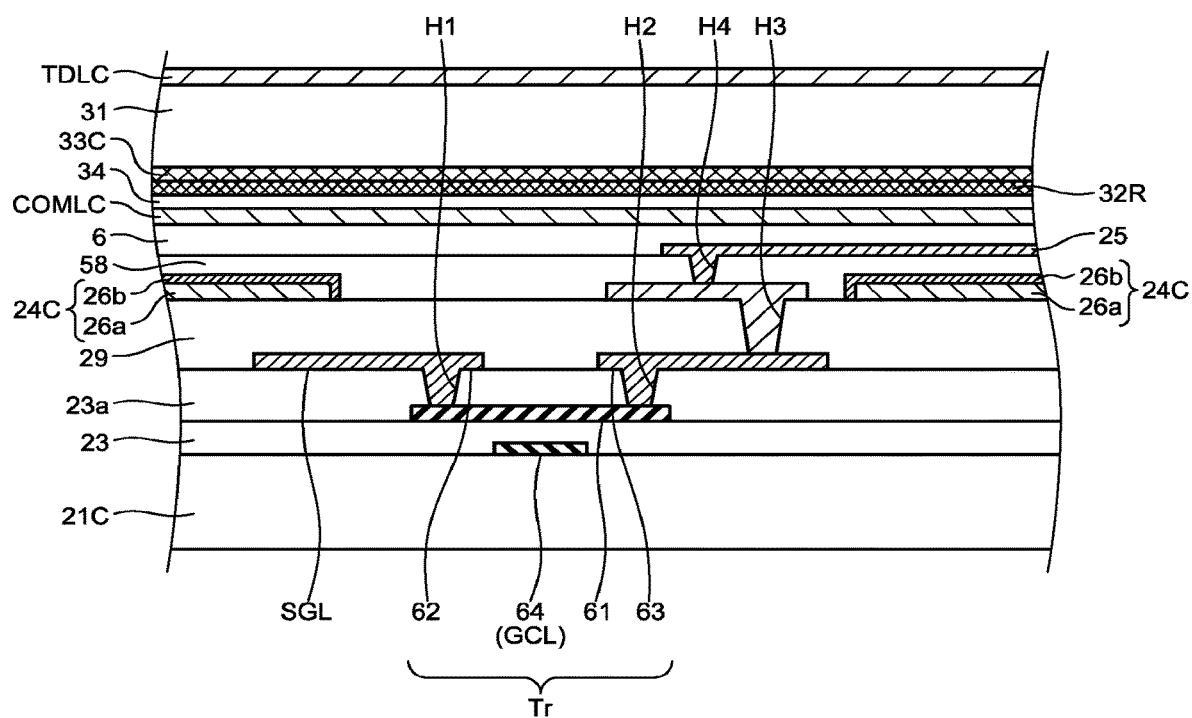
FIG. 38 is a schematic diagram illustrating a sectional structure of the display device according to the sixth embodiment.

FIG. 37 is an exploded perspective view of a display device according to a sixth embodiment of the present disclosure. FIG. 38 is a schematic diagram illustrating a sectional structure of the display device according to the sixth embodiment. As illustrated in FIG. 37, in a display device 1E of this embodiment, the first substrate 21C, the signal lines SGL, the third electrodes 24C, the pixel electrodes 25, the liquid crystal layer 6 serving as the display functional layer, the common electrode COMLC, the first electrodes 33C, and the second electrodes TDLC are stacked in this order. In other words, the signal lines SGL are provided between the first substrate 21C and the third electrodes 24C in the direction orthogonal to the surface of the first substrate 21C.

In this embodiment, the configuration of arrangement of the signal lines SGL, the third electrodes 24C, the first electrodes 33C, and the second electrodes TDLC in the plan view is the same as that of the fourth and fifth embodiments. The switching circuit 80A switches the coupling state of the signal lines SGL, the third electrodes 24C, and the first electrodes 33C in the same manner as in the example illustrated in FIGS. 33 to 35.

Also in this embodiment, the signal lines SGL and the third electrodes 24C are supplied with the same first drive signal VTP during the electromagnetic induction touch detection, as illustrated in FIG. 37. During the mutual-capacitive touch detection, the first electrodes 33C are supplied with the second drive signal TSVcom. The second electrodes TDLC have the function of the receiving coils CRx in the electromagnetic induction method and the function of the detection electrodes E2 in the mutual-capacitance method.

As illustrated in FIG. 38, the switching element Tr is provided on the first substrate 21C. Specifically, the gate electrode 64 (gate line GCL) is provided on the first substrate 21C. The semiconductor layer 61 is provided on the gate electrode 64 (gate line GCL) with the insulating layer 23 interposed therebetween. The source electrode 62 (signal line SGL) and the drain electrode 63 are provided on the semiconductor layer 61 with an insulating layer 23a interposed therebetween. The source electrode 62 is electrically coupled to the semiconductor layer 61 through a contact hole H1. The drain electrode 63 is electrically coupled to the semiconductor layer 61 through a contact hole H2.

The planarizing film 29 is provided so as to cover the source electrodes 62 (signal lines SGL) and the drain electrodes 63. The third electrodes 24C are provided on a surface of the planarizing film 29. An insulating layer 58 is provided so as to cover the third electrodes 24C. The pixel electrodes 25 are provided on the upper side of the insulating layer 58. The pixel electrodes 25 are electrically coupled to the drain electrodes 63 through contact holes H3 and H4.

The third electrodes 24C and the pixel electrodes 25 are stacked with the insulating layer 58 therebetween in the direction orthogonal to the surface of the first substrate 21C. This configuration generates retention capacitance between the third electrodes 24C and the pixel electrodes 25.

Each of the third electrodes 24C includes a metal layer 26a and a light-transmitting conductive layer 26b covering the metal layer 26a. The metal layer 26a is made up of at least one of metal materials, such as aluminum (Al), copper (Cu), silver (Ag), molybdenum (Mo), and an alloy thereof. The light-transmitting conductive layer 26b is made up of, for example, ITO.

In this embodiment, the third electrodes 24C are provided in a layer different from that of the switching elements Tr. Therefore, each of the third electrodes 24C can have a shape with a large area without being much restricted by, for example, the gate lines GCL and the signal lines SGL. This configuration can increase the overlapping area of the third electrodes 24C and the pixel electrodes 25 so as to increase the retention capacitance.

Each of the third electrodes 24C includes a metal layer 26a, and can have a larger plane area. Therefore, the resistance value of the third electrodes 24C can be lower than that of the fourth and fifth embodiments. As a result, the response to the first drive signal VTP is improved.

Seventh Embodiment

Figure 39:
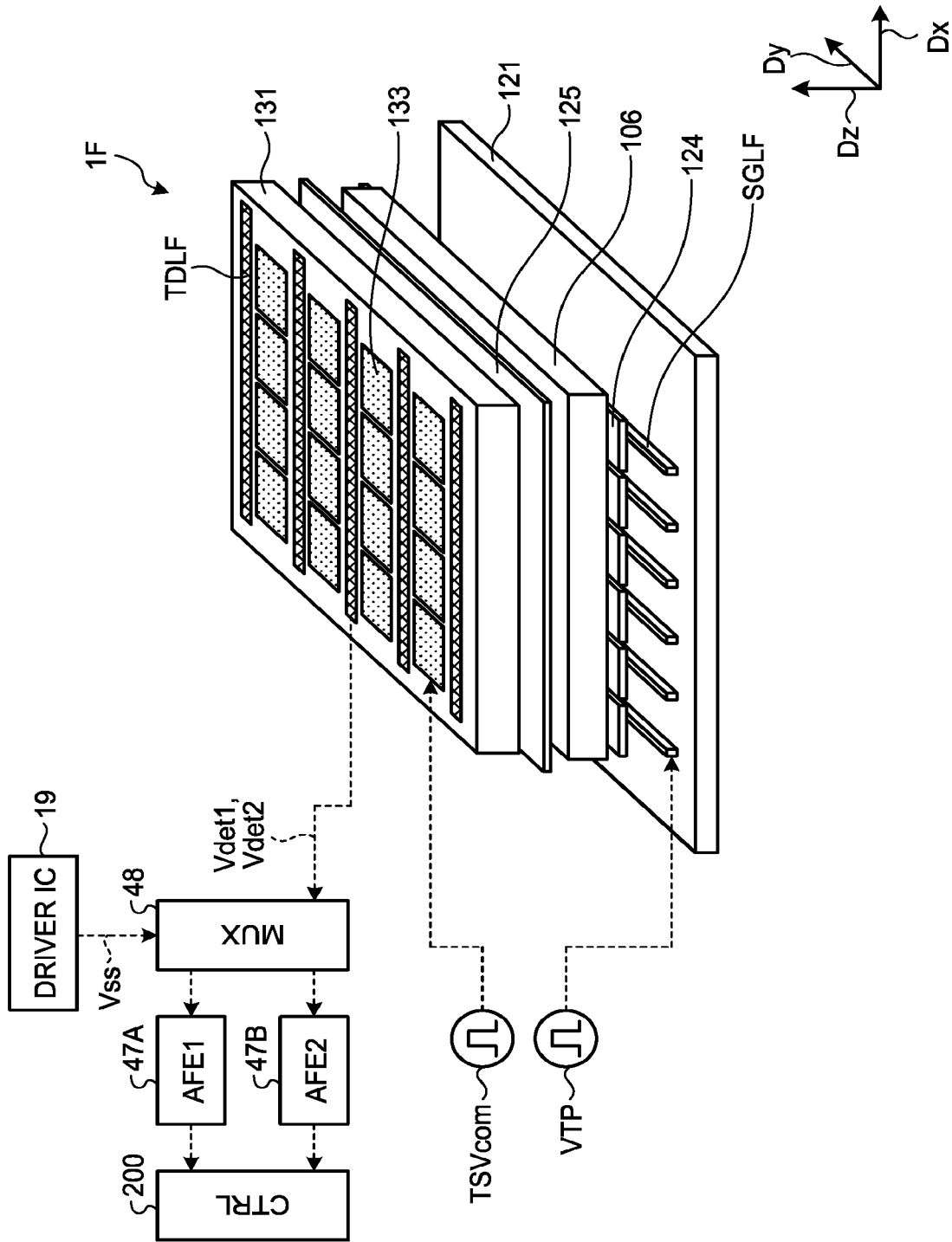
FIG. 39 is an exploded perspective view of a display device according to a seventh embodiment of the present disclosure.
Figure 40:
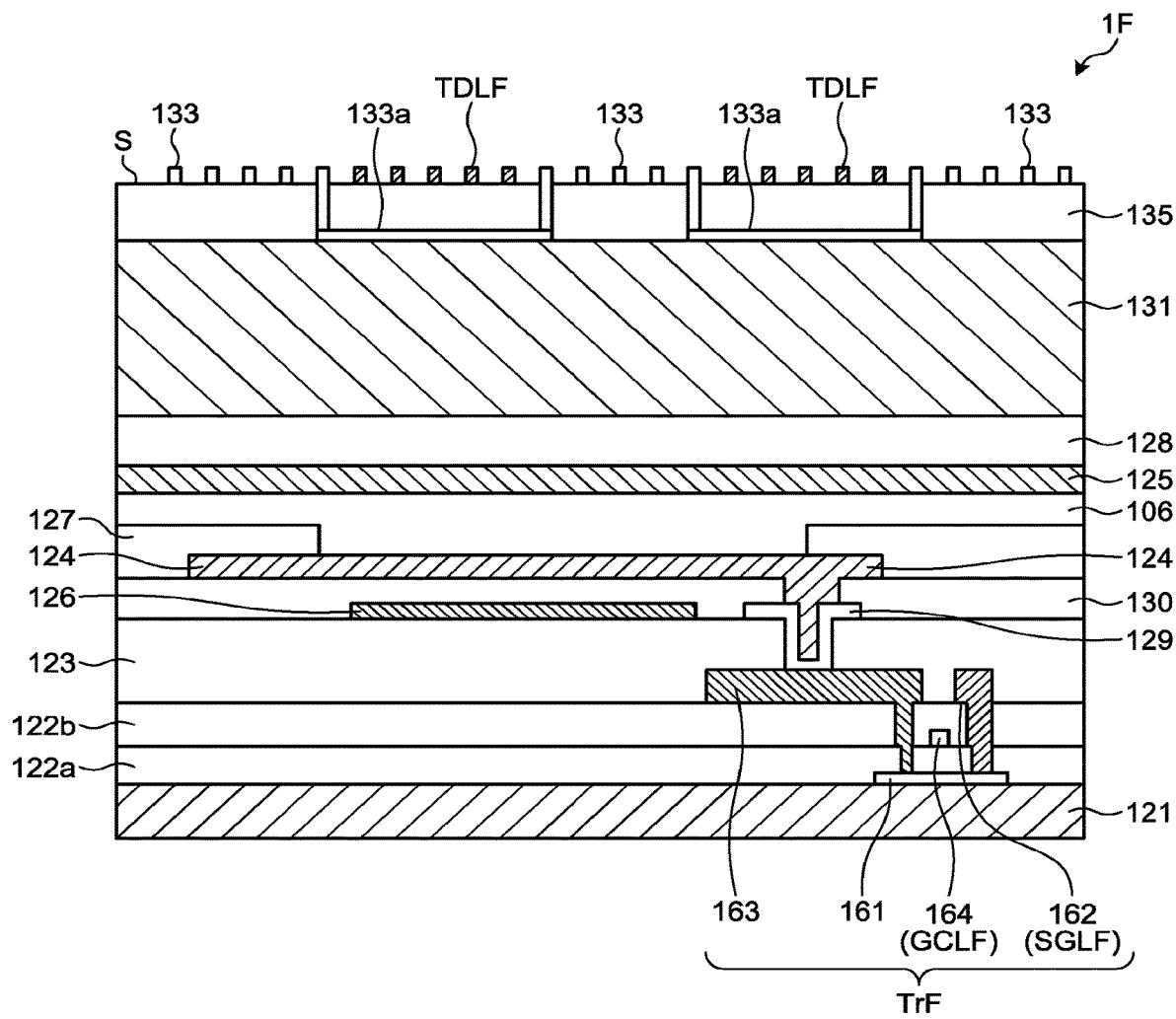
FIG. 40 is a schematic diagram illustrating a sectional structure of the display device according to the seventh embodiment.
Figure 41:
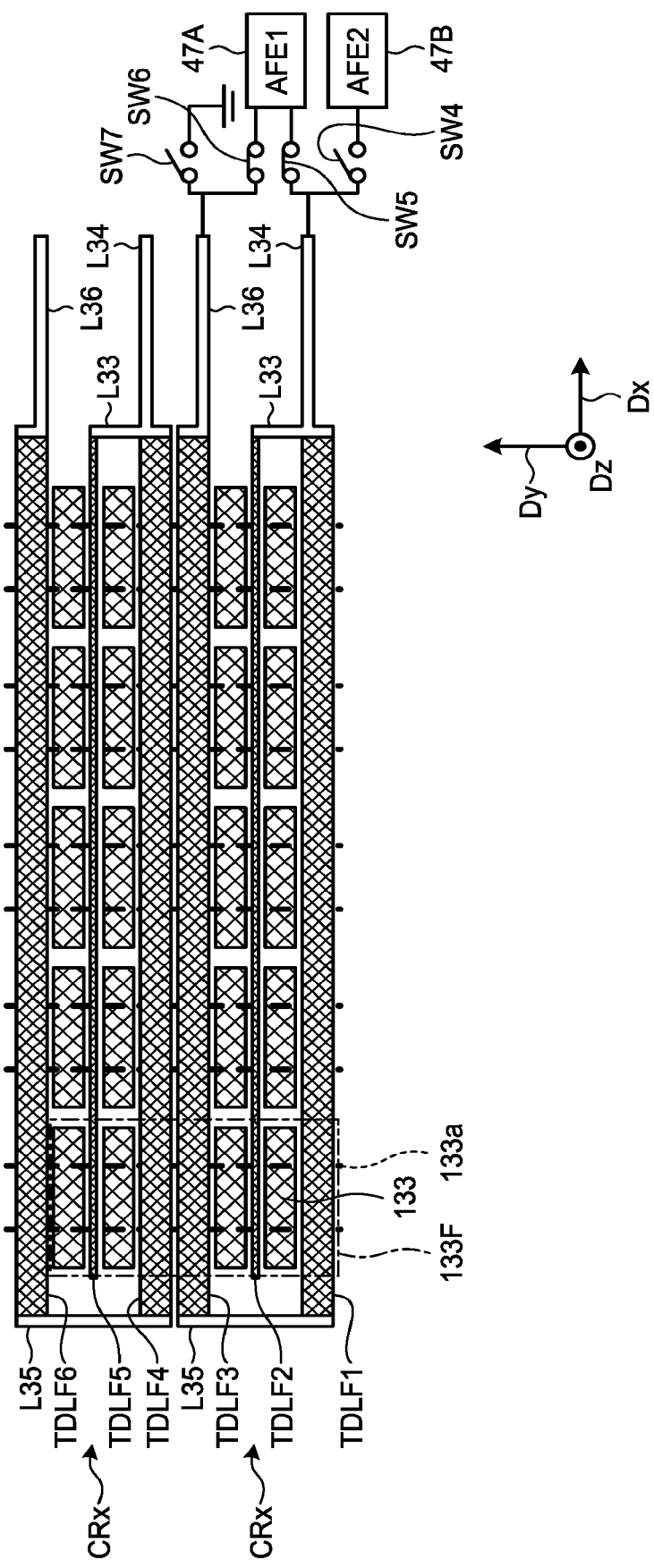
FIG. 41 is a plan view schematically illustrating first electrodes and second electrodes according to the seventh embodiment.

FIG. 39 is an exploded perspective view of a display device according to a seventh embodiment of the present disclosure. FIG. 40 is a schematic diagram illustrating a sectional structure of the display device according to the seventh embodiment. FIG. 41 is a plan view schematically illustrating first electrodes and second electrodes according to the seventh embodiment. A display device 1F of this embodiment is a display panel using organic light-emitting diodes (OLEDs). That is, the display device 1F is not provided with a light source, such as the backlight.

As illustrated in FIG. 39, in the display device 1F, a first substrate 121, signal lines SGLF, lower electrodes 124, a self-luminous layer 106 serving as the display functional layer, upper electrodes 125, a filling material 131, first electrodes 133, and second electrodes TDLF are stacked in this order.

More specifically, as illustrated in FIG. 40, the display device 1F further includes switching elements TrF, a reflective layer 126, the lower electrodes 124, a conductive layer 129, and insulating layers 122a, 122b, 123, 127, 128, and 130.

Each of the switching elements TrF is provided on the first substrate 121. Specifically, a semiconductor layer 161 is provided on the first substrate 121. A gate electrode 164 (gate line GCLF) is provided on the semiconductor layer 161 with the insulating layer 122a interposed therebetween. A source electrode 162 (signal line SGLF) and a drain electrode 163 are provided on the gate electrode 164 (gate line GCLF) with the insulating layer 122b interposed therebetween. Each of the source electrode 162 and the drain electrode 163 is electrically coupled to the semiconductor layer 161 through a contact hole.

The insulating layer 123 is provided so as to cover the source electrode 162 and the drain electrode 163. The reflective layer 126 is provided on the insulating layer 123, and is made of a metallic-lustered material that reflects light from the self-luminous layer 106. The reflective layer 126 is made up of, for example, silver, aluminum, or gold. The lower electrodes 124 are provided on the reflective layer 126 with the insulating layer 130 interposed therebetween. The self-luminous layer 106 and the upper electrodes 125 are stacked in this order on the lower electrodes 124. In other words, the self-luminous layer 106 is provided between the lower electrodes 124 and the upper electrodes 125.

The lower electrodes 124 serve as anodes of the OLEDs, and are provided corresponding to the respective sub-pixels. The upper electrodes 125 serve as cathodes of the OLEDs. A light-transmitting conductive material, such as ITO, is used as the lower electrodes 124 and the upper electrodes 125. The self-luminous layer 106 contains a polymeric organic material, and includes a hole injection layer, a hole transport layer, a light-emitting layer, an electron transport layer, and an electron injection layer, which are not illustrated.

The insulting layer 127 is an insulting layer that is called a rib and partitions the sub-pixels. The insulting layer 128 is provided so as to cover the upper electrodes 125, and seals the upper electrodes 125. The filling material 131 is a planarizing layer for reducing a level difference between portions provided with the ribs and the other portions.

with the configuration described above, the light emitted from the self-luminous layer 106 travels from the filling material 131 to the eyes of the viewer. The image is displayed on a display surface S by controlling the light quantity of the self-luminous layer 106 for each of the sub-pixels. A plurality of light-emitting materials are used for the sub-pixels of the self-luminous layer 106, and display light of red (R), green (G), and blue (B) colors. As a result, a configuration without a color filter can be obtained.

The self-luminous layer 106 is, however, not limited to this configuration. The same light-emitting material may be used for the respective sub-pixels of the self-luminous layer 106, and color filters different in color may be provided for the sub-pixels. The present disclosure is not limited to above-described configuration. The lower electrodes 124 may serve as the cathodes, and the upper electrodes 125 may serve as the anodes. In that case, the polarities of the switching elements TrF electrically coupled to the lower electrodes 124 can be changed as appropriate.

As illustrated in FIG. 39, during the electromagnetic induction touch detection, the driver IC 19 supplies the first drive signal VTP to the signal lines SGLF. The signal lines SGLF serve as the transmitting coils CTx during the electromagnetic induction touch detection. As a result, the electromagnetic induction is generated among the signal lines SGLF, the touch pen 100, and the second electrodes TDLF. The electromotive force is generated in the second electrodes TDLF by the mutual induction with the touch pen 100. The first detection signal Vdet1 corresponding to this electromotive force is supplied from the second electrodes TDLF to the first AFE 47A through the multiplexer 48.

As illustrated in FIG. 39, the lower electrodes 124 extend along the second direction Dy and arranged in the first direction Dx in the plan view. In other words, the lower electrodes 124 are provided along the signal lines SGLF. This embodiment can also employ a configuration in which the lower electrodes 124 opposed to the signal lines SGLF supplied with the first drive signal VTP are coupled to the signal lines SGLF in the same manner as in the fourth embodiment. In this case, the lower electrodes 124 serve as the transmitting coils CTx in an integrated manner with the signal lines SGLF.

The first electrodes 133 and the second electrodes TDLF are provided in the same layer on the upper side of the filling material 131. The first electrodes 133 and the second electrodes TDLF are made by forming thin metal wires into a mesh, the thin metal wires having a width of several micrometers to several tens of micrometers. The second electrodes TDLF extend along the first direction Dx, and are arranged in the second direction Dy. The first electrodes 133 are each provided between the second electrodes TDLF adjacent in the second direction Dy, and are arranged in the first direction Dx and the second direction Dy. The first electrodes 133 adjacent in the second direction Dy with the second electrodes TDLF in between are coupled to each other through bridge wiring 133a illustrated in FIG. 40. As illustrated in FIG. 40, the bridge wiring 133a is provided on the filling material 131, and the first electrodes 133 and the second electrodes TDLF are provided in a layer on the upper side of the bridge wiring 133a with an insulating layer 135 interposed therebetween. In this manner, the bridge wiring 133a is provided in a layer different from that of the first electrodes 133 and the second electrodes TDLF.

As illustrated in FIG. 39, during the mutual-capacitive touch detection, the driver IC 19 supplies the second drive signal TSVcom to the first electrodes 133. The second detection signal Vdet2 corresponding to the change in electrostatic capacitance between the first electrodes 133 and the second electrodes TDLF is supplied from the second electrodes TDLF to the second AFE 47B through the multiplexer 48. As described above, in this embodiment, the second electrodes TDLF have the function of the receiving coils CRx in the electromagnetic induction method and the function of the detection electrodes E2 in the mutual-capacitance method.

The following describes the configuration of the first electrodes 133 and the second electrodes TDLF in detail with reference to FIG. 41. FIG. 41 illustrates six second electrodes TDLF1, TDLF2, TDLF3, TDLF4, TDLF5, and TDLF6 of the second electrodes TDLF. In the following description, the six second electrodes TDLF1, TDLF2, TDLF3, TDLF4, TDLF5, and TDLF6 will each be referred to as a second electrode TDLF when they need not be distinguished from one another.

The first electrodes 133 are arranged in the first direction Dx between the adjacent second electrodes TDLF. The first electrodes 133 are provided so as to be electrically isolated from the second electrodes TDLF. A first electrode group 133F includes more than one of the first electrodes 133 that are arranged in the second direction Dy and are coupled together through the bridge wiring 133a. The first electrode group 133F intersects with the second electrodes TDLF in the plan view.

The right end of the second electrode TDLF1 is coupled to the right end of the second electrode TDLF2 through wiring L33. The wiring L33 is coupled to either of the first AFE 47A and the second AFE 47B through wiring L34 and either of switches SW4 and SW5. Wiring L36 is coupled to the right end of the second electrode TDLF3. The wiring L36 is coupled to either of the first AFE 47A and the ground through either of switches SW6 and SW7. The left end of the second electrode TDLF1 is coupled to the left end of the second electrode TDLF3 through wiring L35. The same configuration applies to the second electrodes TDLF4, TDLF5, and TDLF6.

In this manner, the second electrode TDLF1, the wiring L35, and the second electrode TDLF3 are coupled together so as to form a loop surrounding more than one of the first electrodes 133 and the second electrode TDLF2. As a result, the second electrode TDLF1, the wiring L35, and the second electrode TDLF3 constitute the receiving coil CRx in the electromagnetic induction method. Specifically, when the magnetic field M2 from the touch pen 100 (refer to FIG. 4) passes through a region surrounded by the second electrode TDLF1, the wiring L35, and the second electrode TDLF3, an electromotive force corresponding to a variation in the magnetic field M2 is generated in the second electrode TDLF1, the wiring L35, and the second electrode TDLF3. In this case, the operations of the switches SW4, SW5, SW6, and SW7 couple the right end of the second electrode TDLF1 to the first AFE 47A, and couple the right end of the second electrode TDLF3 to the ground. As a result, a signal corresponding to the electromotive force is supplied to the first AFE 47A.

In the capacitance method, the second electrodes TDLF1, TDLF2, and TDLF3 are electrically coupled to one another, and serve as one detection electrode block. In this case, the operations of the switches SW4, SW5, SW6, and SW7 couple both the right end of the second electrode TDLF1 and the right end of the second electrode TDLF3 to the second AFE 47B. The second electrodes TDLF1, TDLF2, and TDLF3 supply a signal corresponding to a change in capacitance between themselves and the first electrodes 133 to the second AFE 47B.

The configuration of the first electrodes 133 and the second electrodes TDLF illustrated in FIG. 41 is merely an example, and can be changed as appropriate. For example, the shape of each of the first electrodes 133 and the second electrodes TDLF is not limited to a rectangle or a long shape, and may be another shape. The second electrodes TDLF may be arranged in the first direction Dx and coupled to one another through coupling wiring in the same manner as the first electrodes 133.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure naturally belong to the technical scope of the present disclosure.

What is claimed is:

1. A display device comprising:
a substrate;
a plurality of first electrodes;
a plurality of lines;
a plurality of pixel electrodes;
a display functional layer;
a common electrode opposed to the pixel electrodes;
a plurality of second electrodes;
a plurality of third electrodes; and
a controller,
wherein the substrate, the third electrodes, the pixel electrodes, the display functional layer, and the common electrode are stacked in the order as listed, a distance between the third electrode and the pixel electrode is less than a distance between the common electrode and the pixel electrode,
wherein the first electrodes are opposed to the second electrodes with a space therebetween, and an insulating layer is provided between the common electrode and the first and second electrodes,
wherein the controller is configured to
perform processing during a plurality of display periods to display an image and during a sensing period in a time-division manner, and
control the pixel electrodes, the common electrode, the lines, the first electrodes, and the second electrodes according to the display and sensing periods,
wherein, during the display periods, in response to a control signal from the controller, the pixel electrodes are supplied with a pixel signal through the lines, and the common electrode and the third electrodes are supplied with a common signal,
wherein, during the sensing period, in response to the control signal from the controller, the lines are supplied with a first drive signal to generate a magnetic field, and
wherein, the first electrodes are supplied with a second drive signal to generate electrostatic capacitance between themselves and the second electrodes in response to the control signal from the controller, synchronously or asynchronously with the display periods.

2. The display device according to claim 1,
wherein a switch is provided that is configured to couple together ends on the same side of a pair of the lines, and
wherein, the controller is configured to
couple the pair of the lines to each other by operating the switch during the sensing period, and
uncouple the pair of the lines from each other by operating the switch during a period different from the sensing period.

3. The display device according to claim 1, further comprising:
a first voltage supply configured to supply a first voltage to the lines; and
a second voltage supply configured to supply a second voltage lower than the first voltage to the lines,
wherein, during the sensing period, in response to the control signal from the controller,
the first voltage supply is coupled to one end of at least one of the lines,
the second voltage supply is coupled to the other end of the at least one of the lines,
the second voltage supply is coupled to one end of another line of the lines, and
the first voltage supply is coupled to the other end of the other line of the lines.

4. The display device according to claim 1,
wherein the third electrodes are provided so as to intersect with the lines in a plan view, and an electromotive force caused by the magnetic field is generated in the third electrodes during the sensing period.

5. The display device according to claim 4,
wherein an insulating substrate is provided between the first electrodes and the second electrodes,
wherein the first electrodes are provided so as to intersect with the lines in the plan view, and
wherein the second electrodes are provided so as to intersect with the first electrodes in the plan view.

6. The display device according to claim 1, further comprising an analog front-end circuit coupled to the second electrodes.

7. The display device according to claim 6,
wherein a switching circuit provided between the analog front-end circuit and the second and third electrodes, and configured to switch a coupling state between the second electrodes and the analog front-end circuit and a coupling state between the third electrodes and the analog front-end circuit,
wherein the switching circuit is configured to
couple the third electrodes to the analog front-end circuit during the sensing period, and
couple the second electrodes to the analog front-end circuit during a period different from the sensing period.

8. The display device according to claim 1,
wherein the controller is configured to:
supply the second drive signal to the first electrodes to generate the electrostatic capacitance between the first electrodes and the second electrodes during a period different from the sensing period.

9. The display device according to claim 1,
wherein the second electrodes are provided so as to intersect with the lines in the plan view, and
wherein the first electrodes are provided so as to intersect with the second electrodes in the plan view.

10. The display device according to claim 1,
wherein the third electrodes extend along the lines.

11. The display device according to claim 10,
wherein the third electrodes opposed to the lines supplied with the first drive signal are supplied with the same potential signal as the first drive signal during the sensing period.

12. The display device according to claim 10,
wherein the first electrodes and the third electrodes extend along the lines in the plan view, and are supplied with a same potential signal as each other during the sensing period.

13. The display device according to claim 10,
wherein the lines are covered with a planarizing film, and the third electrodes are provided on a surface of the planarizing film.

14. The display device according to claim 13,
wherein each of the third electrodes includes a metal layer and a light-transmitting conductive layer covering the metal layer.

15. The display device according to claim 1,
wherein the display functional layer is a liquid crystal layer, and is configured to change in orientation from an initial orientation according to an electric field generated between the pixel electrodes and the common electrode during the display periods.

16. The display device according to claim 1,
wherein the first electrodes and the second electrodes are provided in the same layer, and an insulating substrate is provided between the common electrode and both the first electrodes and the second electrodes, and
wherein the first electrodes are coupled together in a first direction through a coupling line, and the second electrodes are coupled together in a second direction intersecting with the first direction through bridge wiring provided in a layer different from that of the second electrodes and the first electrodes.

17. The display device according to claim 1,
wherein the display functional layer is a self-luminous layer containing a polymeric organic material.

18. The display device according to claim 1, further comprising switching elements that are respectively provided for the pixel electrodes,
wherein each of the switching elements includes a drain electrode,
wherein each of the drain electrodes has the same potential as that of its corresponding pixel electrode during the display periods, and
wherein the drain electrodes are opposed to the third electrodes with an insulating layer therebetween.

19. The display device according to claim 18,
wherein the third electrodes are opposed to the pixel electrodes with the drain electrodes therebetween.

* * * * *